(12) United States Patent
Nikolov

(10) Patent No.: US 8,400,016 B2
(45) Date of Patent: Mar. 19, 2013

(54) ELECTRONIC DEVICE CONTROL SYSTEM AND METHOD

(75) Inventor: Emil N. Nikolov, Erie, PA (US)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 12/896,195

(22) Filed: Oct. 1, 2010

(65) Prior Publication Data

US 2011/0080762 A1     Apr. 7, 2011

Related U.S. Application Data

(63) Continuation-in-part of application No. 12/572,950, filed on Oct. 2, 2009.

(51) Int. Cl.
*H02J 1/00* (2006.01)
*H02J 3/00* (2006.01)

(52) U.S. Cl. ............................................ 307/82; 307/9.1

(58) Field of Classification Search .................... 307/82, 307/9.1; 361/71, 131
See application file for complete search history.

(56) References Cited

U.S. PATENT DOCUMENTS

| | | | |
|---|---|---|---|
| 7,061,134 B2 * | 6/2006 | Hiti et al. | 290/44 |
| 7,138,773 B2 * | 11/2006 | Kumar | 318/400.27 |
| 2002/0048181 A1 * | 4/2002 | Kobayashi et al. | 363/71 |
| 2002/0074969 A1 | 6/2002 | Edelson | |
| 2009/0067203 A1 | 3/2009 | Chakrabarti et al. | |

FOREIGN PATENT DOCUMENTS

| | | |
|---|---|---|
| EP | 1811641 A1 | 7/2007 |
| EP | 2017952 A1 | 1/2009 |
| JP | 62268396 A | 11/1987 |
| JP | 7135782 A | 5/1995 |

OTHER PUBLICATIONS

The PCT International Search Report and Written Opinion issued in connection with corresponding International Application No. PCT/US2010/051084 on Mar. 24, 2011.

* cited by examiner

*Primary Examiner* — Carlos Amaya
(74) *Attorney, Agent, or Firm* — GE Global Patent Operation; John A. Kramer

(57) ABSTRACT

There is provided a system and method of operating a plurality of inverters that provide power via a plurality of switches. An exemplary method includes determining an inverter firing pattern corresponding to one of a plurality of regions of an inverter firing cycle, the inverter firing pattern defining whether each of the plurality of switches are held either on or off. The exemplary method also includes producing control signals for the plurality of switches based on the firing pattern. The control signals may be applied to the plurality of inverters for powering one or more electronic devices.

12 Claims, 56 Drawing Sheets

200

700

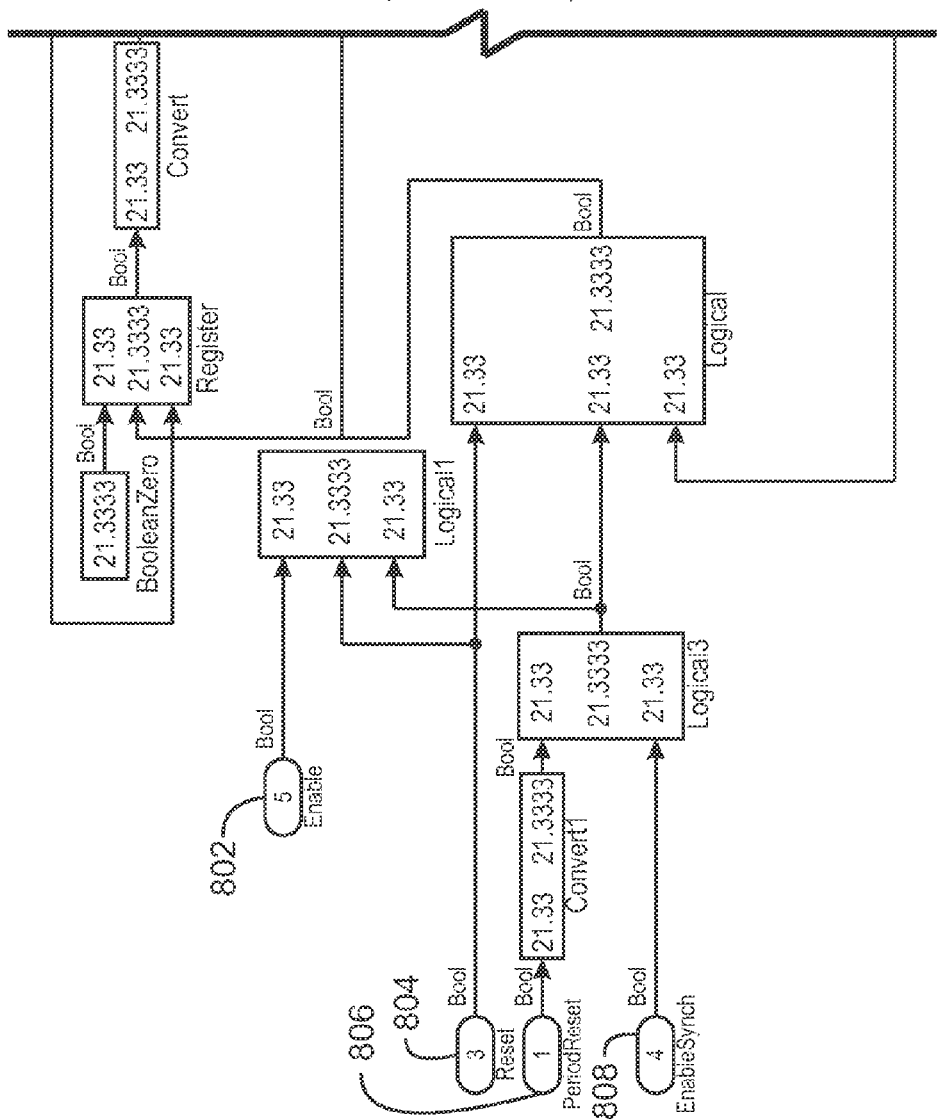

900

1100

1400

1400

1400

1600

1700

2100

2200

2300

2700

3000

| Signal Name | Size (bits) | Enumeration/Values | Scaling | Type | Min/Max | Register Address |
|---|---|---|---|---|---|---|
| Carrier Count | 16 | The Max Count Value for the Triangular Wave | None | Unsigned Int | 0-65535 | 24003108 |
| Modulator Count | 16 | The Count Difference Between Sine Wave Samples | None | Unsigned Int | 0-65535 | 24003104 |
| Modulation Index | 16 | Modulation Index of the Reference Sine Wave | 4096 | Unsigned Int | 0-8 | 2400310c |
| Min on/off Time | 16 | | 1 = 15.625 nS | | | 24003184 |
| Dead Time | 16 | | 1 = 15.625 nS | | | 24003188 |
| Third Harmonic Modulation Index | 16 | Modulation Index of the Third Harmonic | 4096 | Unsigned Int | 0-1 | 24003110 |
| Inverter Flags | 16 | Contains the Flags for Enable/Disable, Modes Etc | None | Unsigned Int | NA | 24003100 |

| | Bit | Function |
|---|---|---|
| Inverter Flags | 0 | Global Enable/Disable for the Inverter. 0 - Enable, 1 - Disable |
| | 1 | Third Harmonic Enable. 0 - Disable, 1 - Enable |
| | 2 | PWM Mode Bit. 0 - Asynchronous PWM, 1 - Synchronous PWM |
| | 3 | Square Wave Mode. 0 - PWM Mode, 1 - Square Wave Mode |
| | 4 | AUP Output Enable 1 Enable |
| | 5 | BUP Output Enable 1 Enable |
| | 6 | CUP Output Enable 1 Enable |
| | 7 | ADN Output Enable 1 Enable |
| | 8 | BDN Output Enable 1 Enable |
| | 9 | CDN Output Enable 1 Enable |
| | 10 | |
| | 11 | |
| | 12 | |
| | 13 | |
| | 14 | |
| | 15 | Data Valid. 0 - Invalid/Old Data, 1 - Valid/New Data |

ELECTRONIC DEVICE CONTROL SYSTEM AND METHOD

CROSS-REFERENCE TO RELATED APPLICATION

This is a continuation-in-part of co-pending U.S. patent application Ser. No. 12/572,950, filed Oct. 2, 2009, by Ajit Kane, et al., for ELECTRONIC DEVICE CONTROL SYSTEM AND METHOD.

FIELD

Exemplary embodiments of the invention relate generally to a system and method for controlling inverters, such as insulated gate bipolar transistor (IGBT) inverters. Moreover, such exemplary embodiments may relate to firing inverters in a system of a diesel-electric locomotive.

BACKGROUND

Traction vehicles such as, for example, locomotives, employ electric traction motors for driving wheels of the vehicles. In some of these vehicles, the motors are alternating current (AC) motors whose speed and power are controlled by varying the frequency and the voltage of AC electric power supplied to the motors. Commonly, the electric power is supplied at some point in the vehicle system as DC power and is thereafter converted to AC power of controlled frequency and voltage amplitude. The electric power may be derived from an on-board alternator driven by an internal combustion engine or may be obtained from a wayside power source such as a $3^{rd}$ rail or overhead catenary.

Inefficiency in the process of controlling the inverters that produce AC power can adversely affect the efficiency of the entire locomotive. In general, there is a need for a more efficient system and method for controlling the firing of inverters in power systems.

SUMMARY

Briefly, in accordance with an exemplary embodiment of the invention, there is provided a method for operating a plurality of inverters that receive provide via a plurality of switches. The method comprises determining an inverter firing pattern corresponding to one of a plurality of regions of an inverter firing cycle, the inverter firing pattern defining whether each of the plurality of switches in the plurality of inverters are held either on or off. The exemplary method also comprises producing control signals for the plurality of switches based on the firing pattern. The control signals may be applied to the plurality of inverters for powering one or more electronic devices.

Another exemplary embodiment relates to an inverter firing system that operates one or more electronic devices having a plurality of inverters that provide power via a plurality of switches. The inverter firing system comprises an inverter control circuit that determines an inverter firing pattern corresponding to one of a plurality of tiring regions of an inverter firing cycle. The inverter firing pattern defines whether each of the plurality of switches in the plurality of inverters are held either on or off for the duration of the corresponding firing region. The inverter control circuit produces control signals for the plurality of switches based on the firing pattern, and applies the control signals to the plurality of inverters for the duration of the corresponding firing region.

Yet another exemplary embodiment of the invention relates to a power system for a vehicle. The exemplary power system comprises a plurality of inverters that provide power via a plurality of switches, and a plurality of electronic devices that are powered by the inverters. The exemplary power system also comprises an inverter control circuit that determines an inverter firing pattern corresponding to one of a plurality of regions of an inverter firing cycle. The inverter firing pattern defines whether each of the plurality of switches are held either on or off. The inverter control circuit also produces control signals for the plurality of inverters based on the firing pattern, and applies the control signals to the plurality of inverters for powering the plurality of electronic devices.

DRAWINGS

These and other features, aspects, and advantages of the invention will become better understood when the following detailed description is read with reference to the accompanying drawings in which like characters represent like parts throughout the drawings, wherein.

Figure 3A:
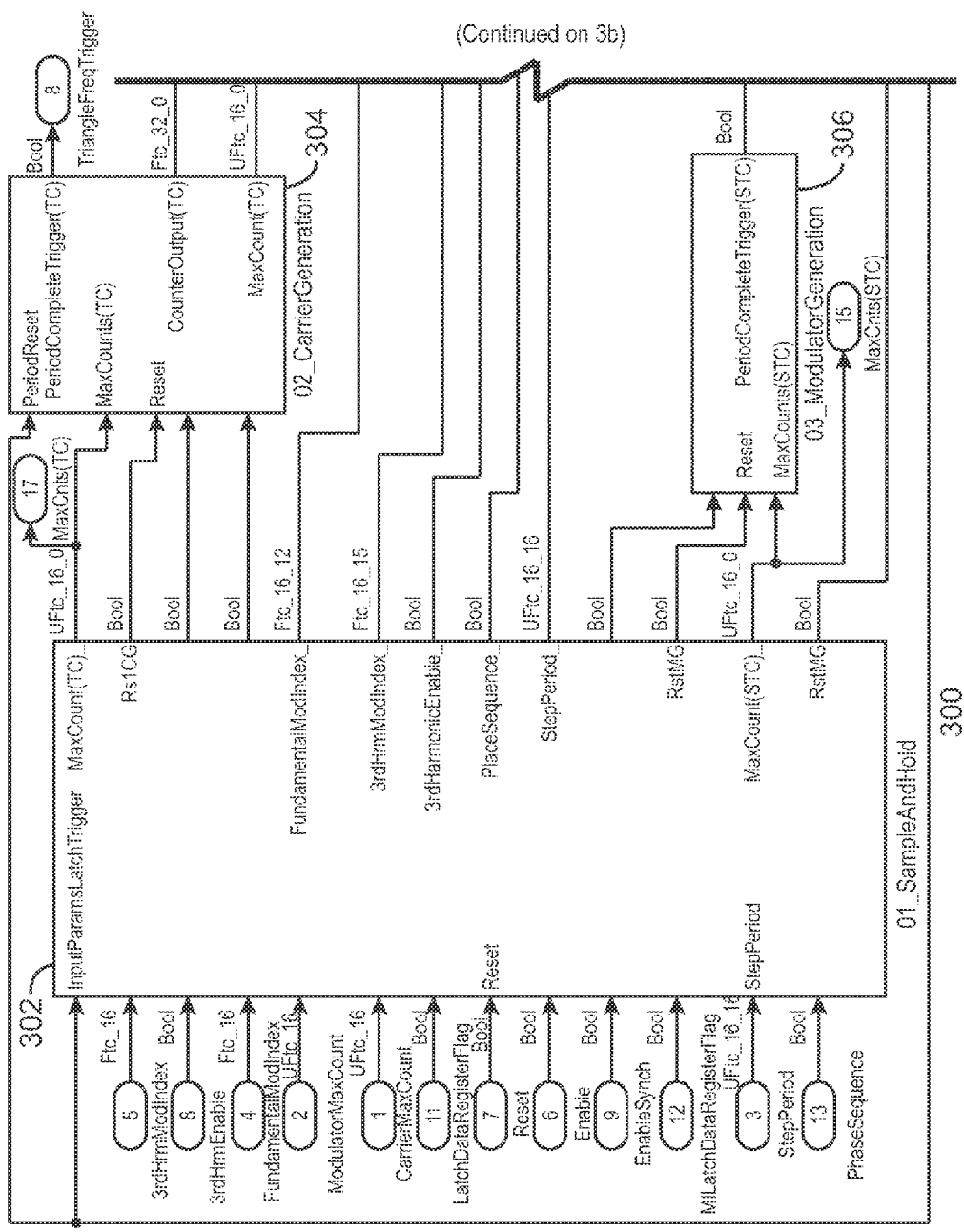
Figure 3B:
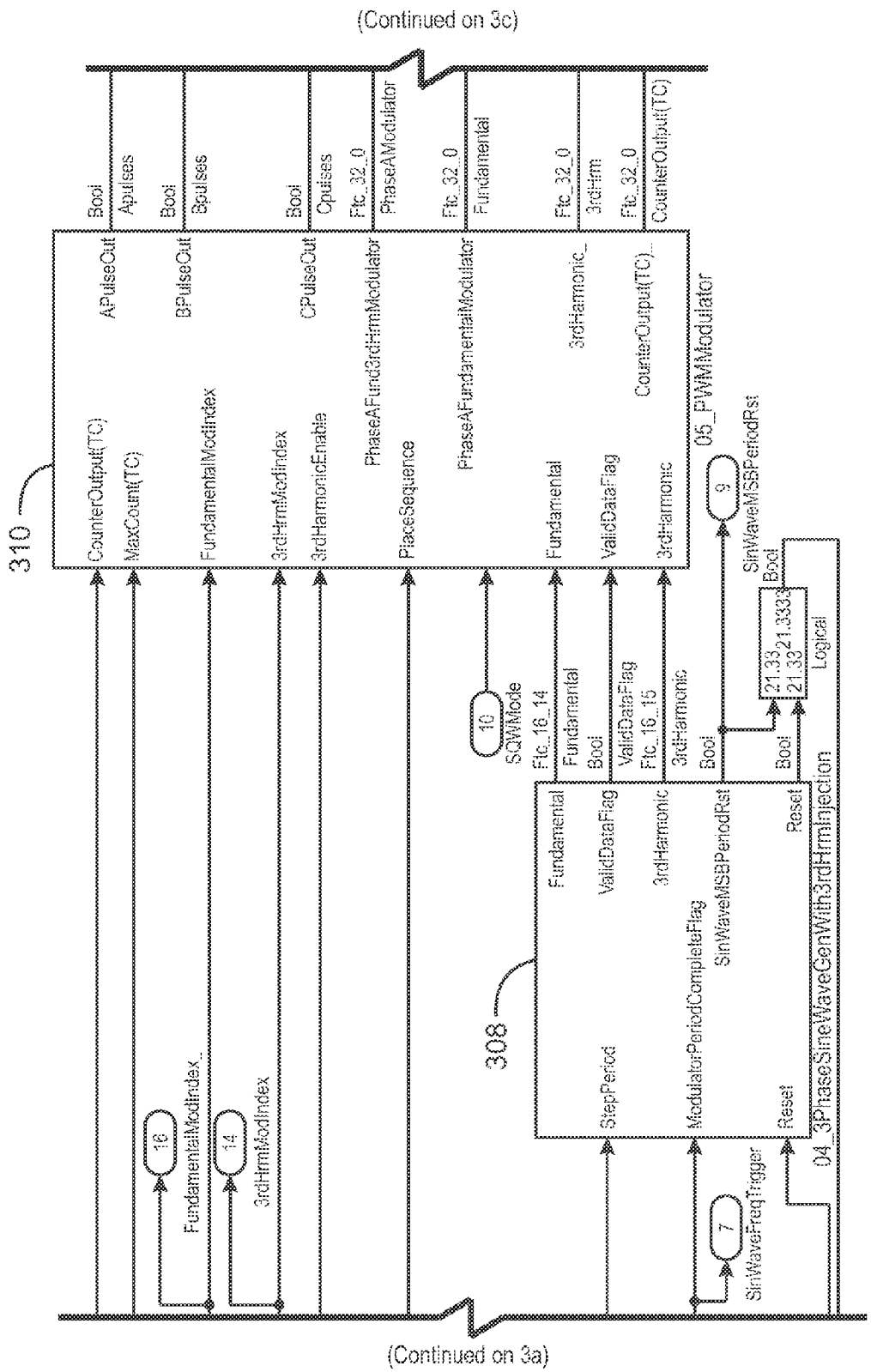
Figure 3C:
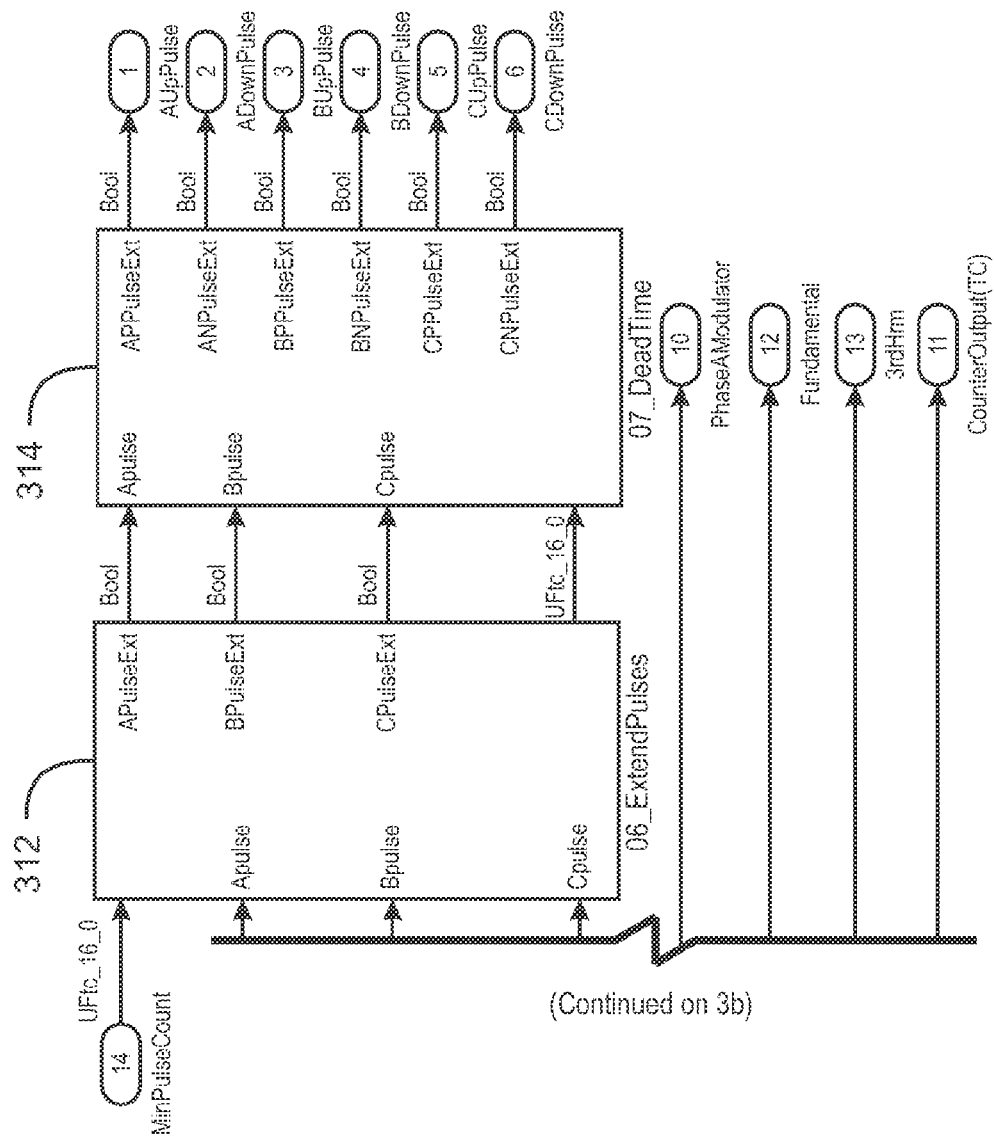
Figure 4A:
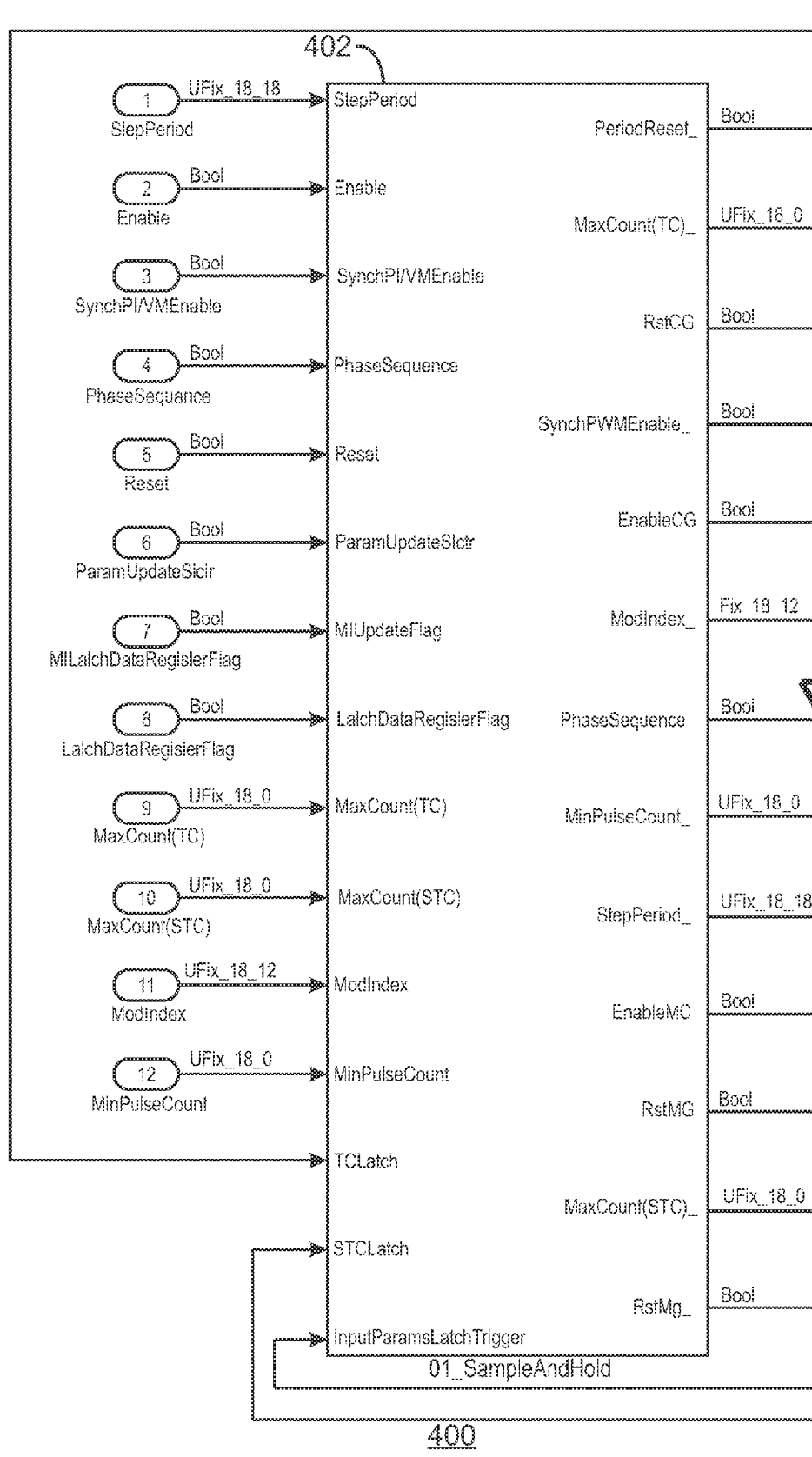
Figure 4B:
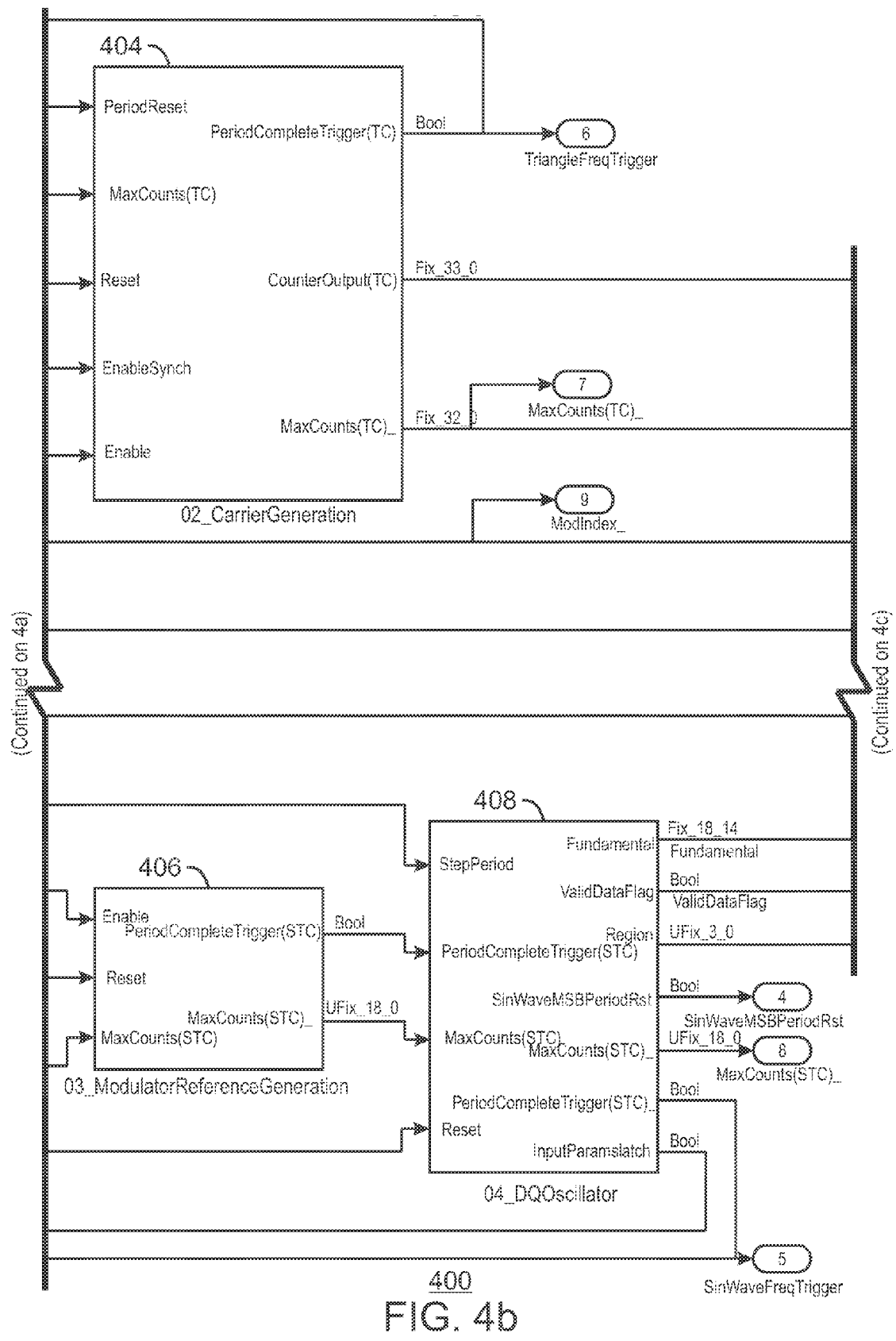
Figure 4C:
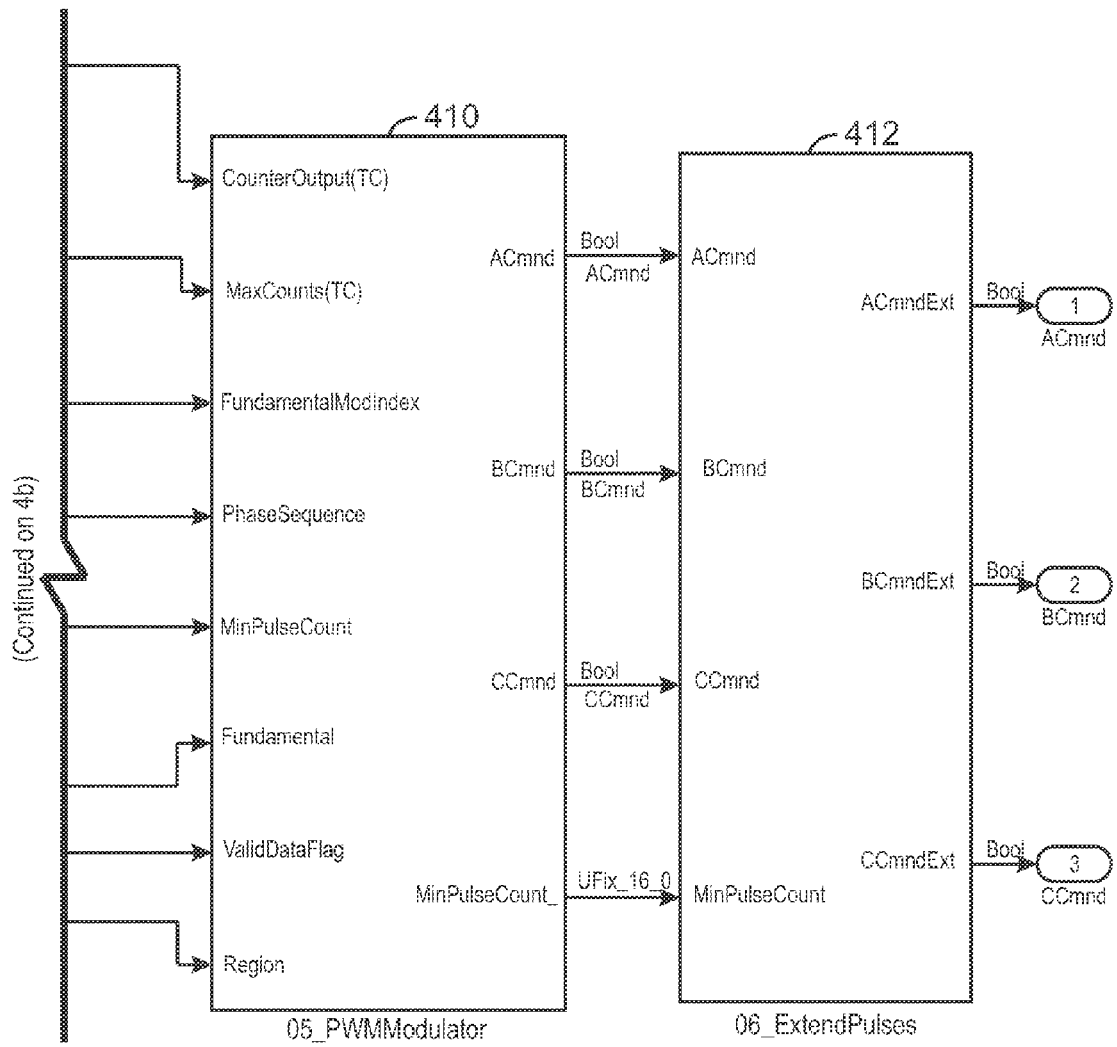
Figure 5:
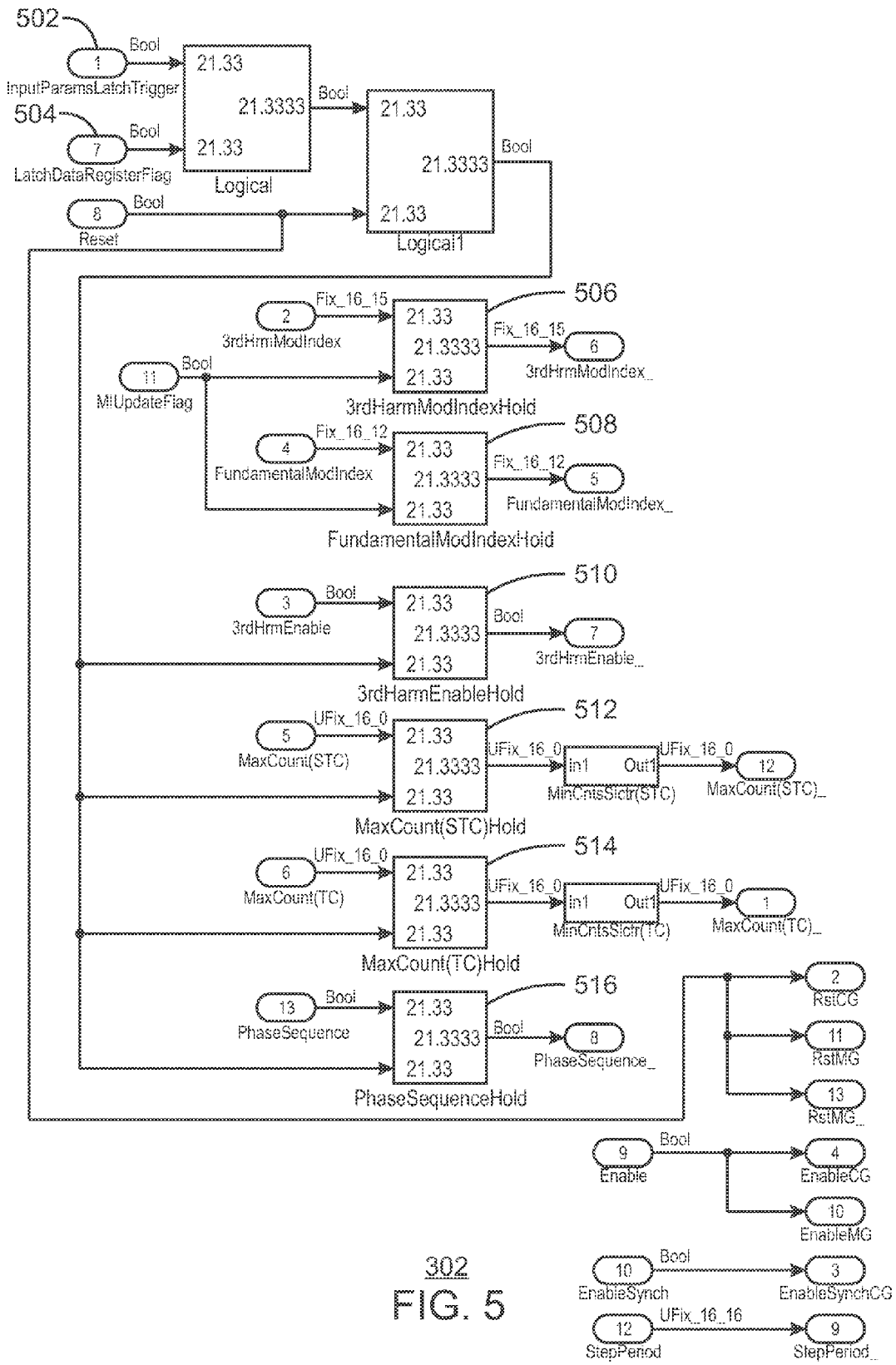
Figure 6:
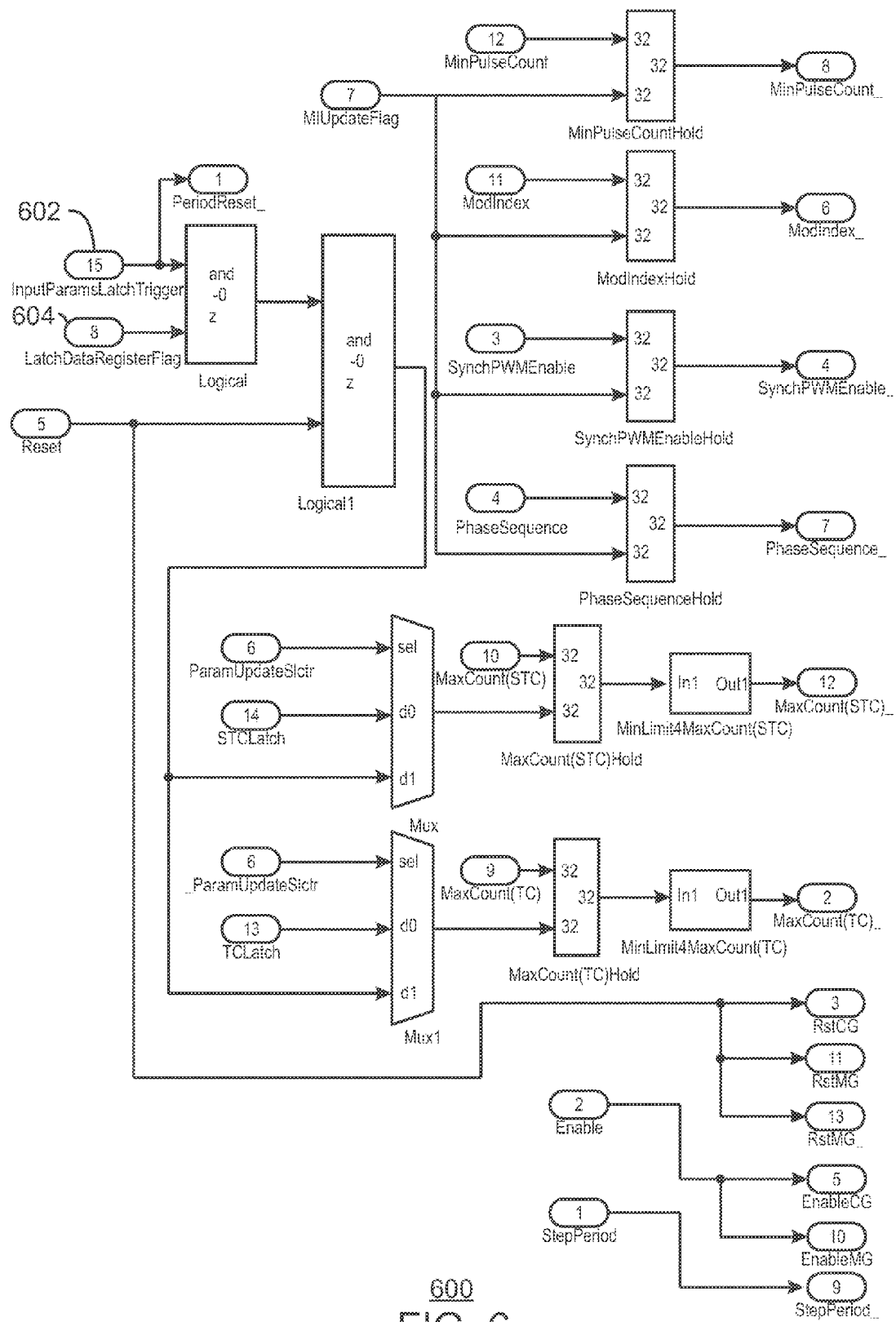
Figure 7A:
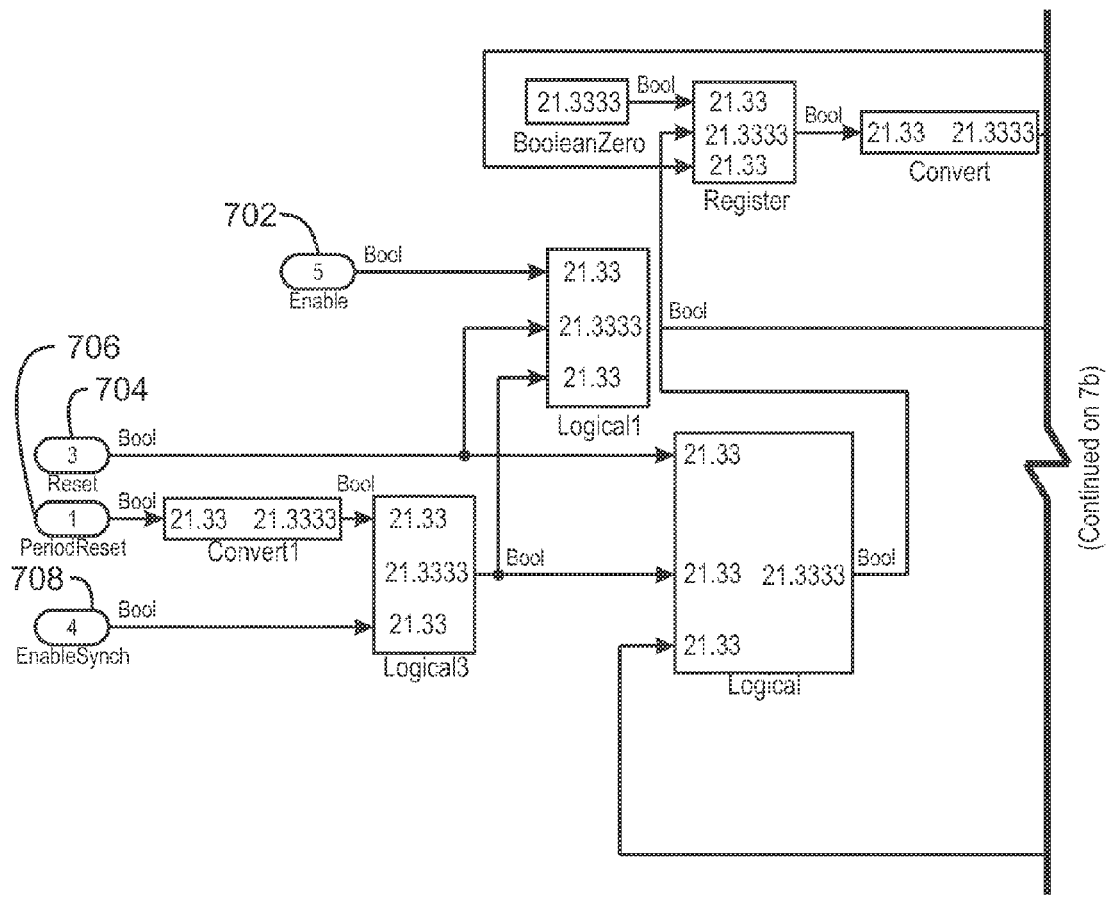
Figure 7B:
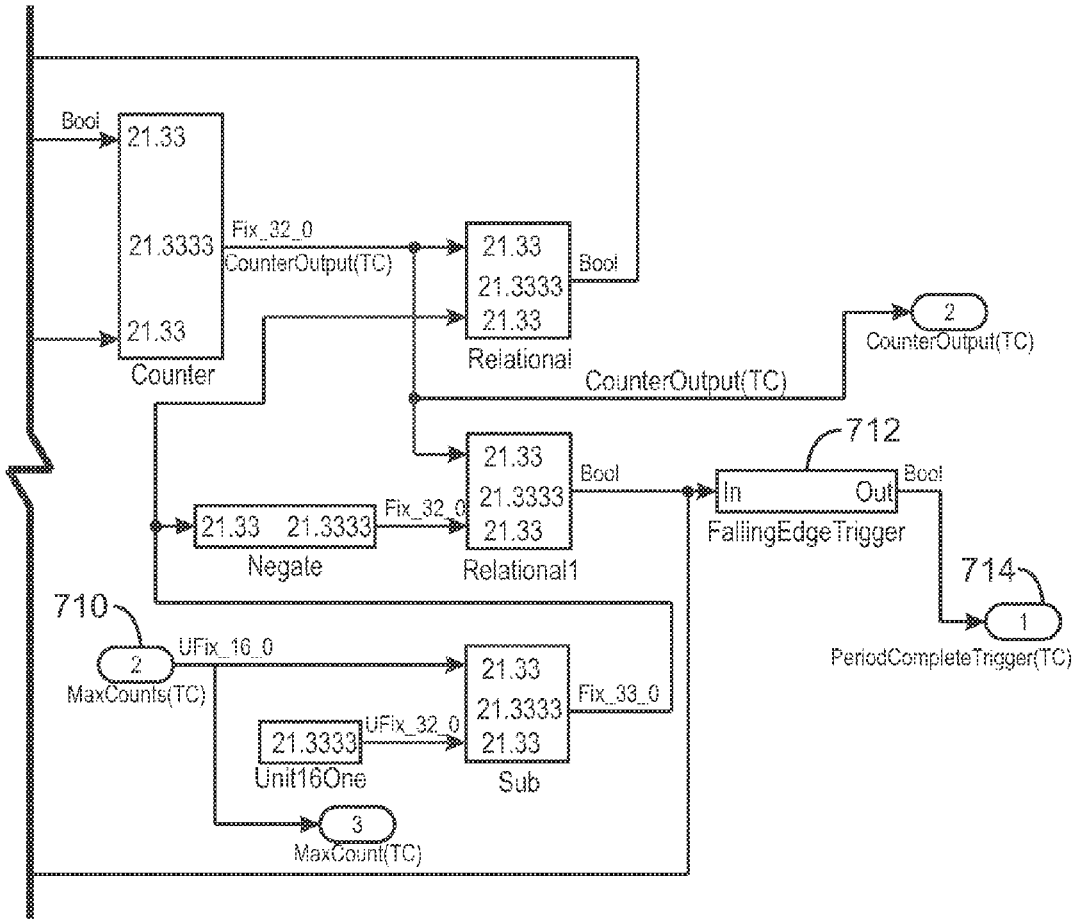
Figure 8B:
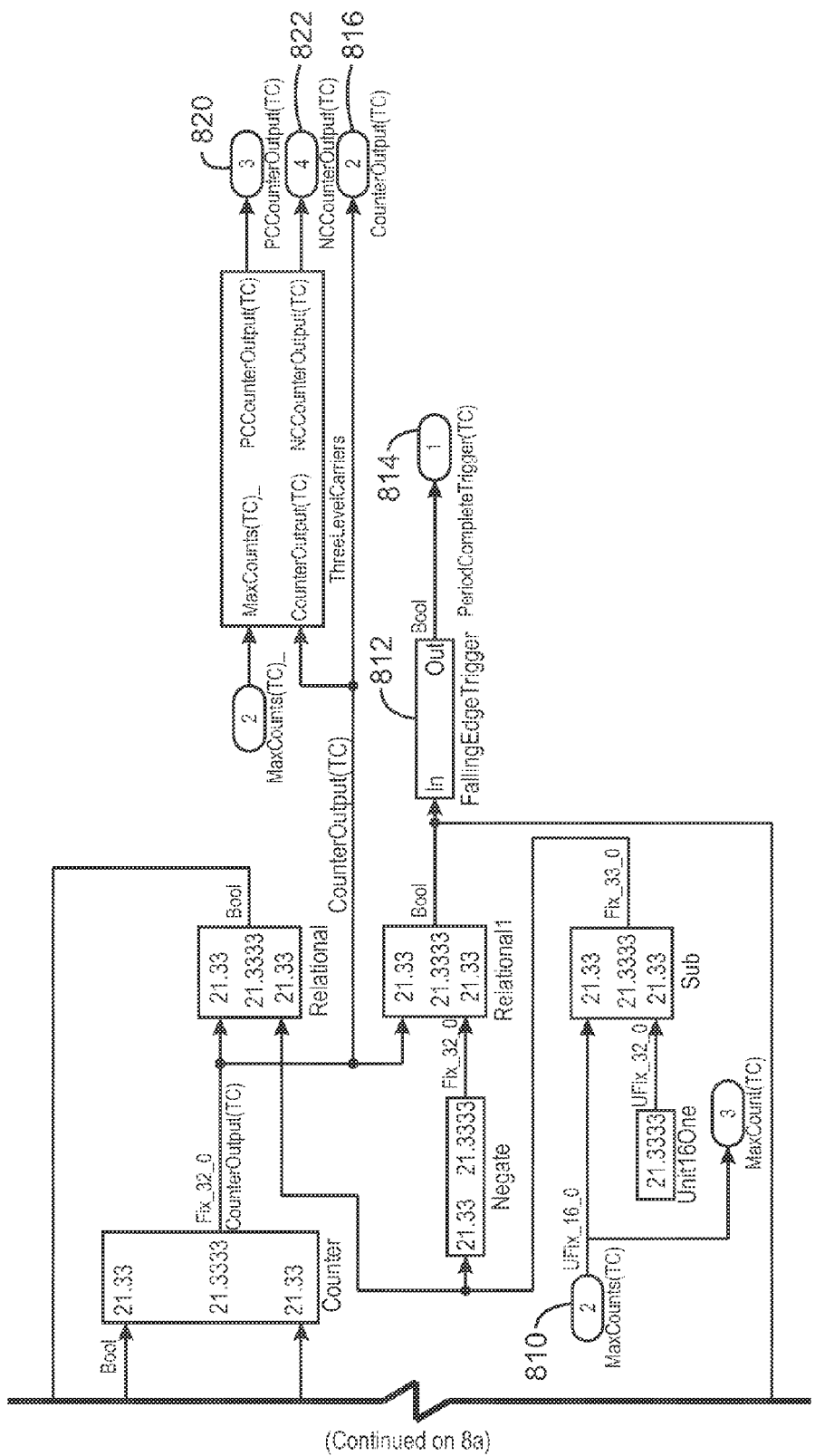
Figure 9:
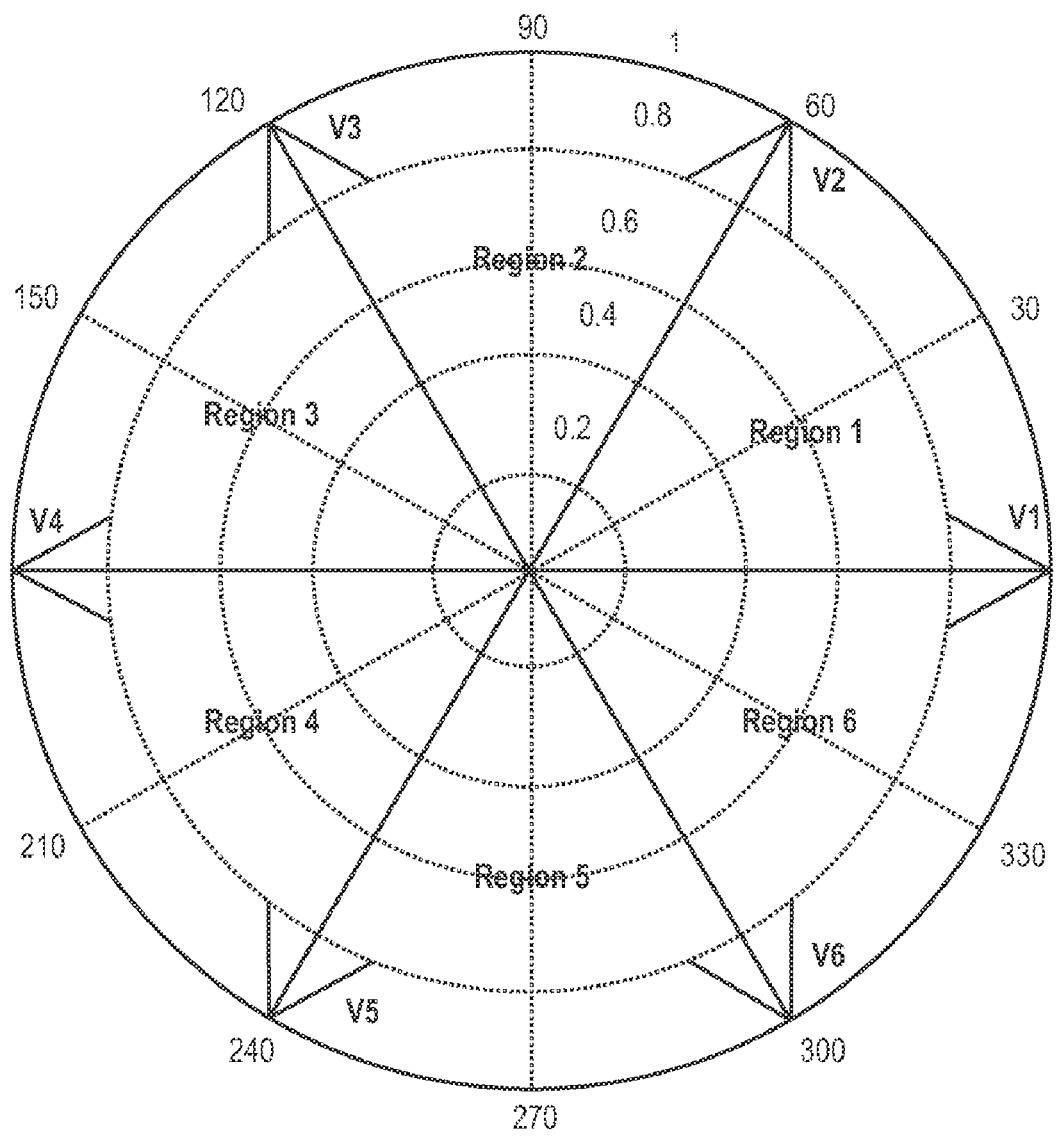
Figure 10A:
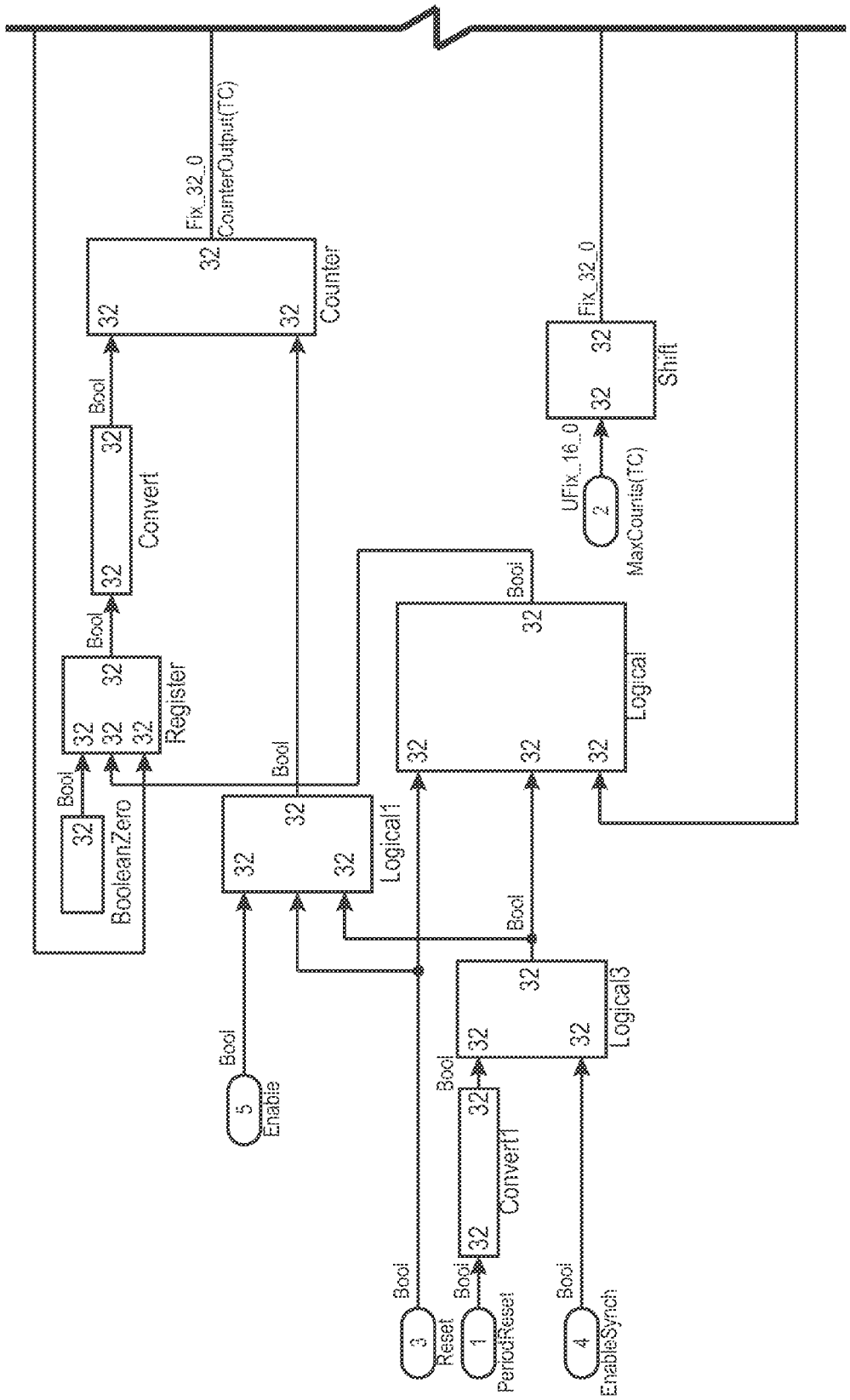
Figure 10B:
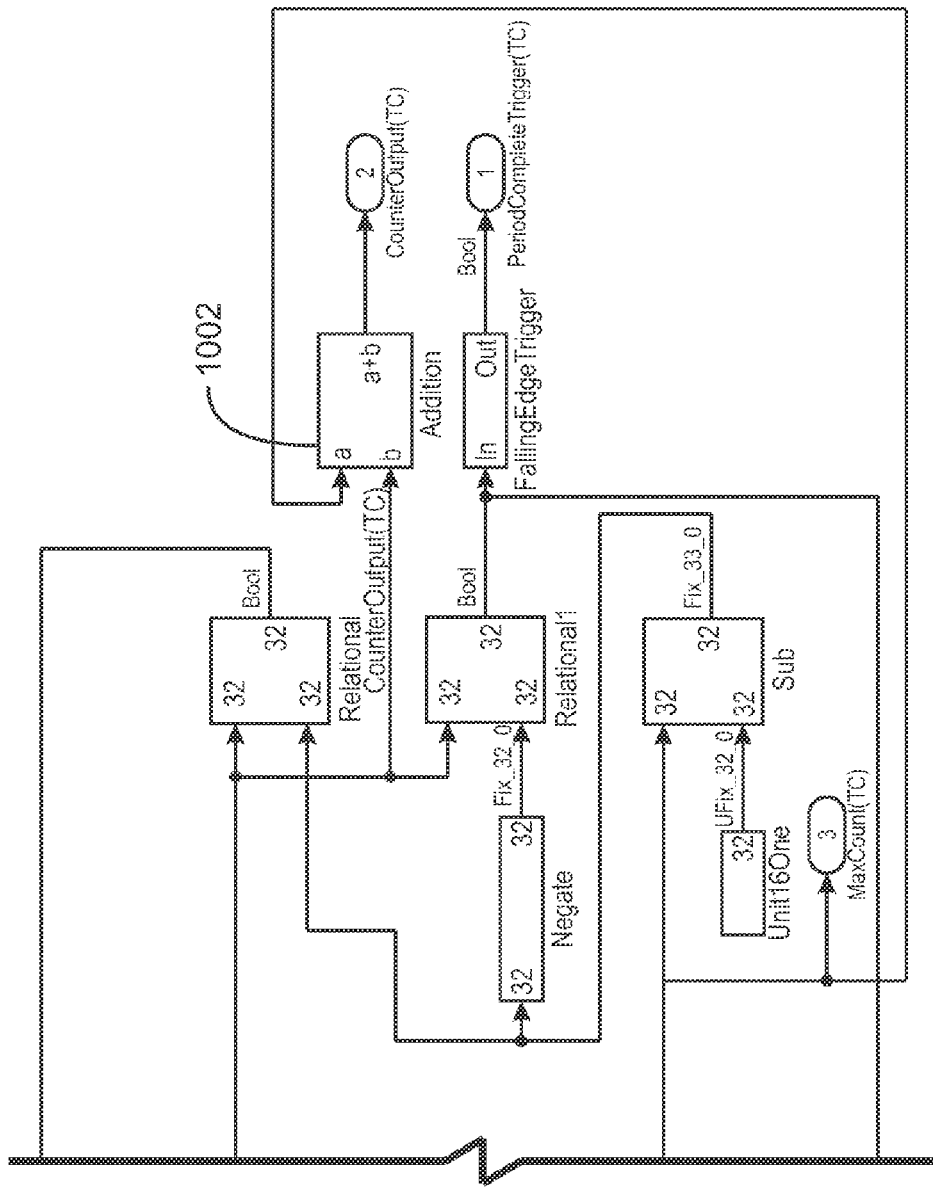
Figure 11:
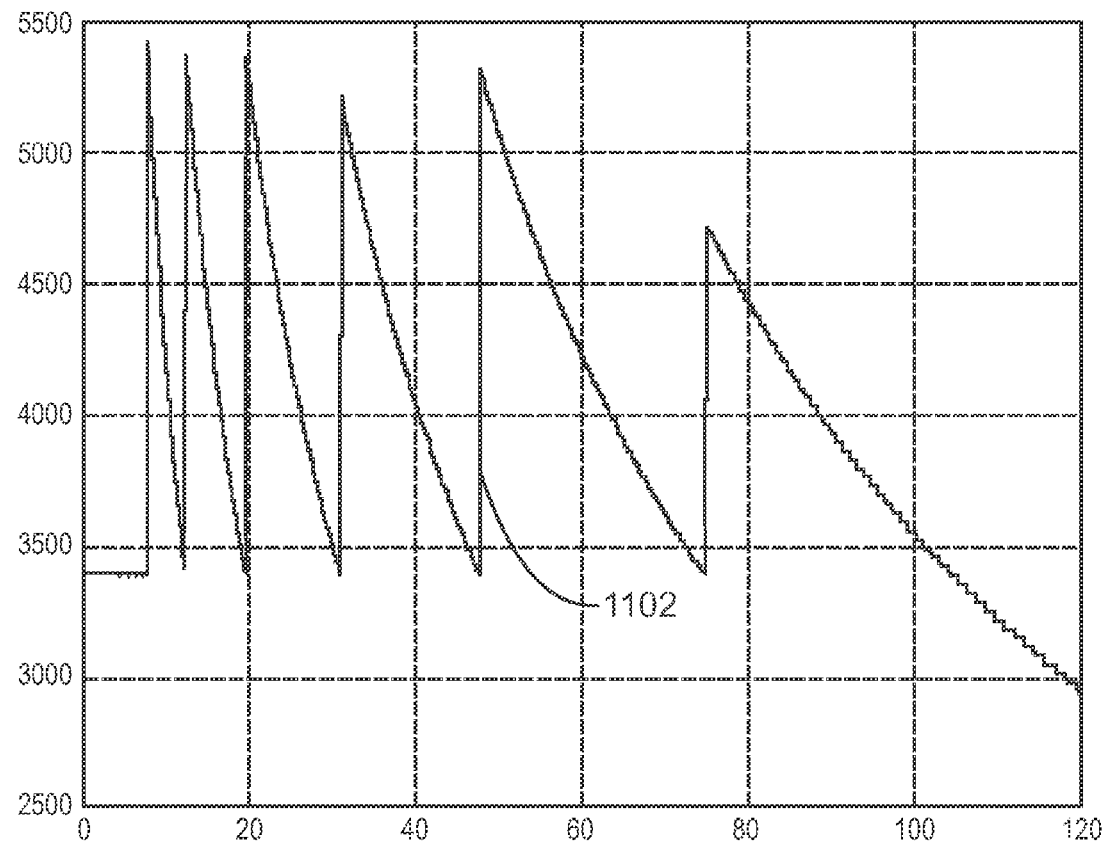
Figure 12:
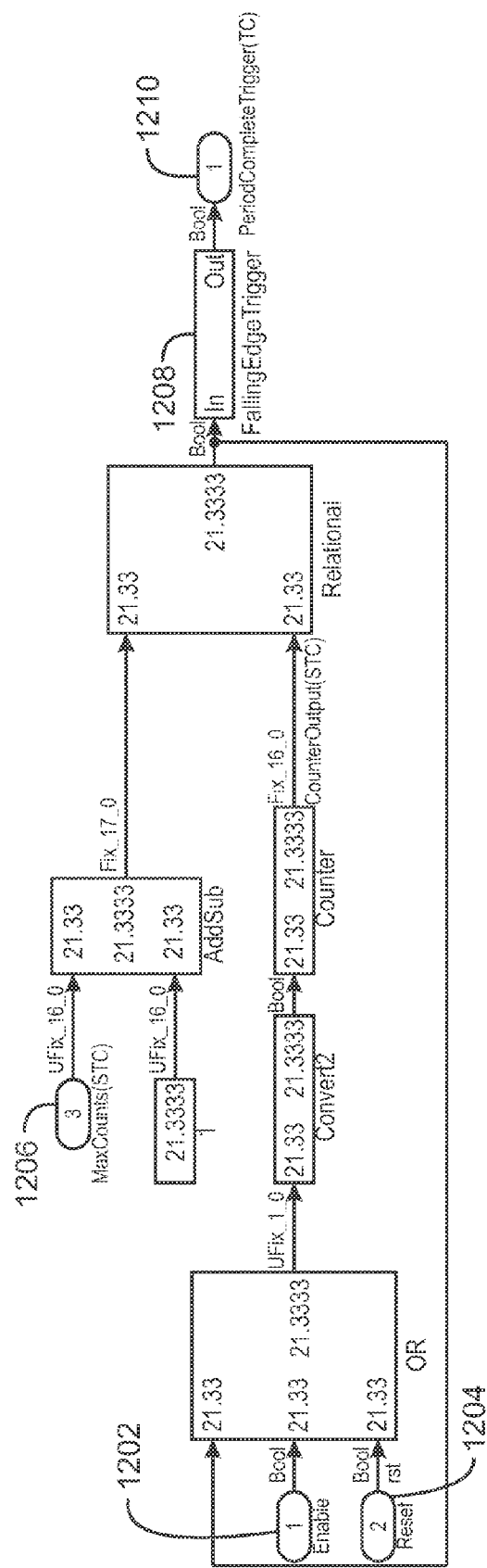
Figure 13:
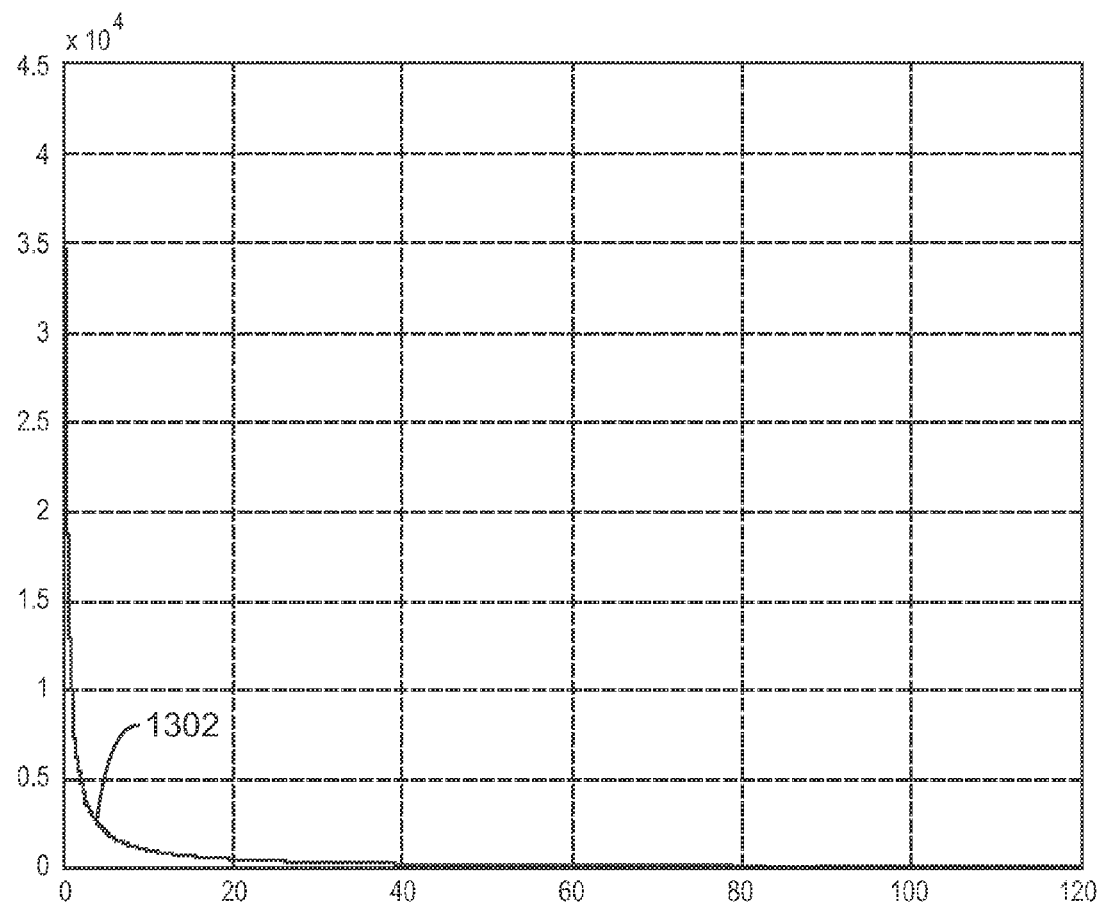
Figure 14A:
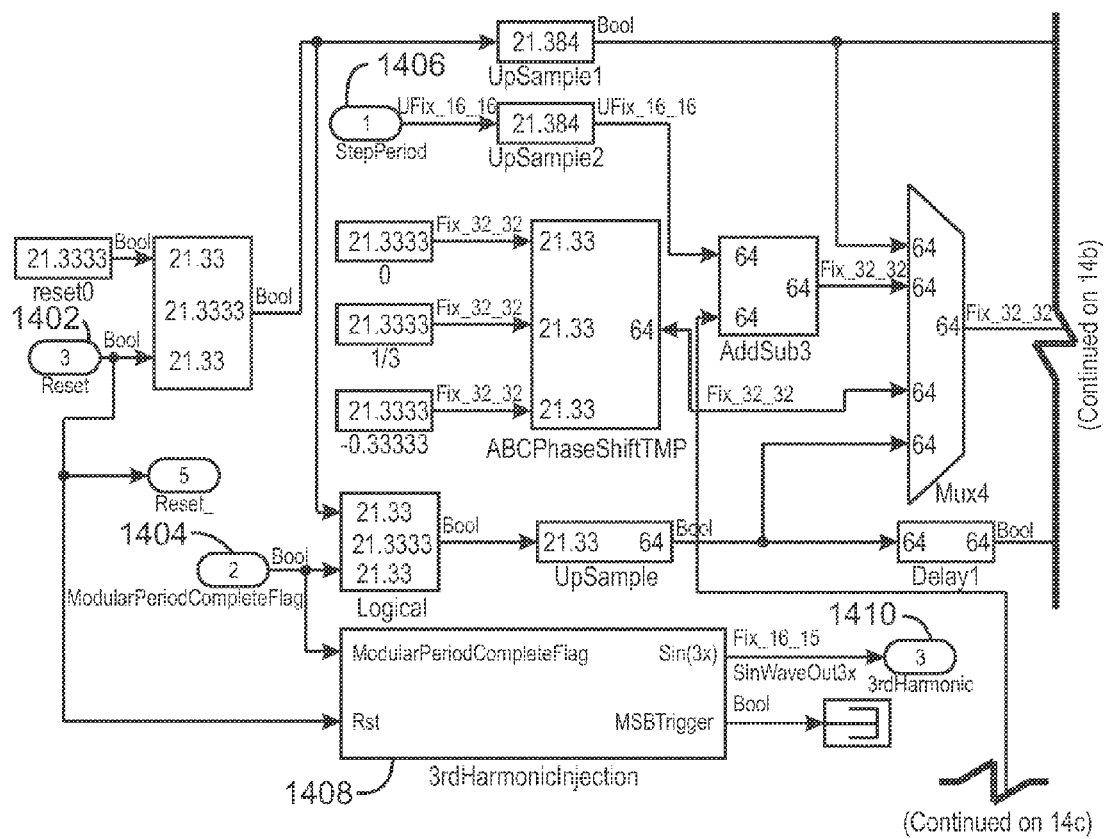
Figure 14B:
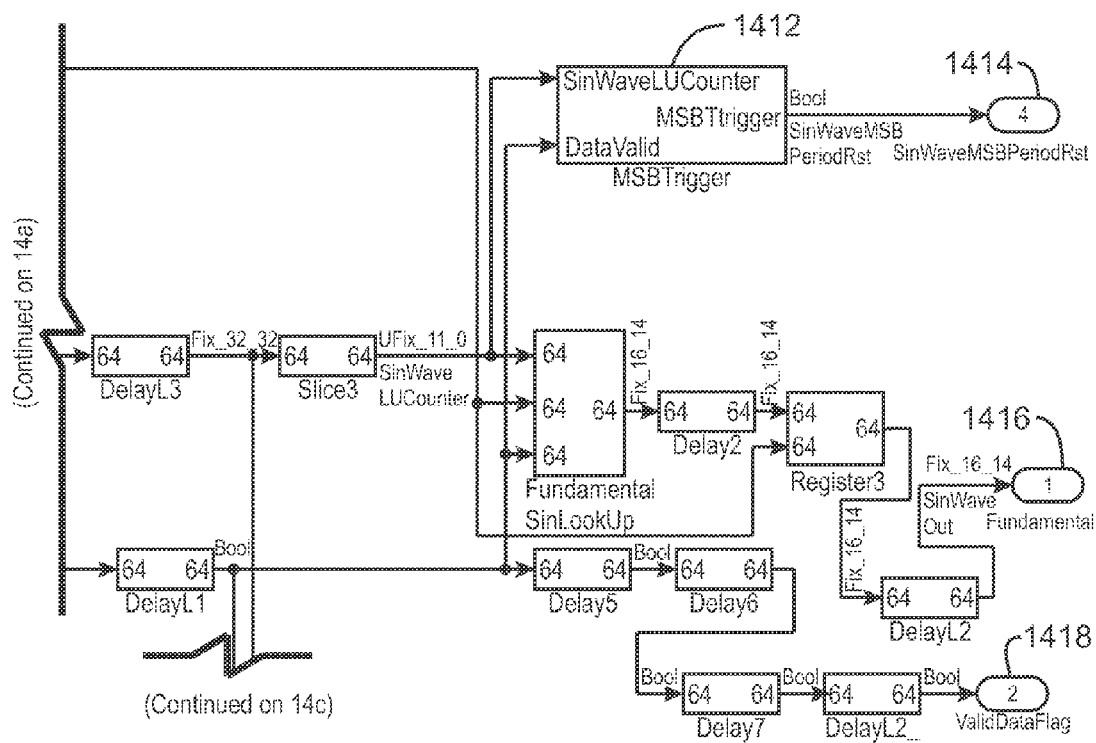
Figure 14C:
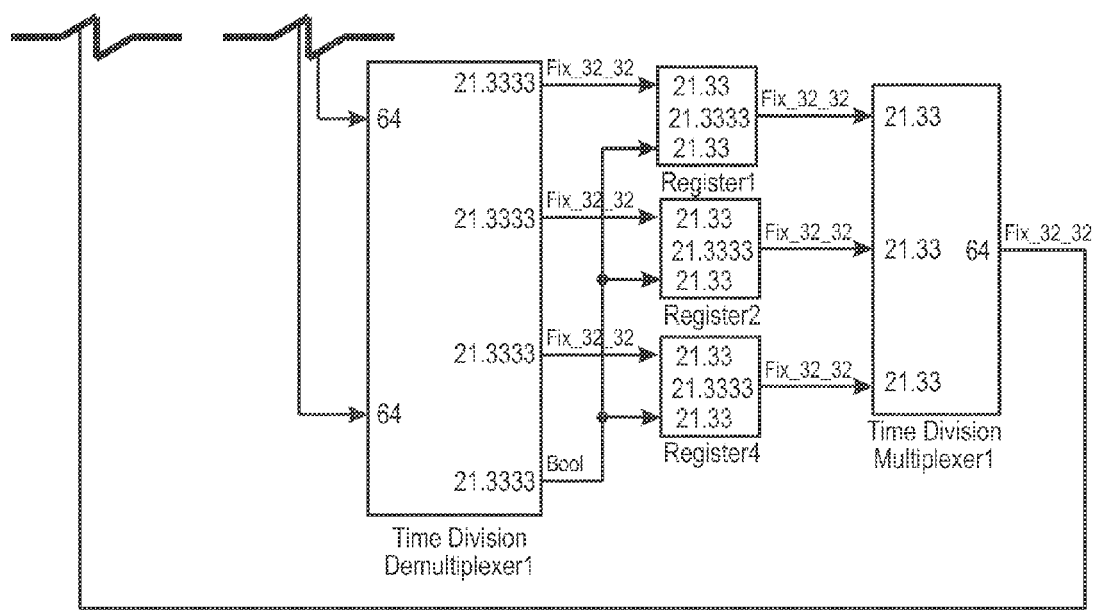
Figure 15A:
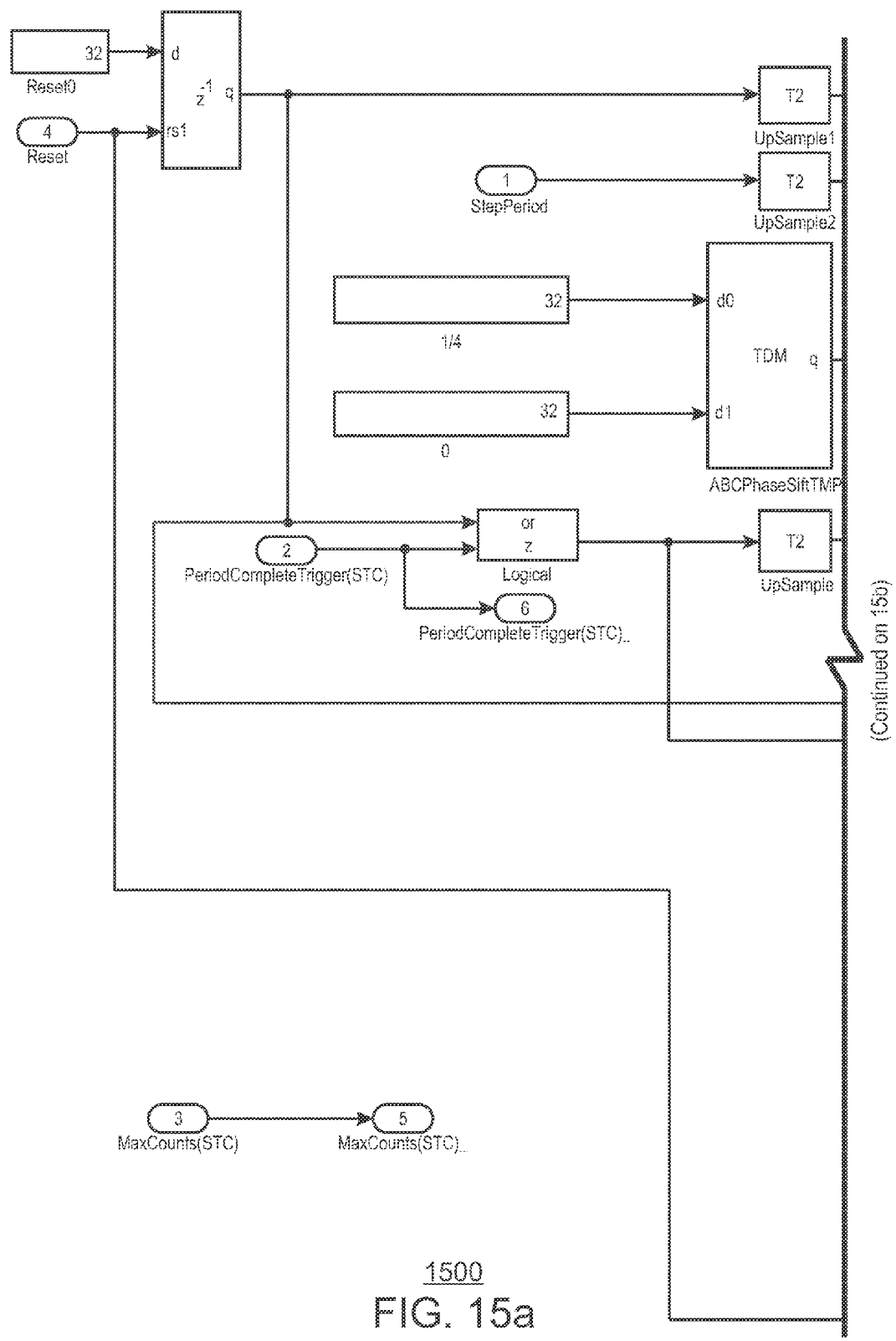
Figure 15B:
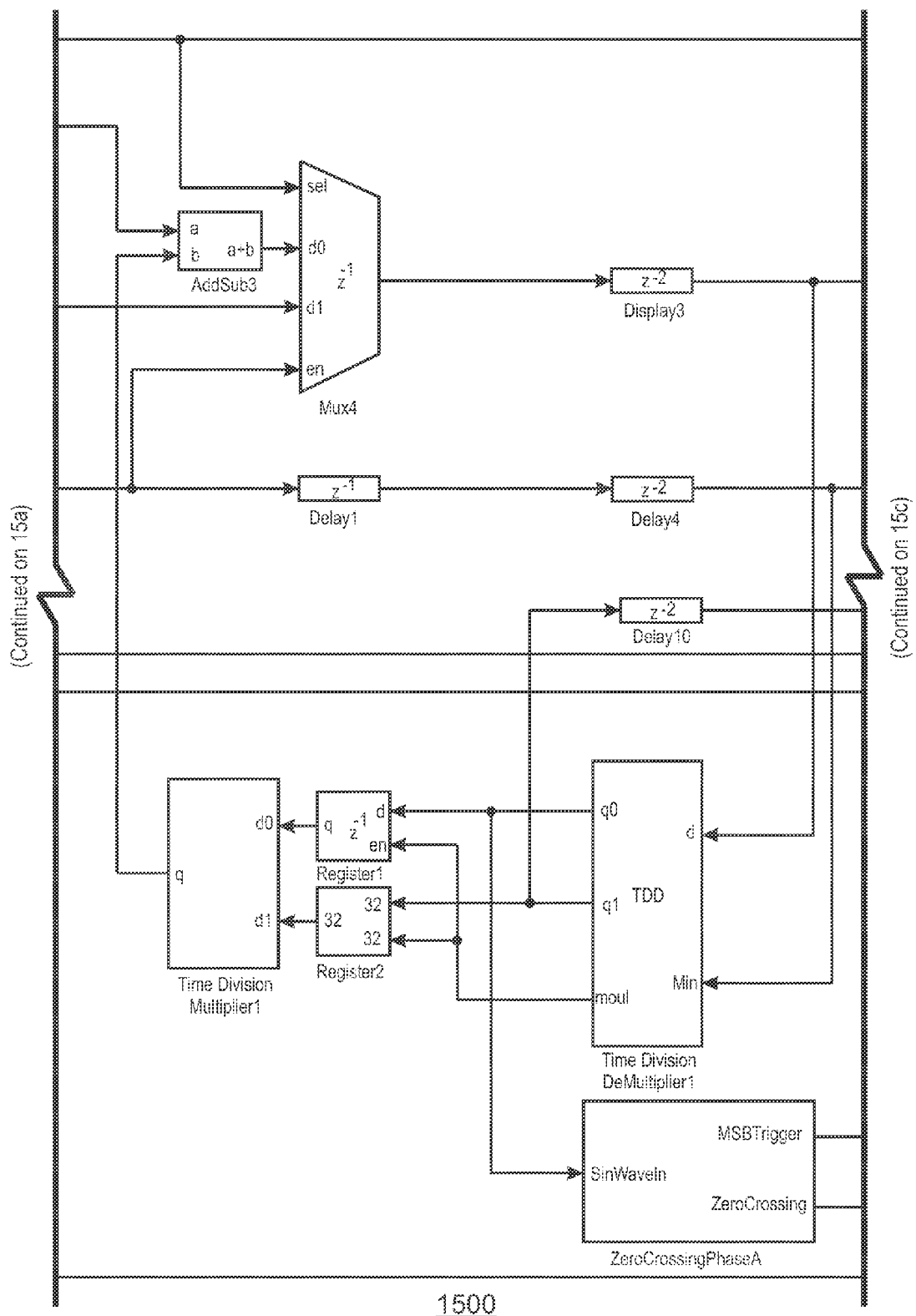
Figure 15C:
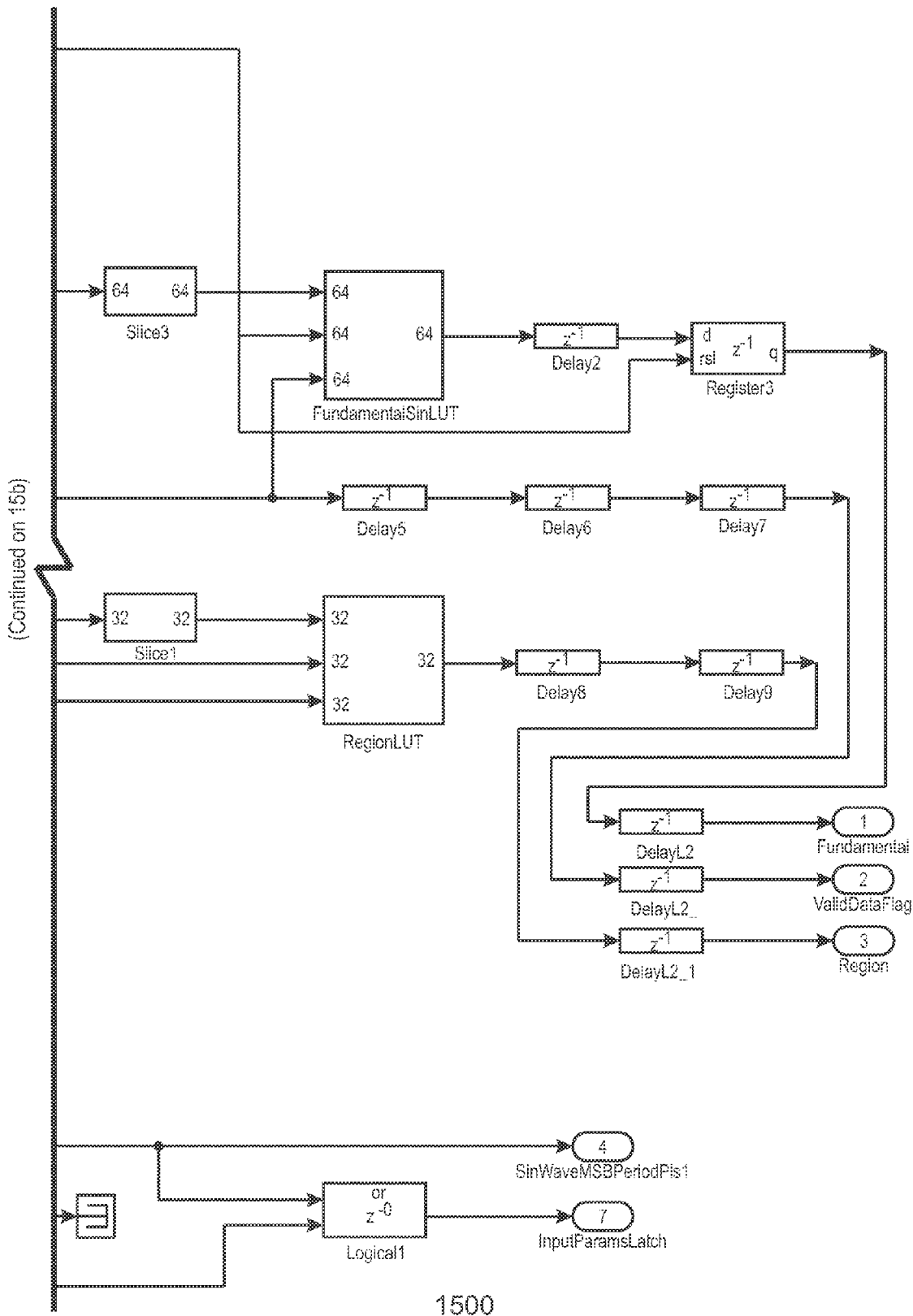
Figure 16:
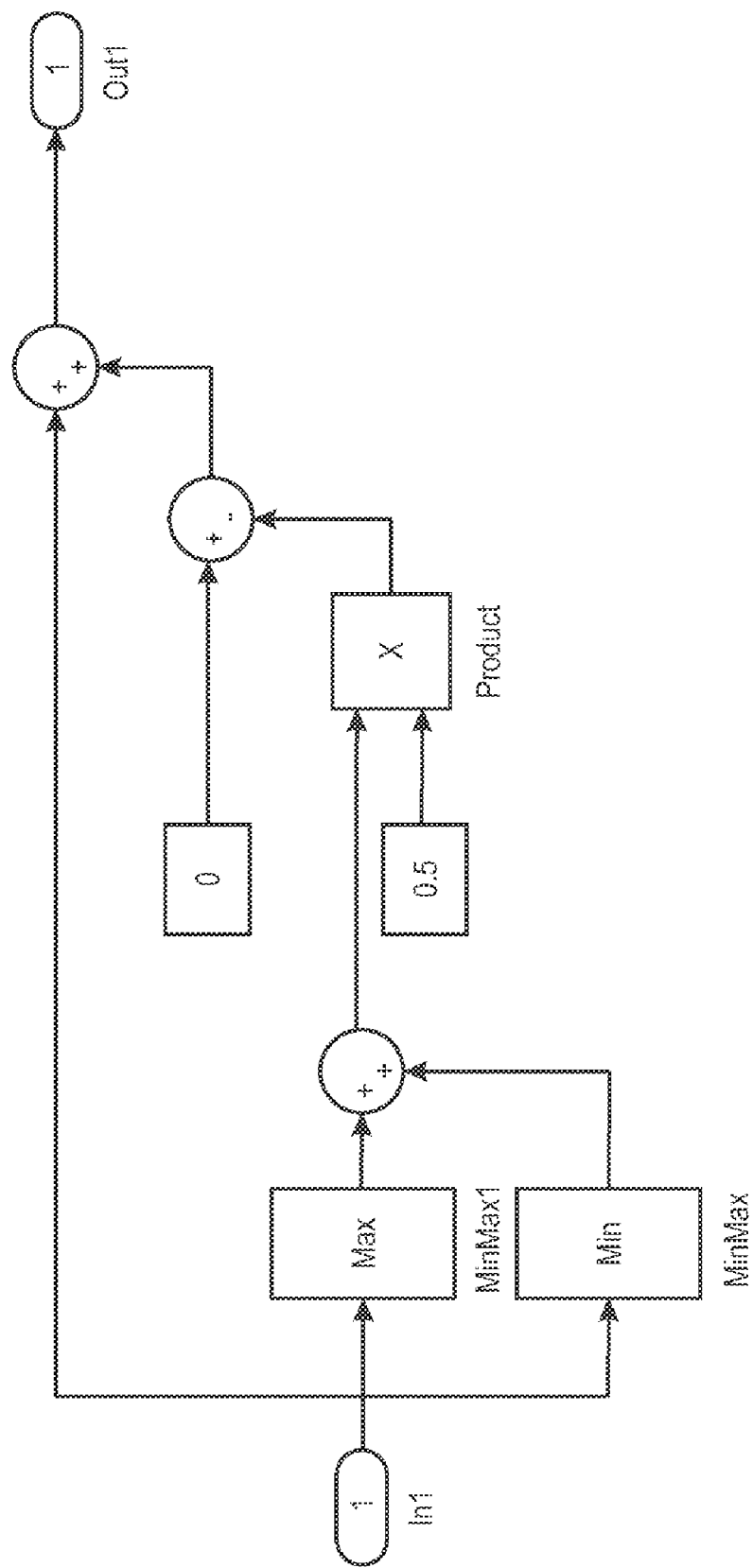
Figure 17A:
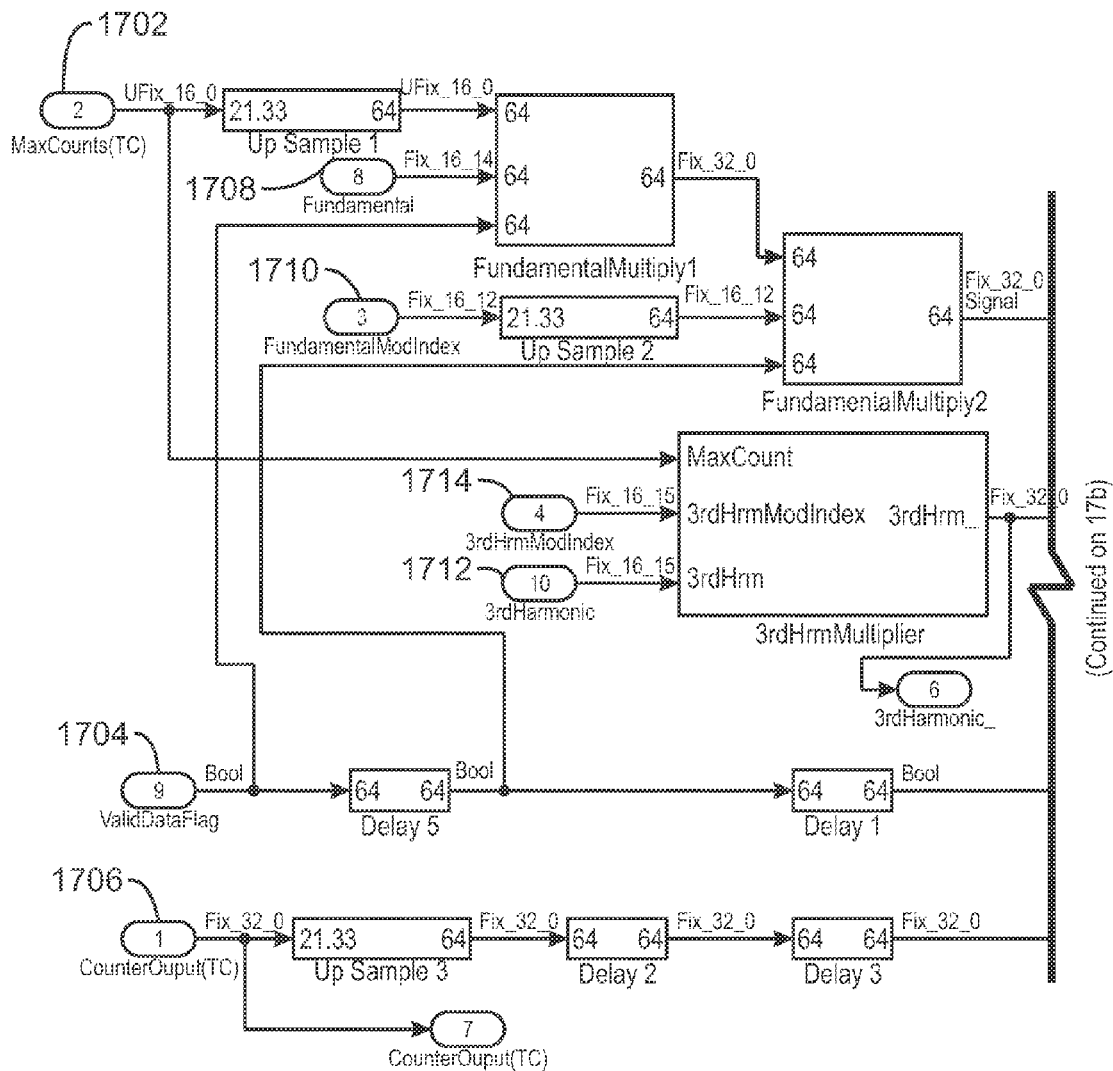
Figure 17B:
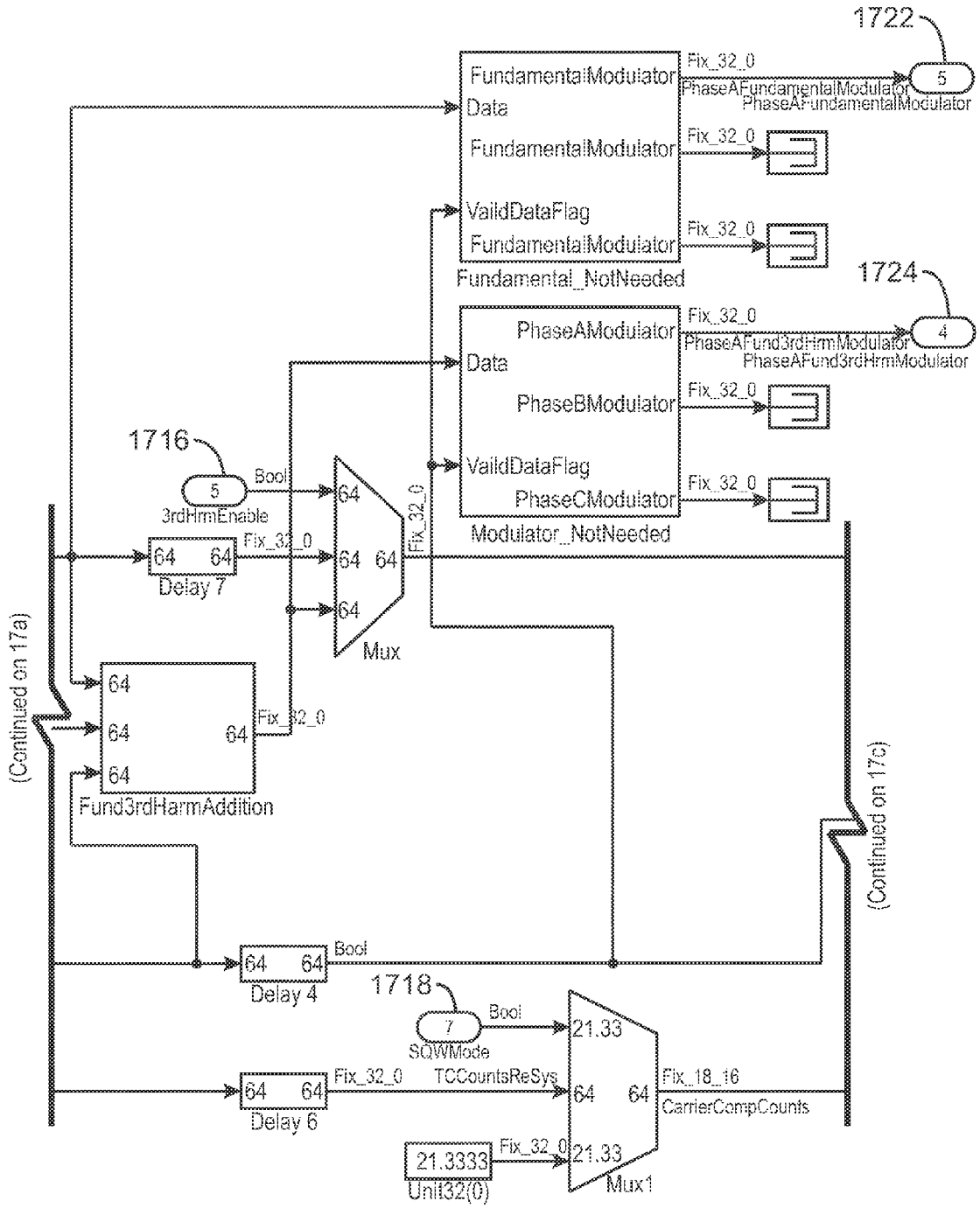
Figure 17C:
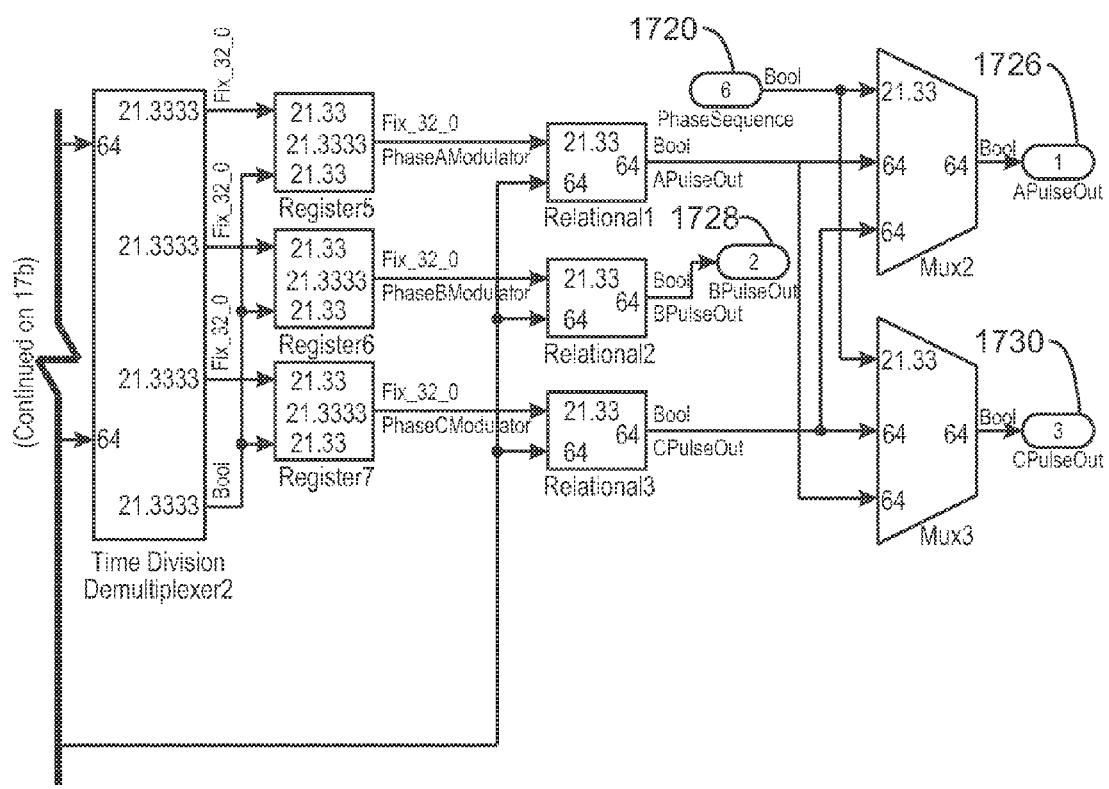
Figure 18A:
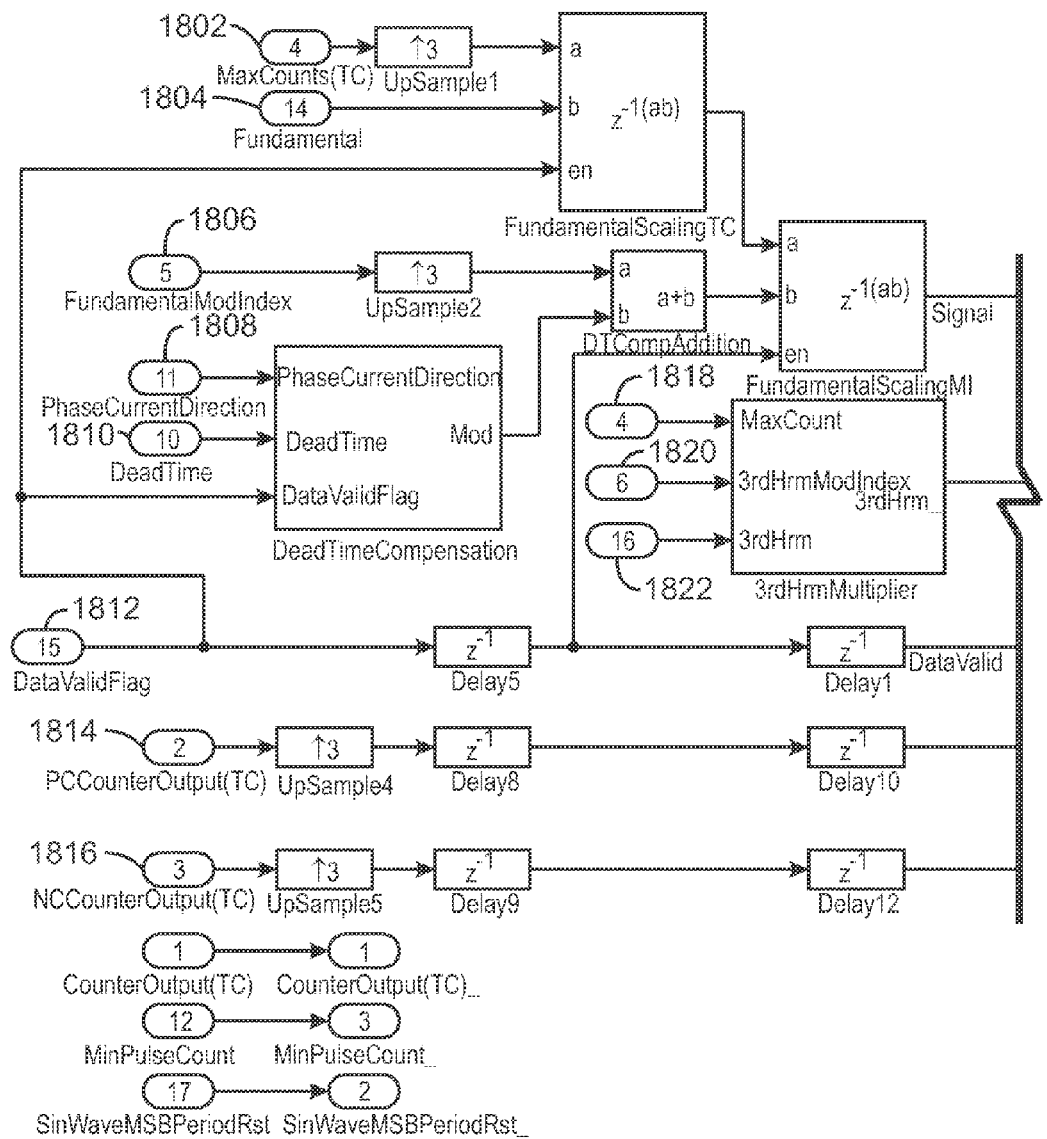
Figure 18B:
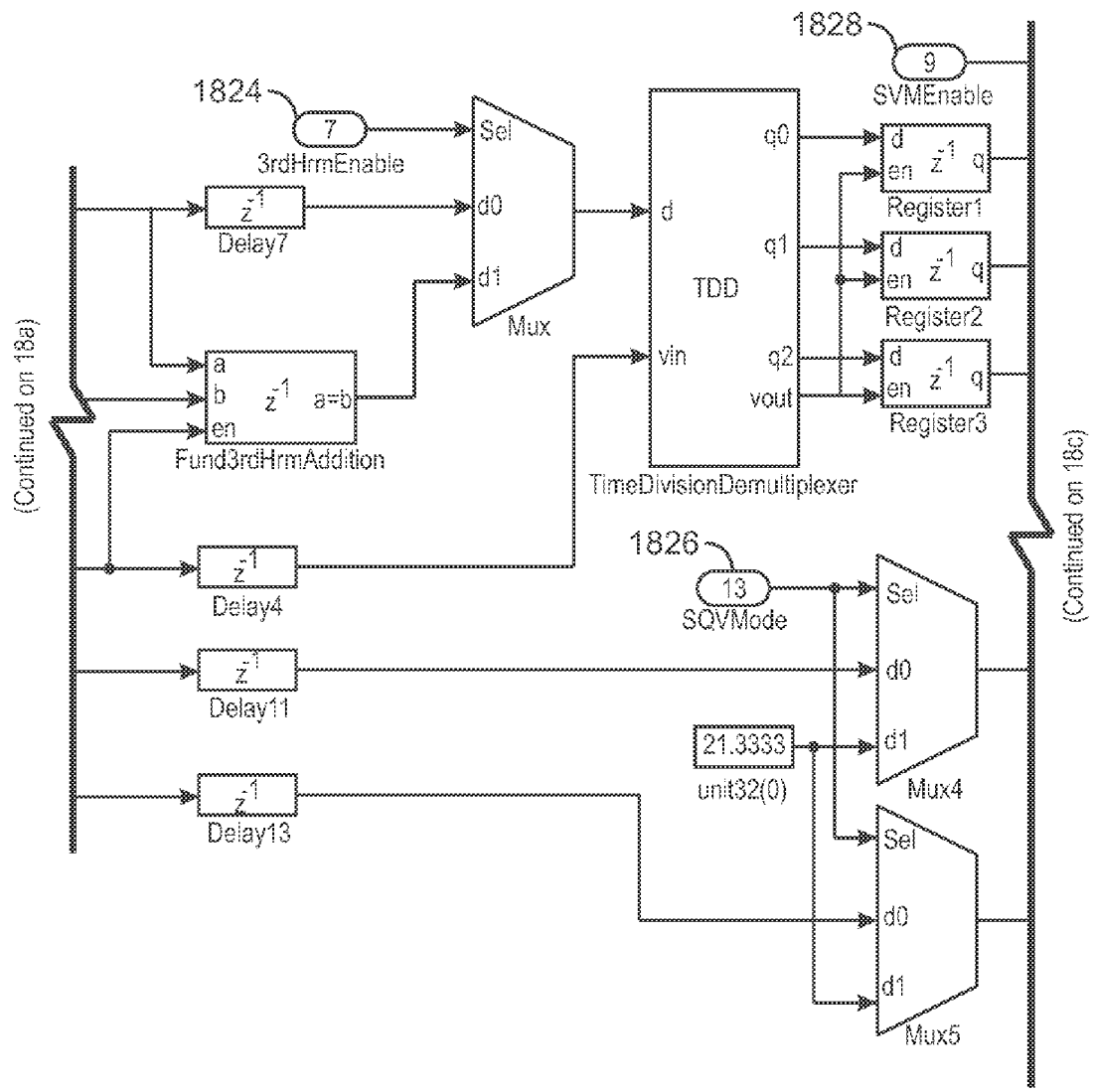
Figure 18C:
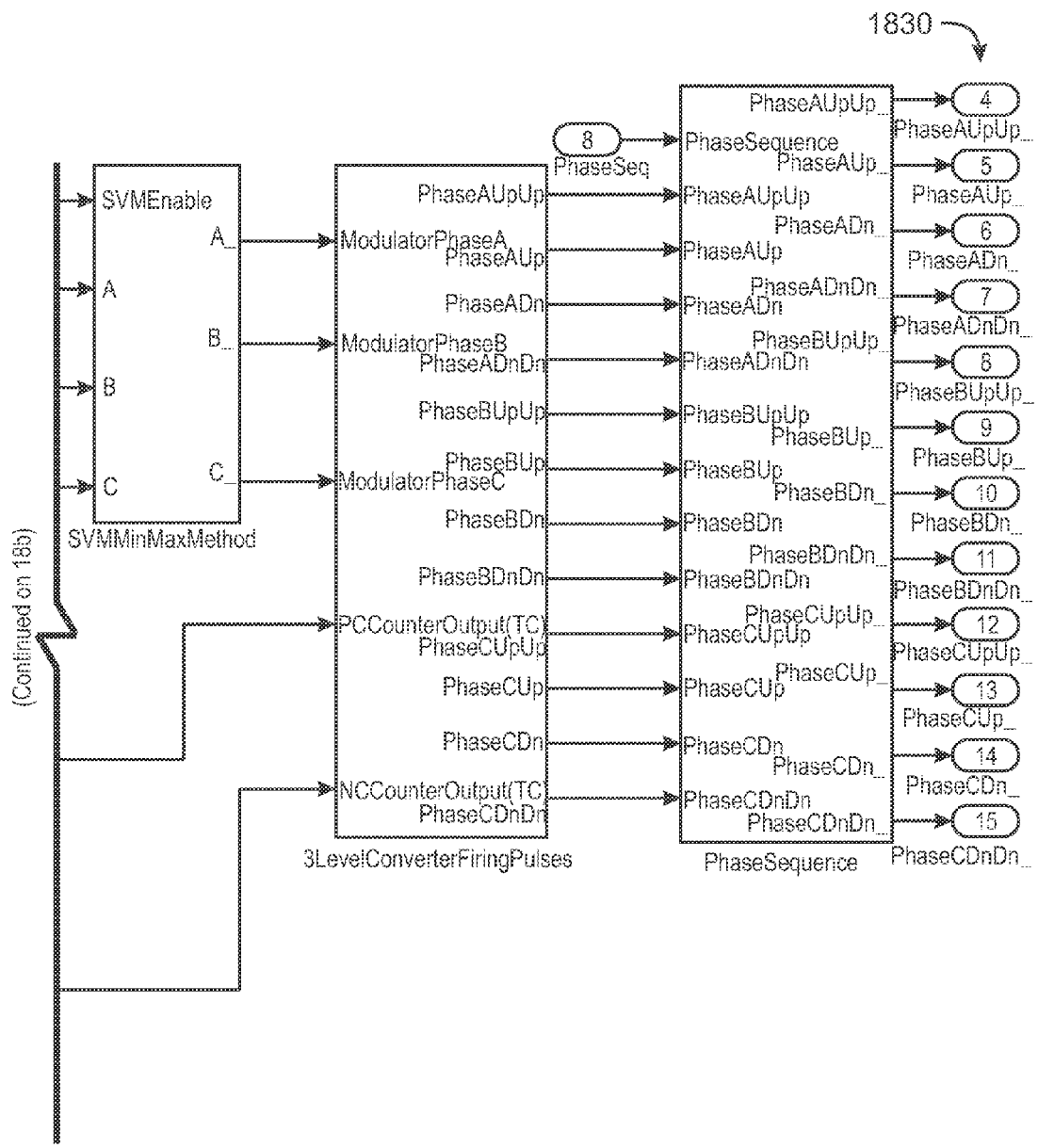
Figure 19A:
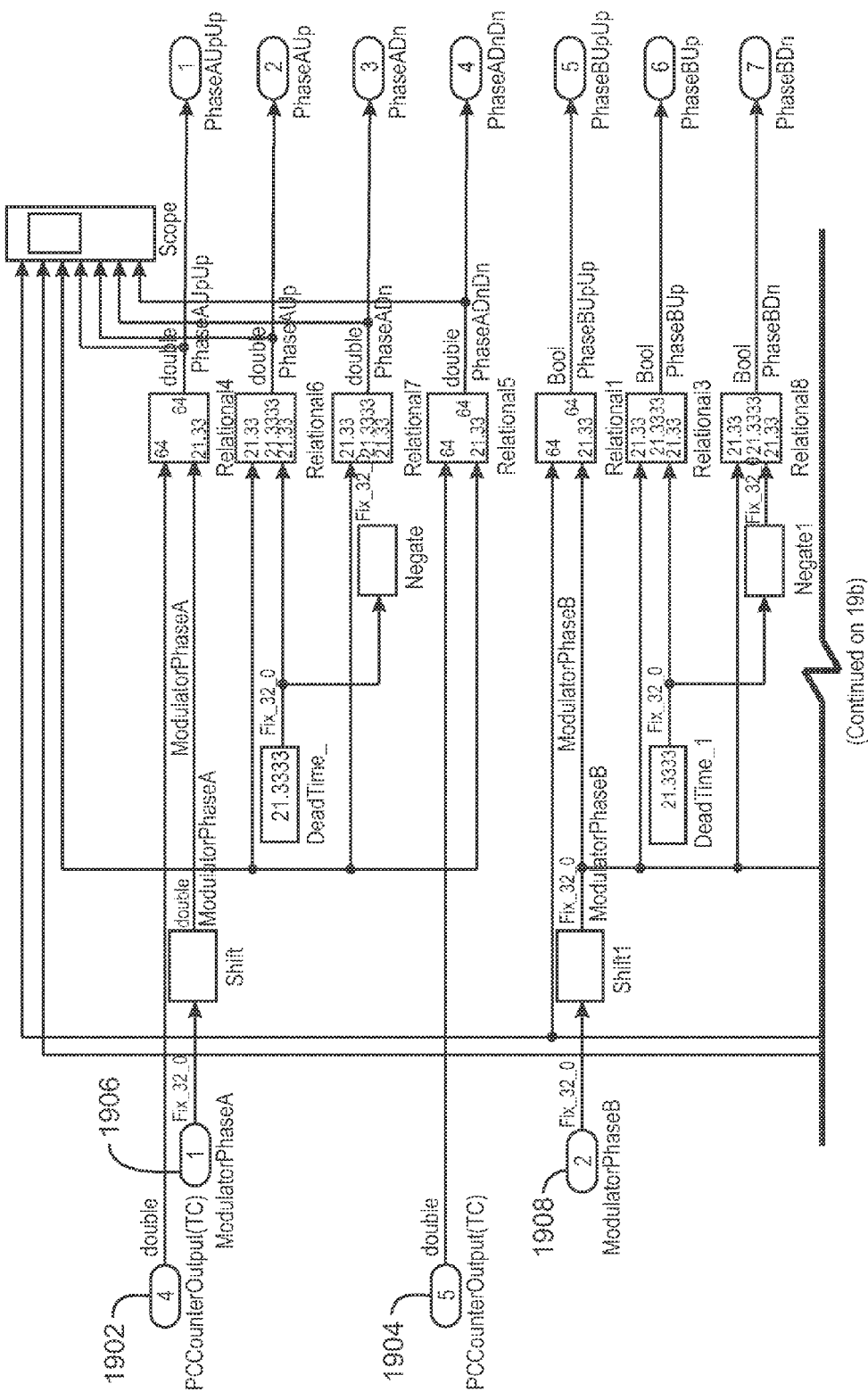
Figure 19B:
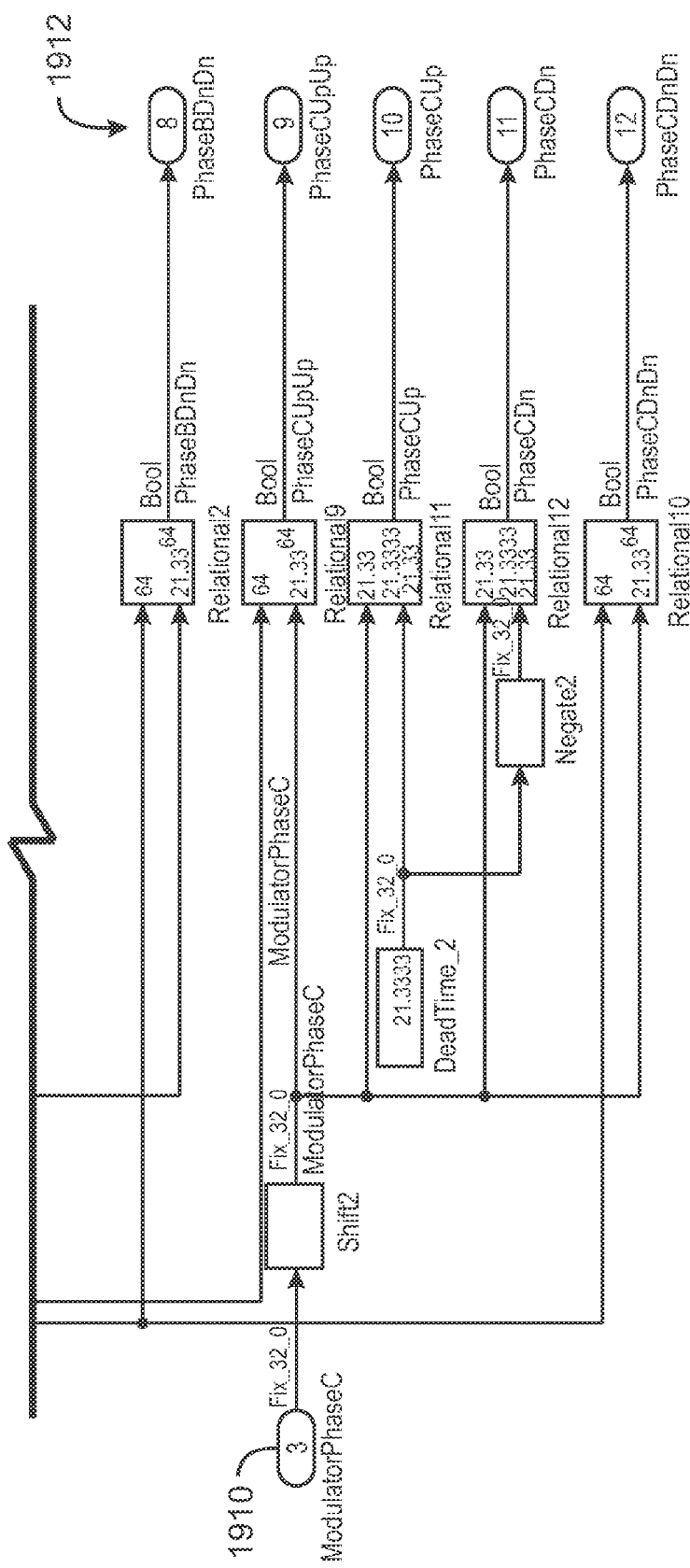
Figure 20A:
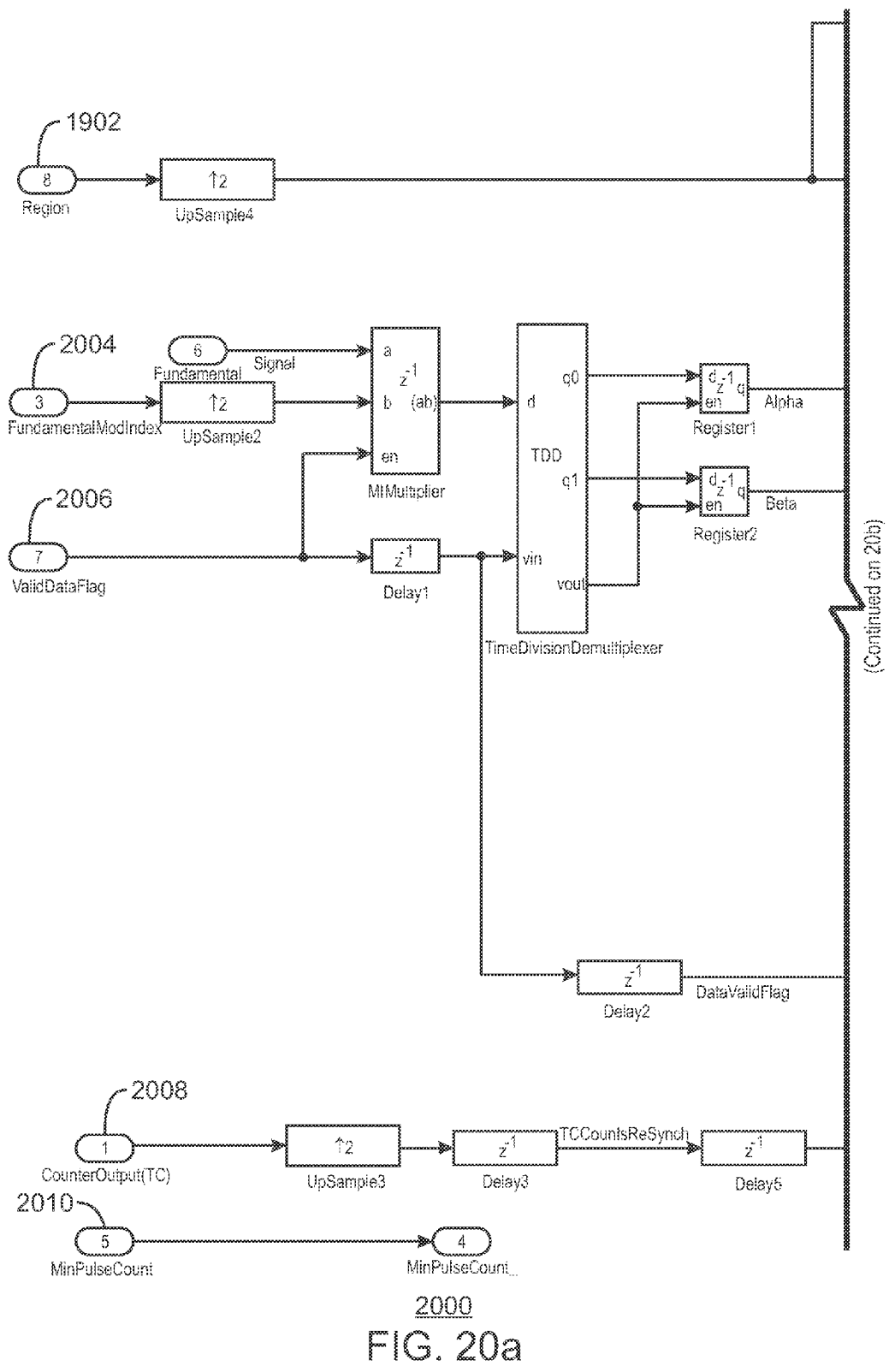
Figure 20B:
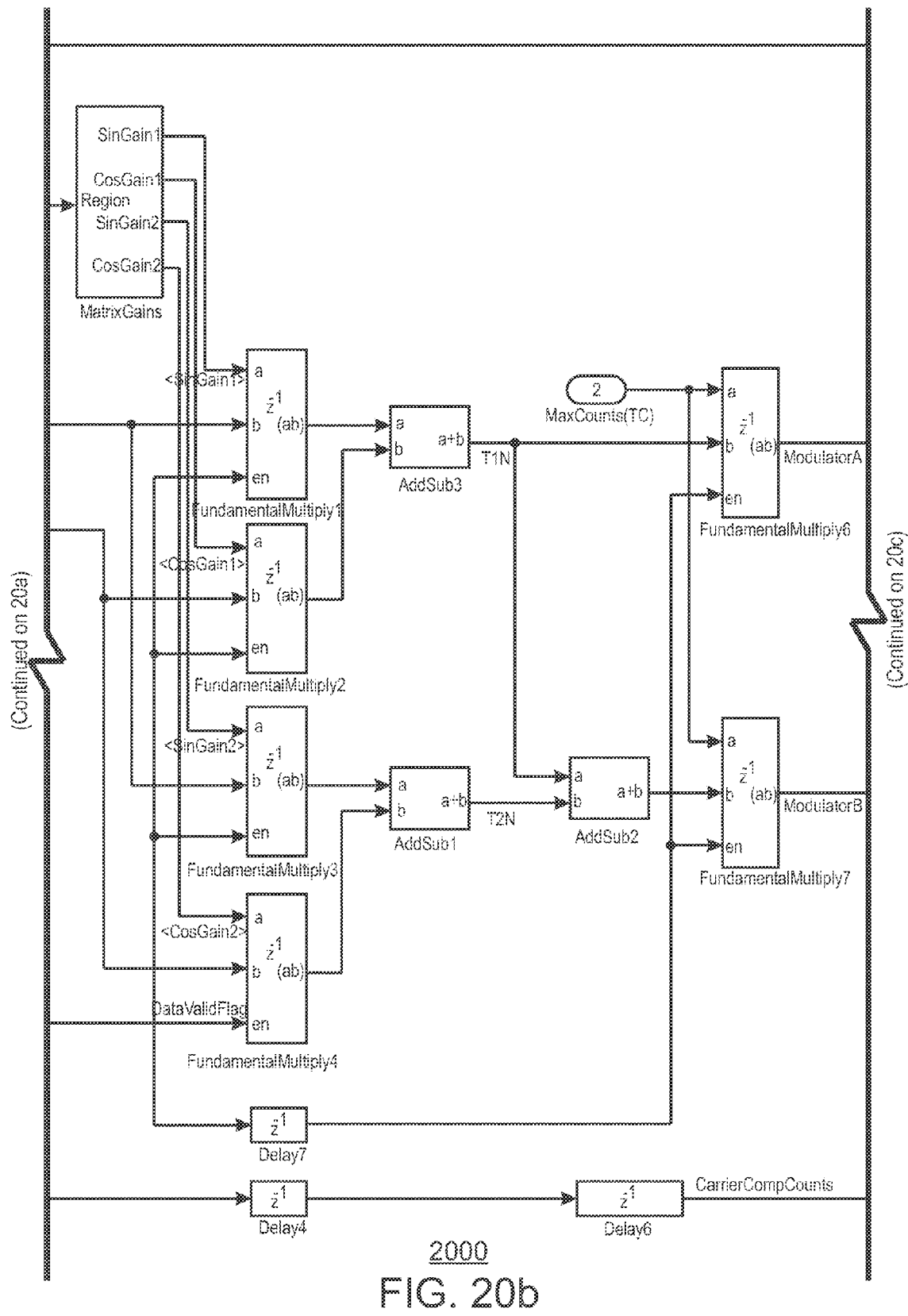
Figure 20C:
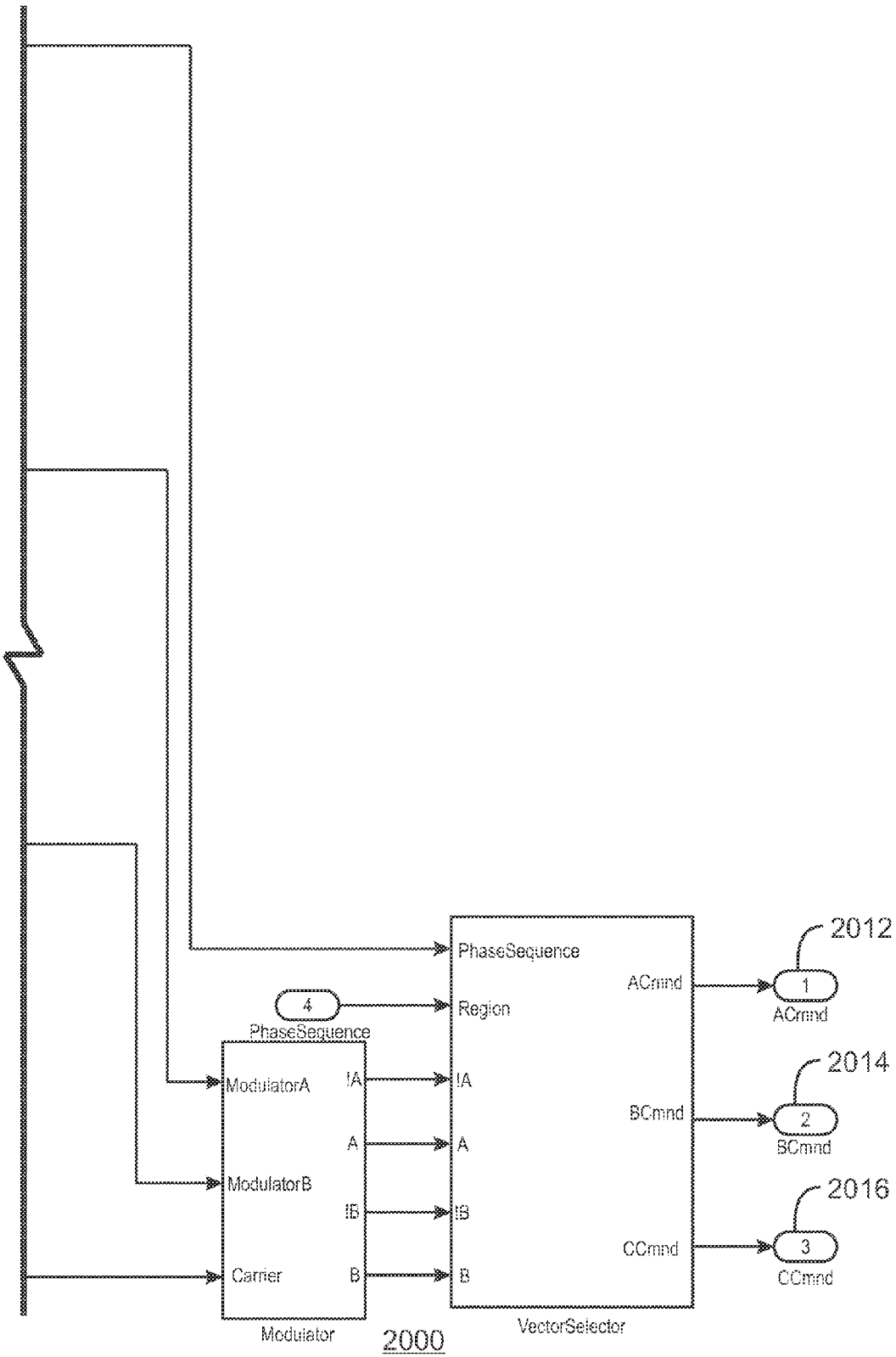
Figure 21:
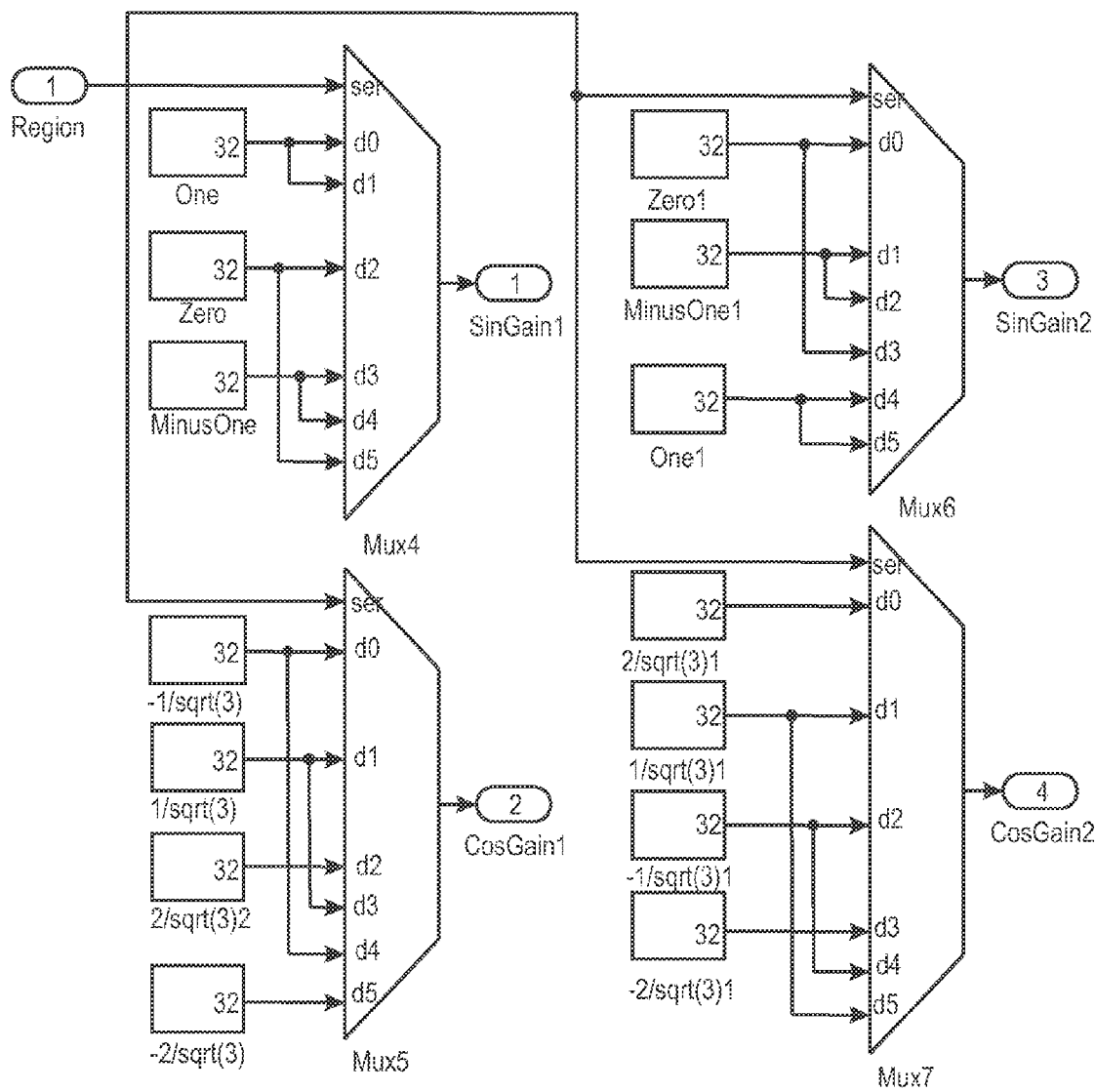
Figure 22:
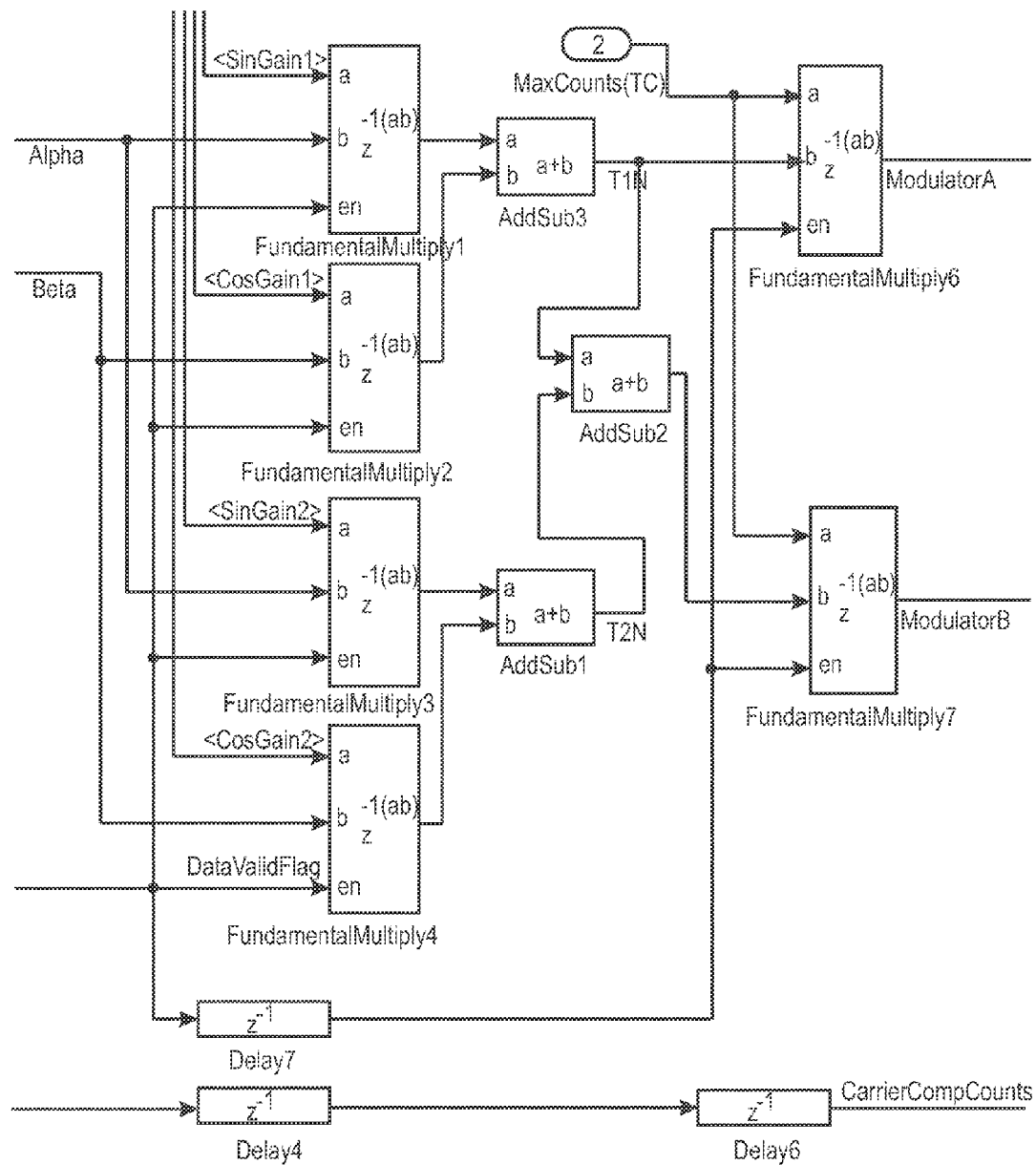
Figure 23:
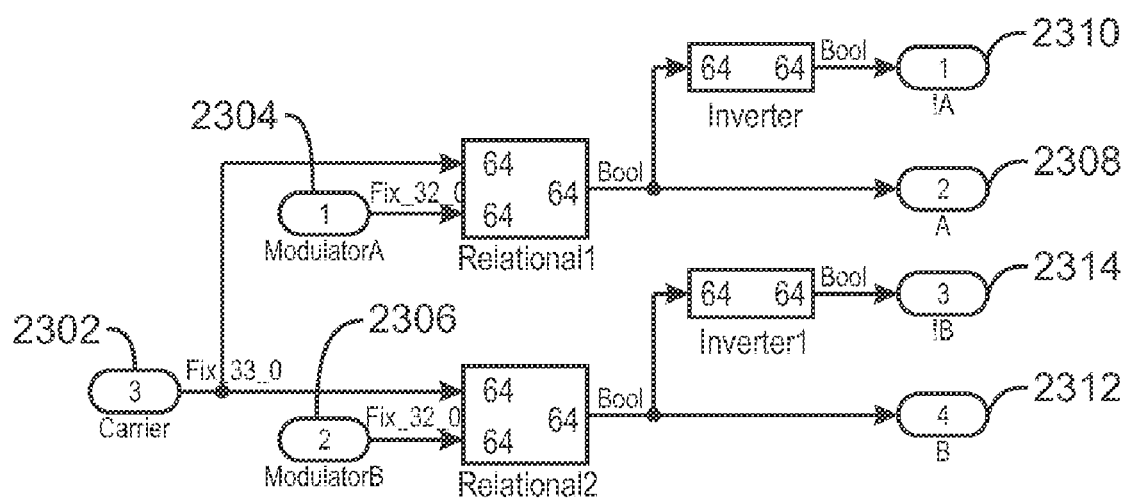
Figure 24:
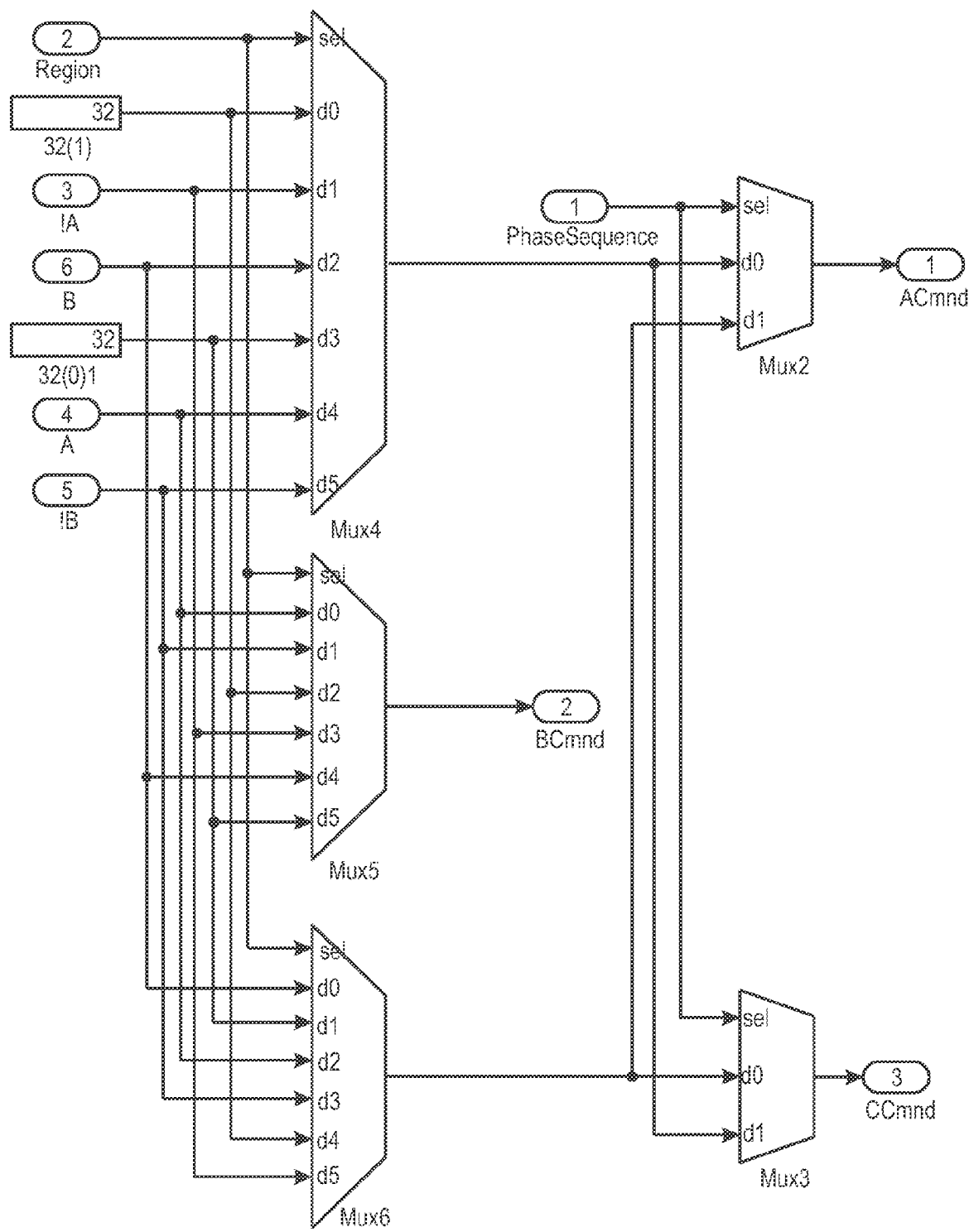
Figure 25A:
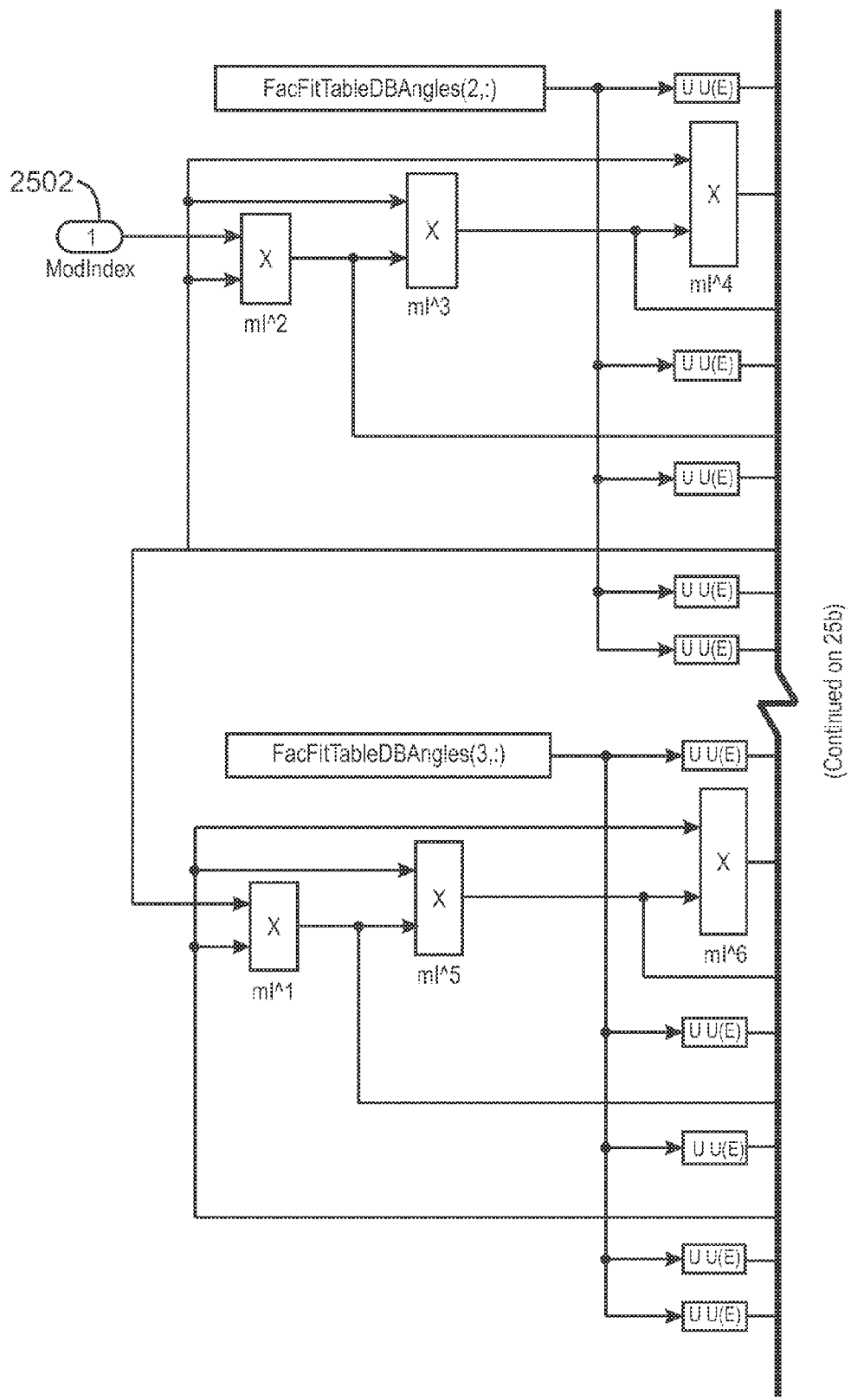
Figure 25B:
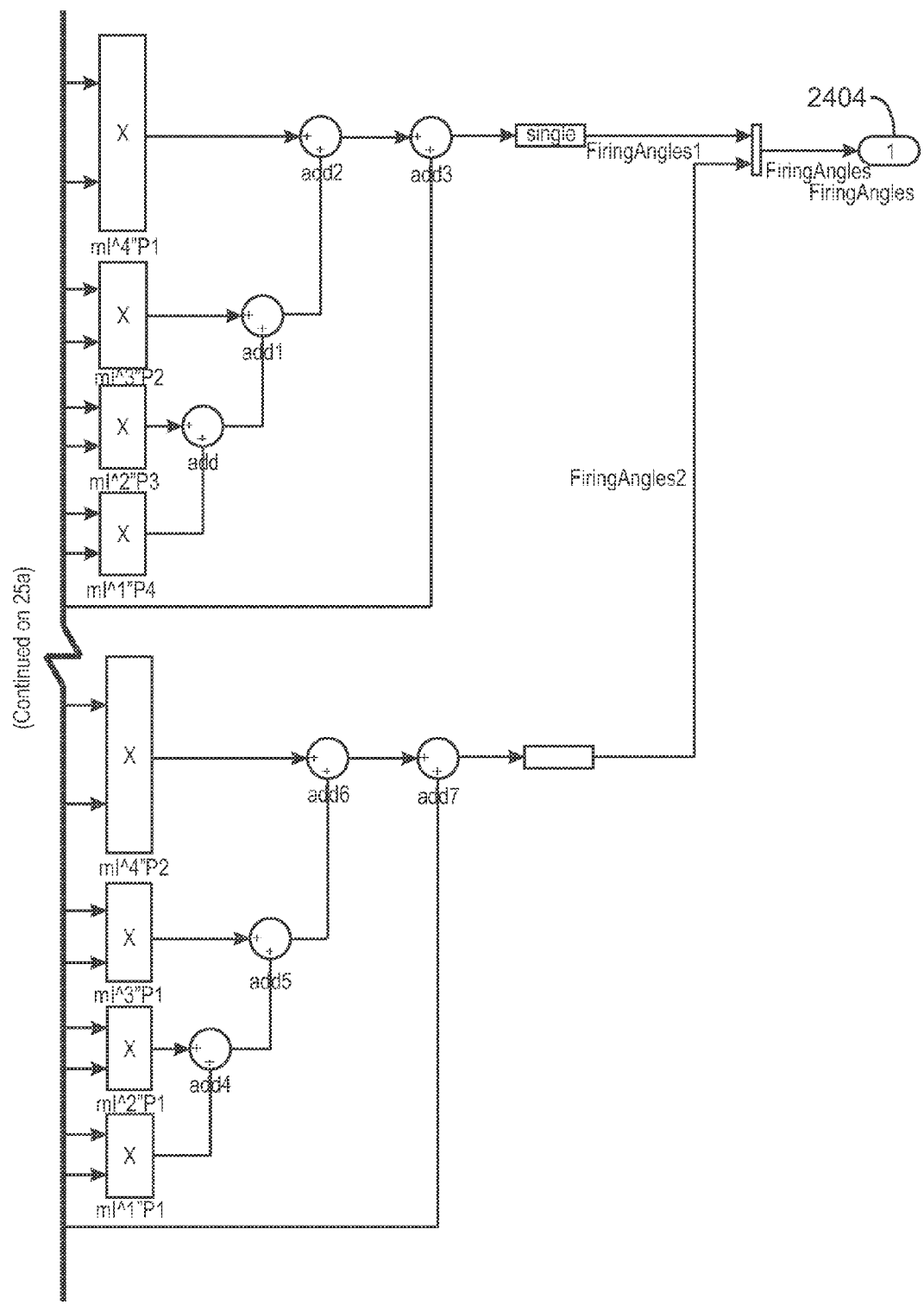
Figure 26:
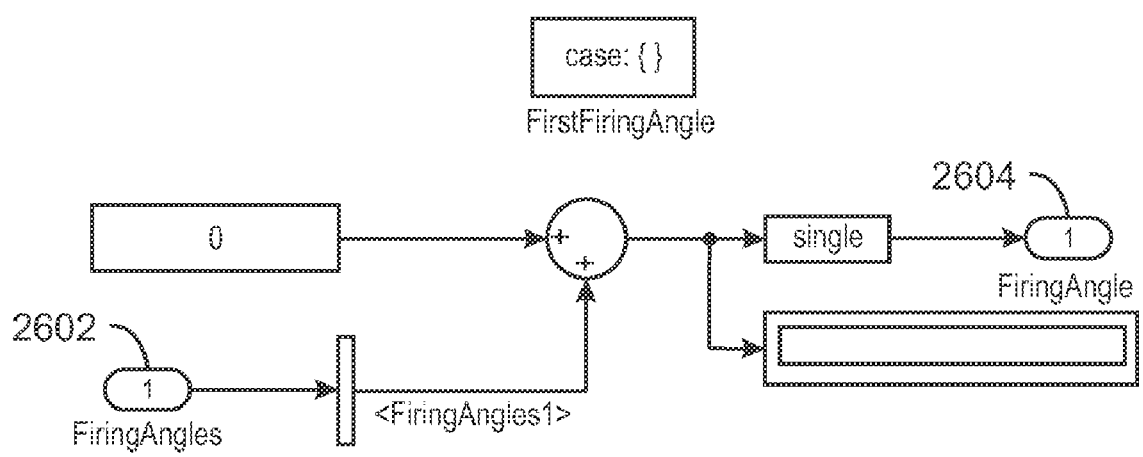
Figure 27:
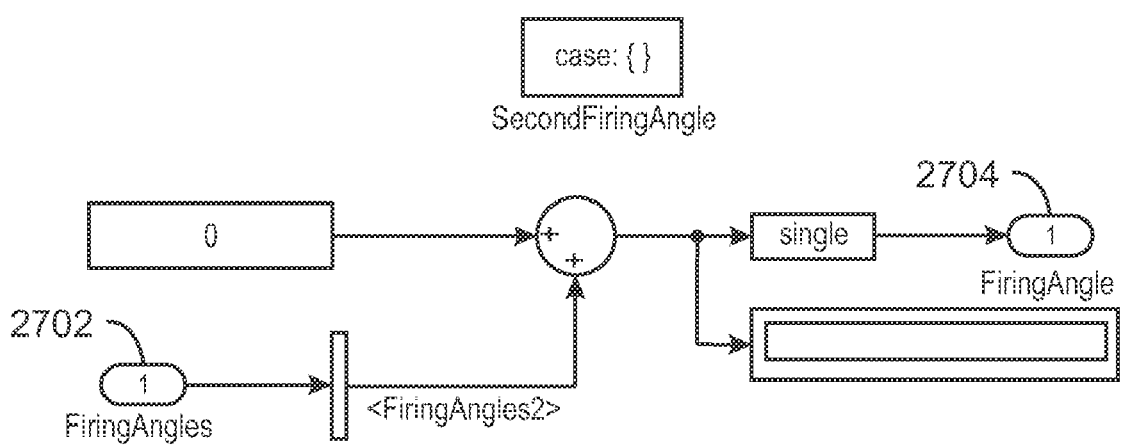
Figure 28:
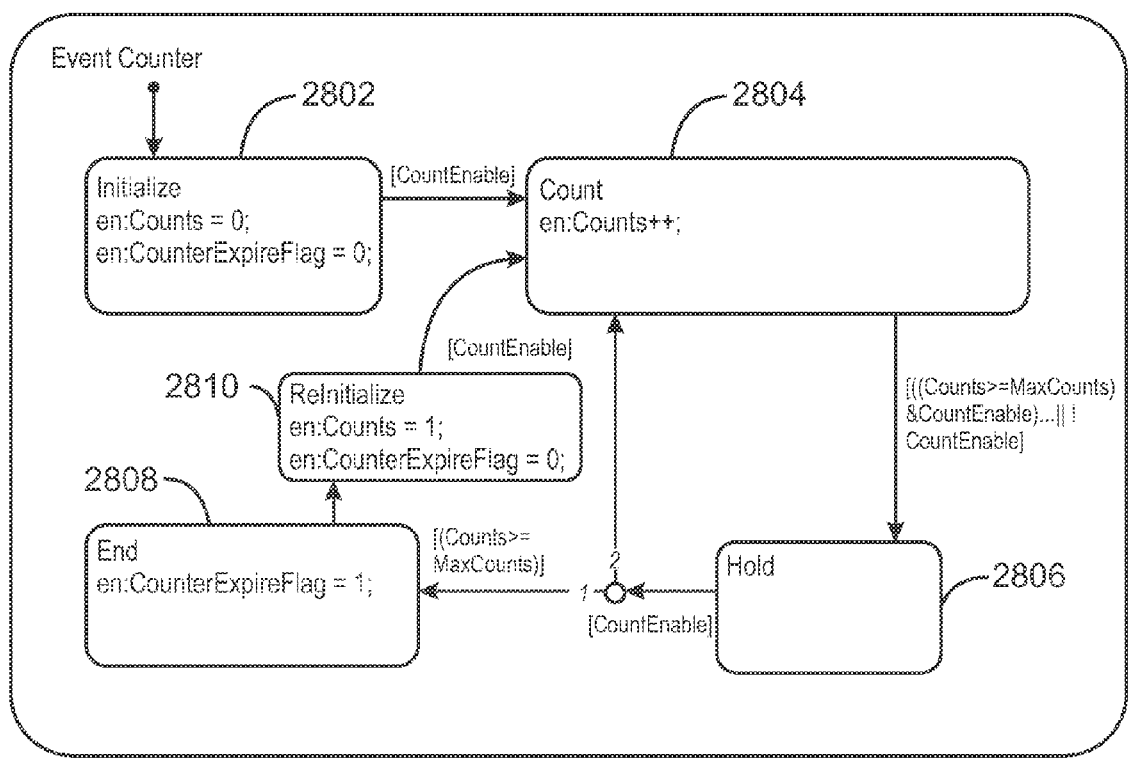
Figure 29:
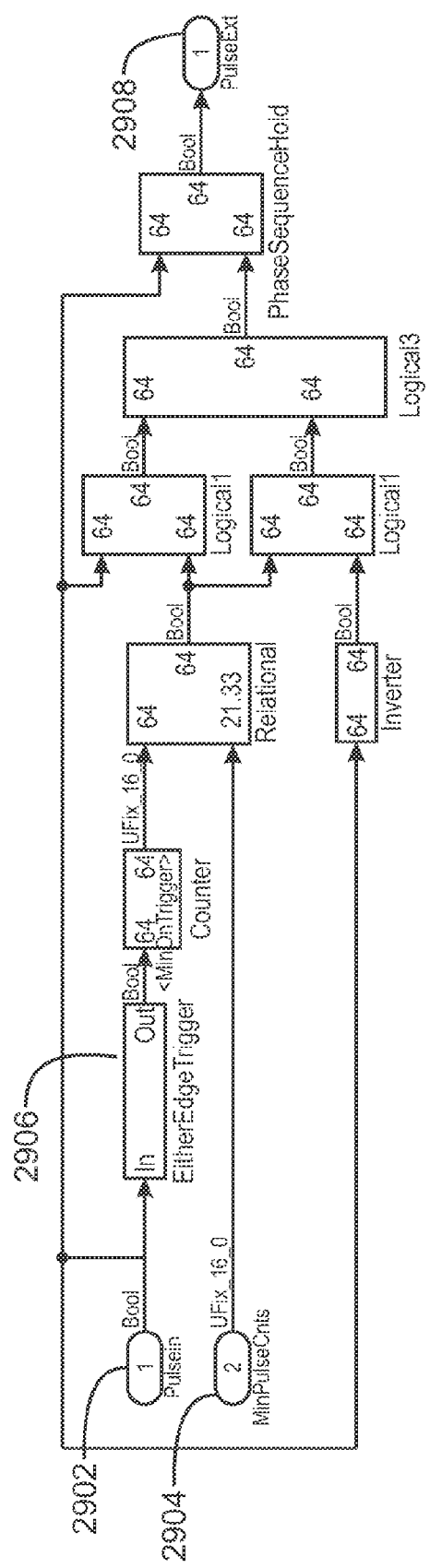
Figure 30:
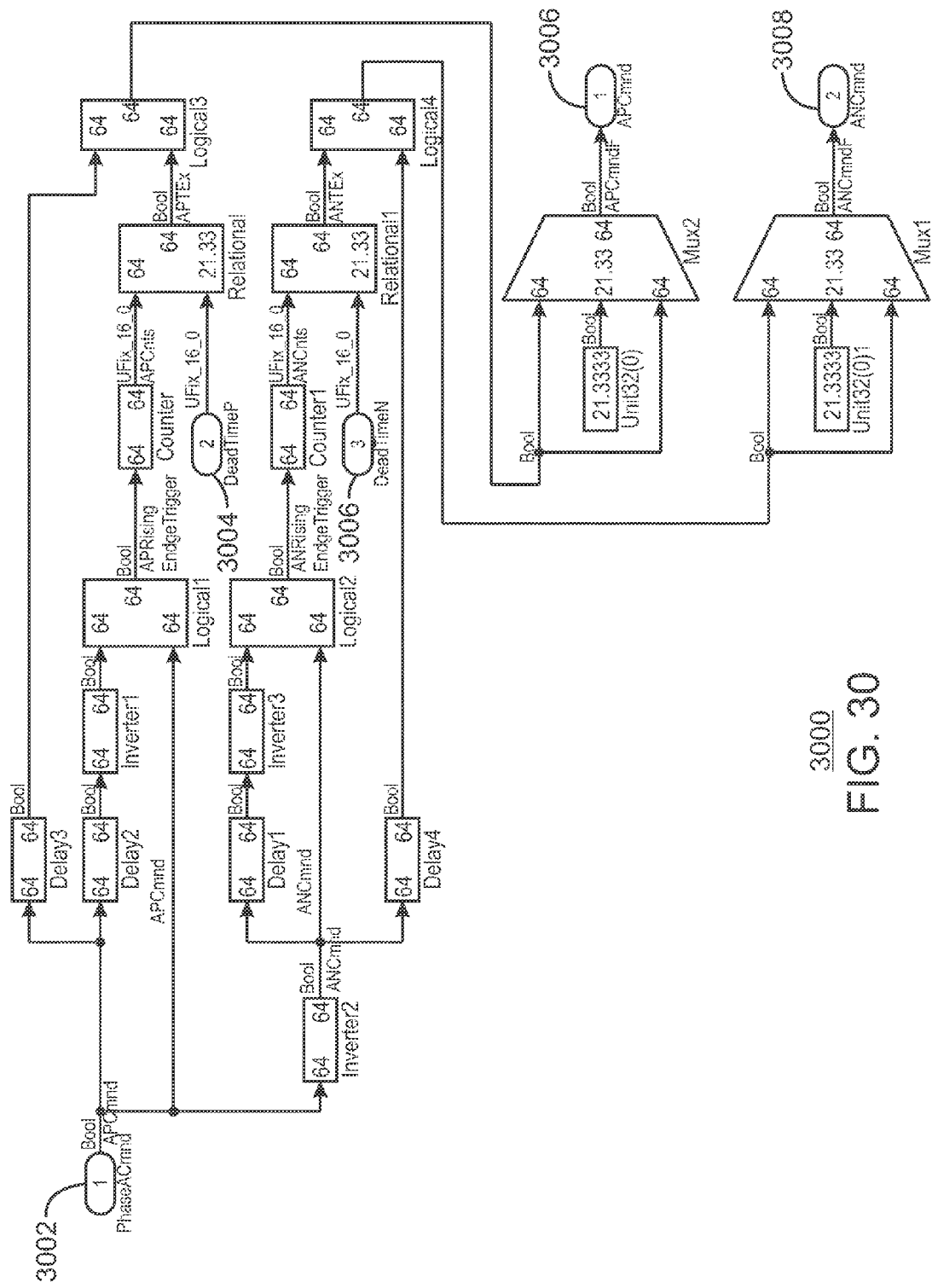
Figure 31A:
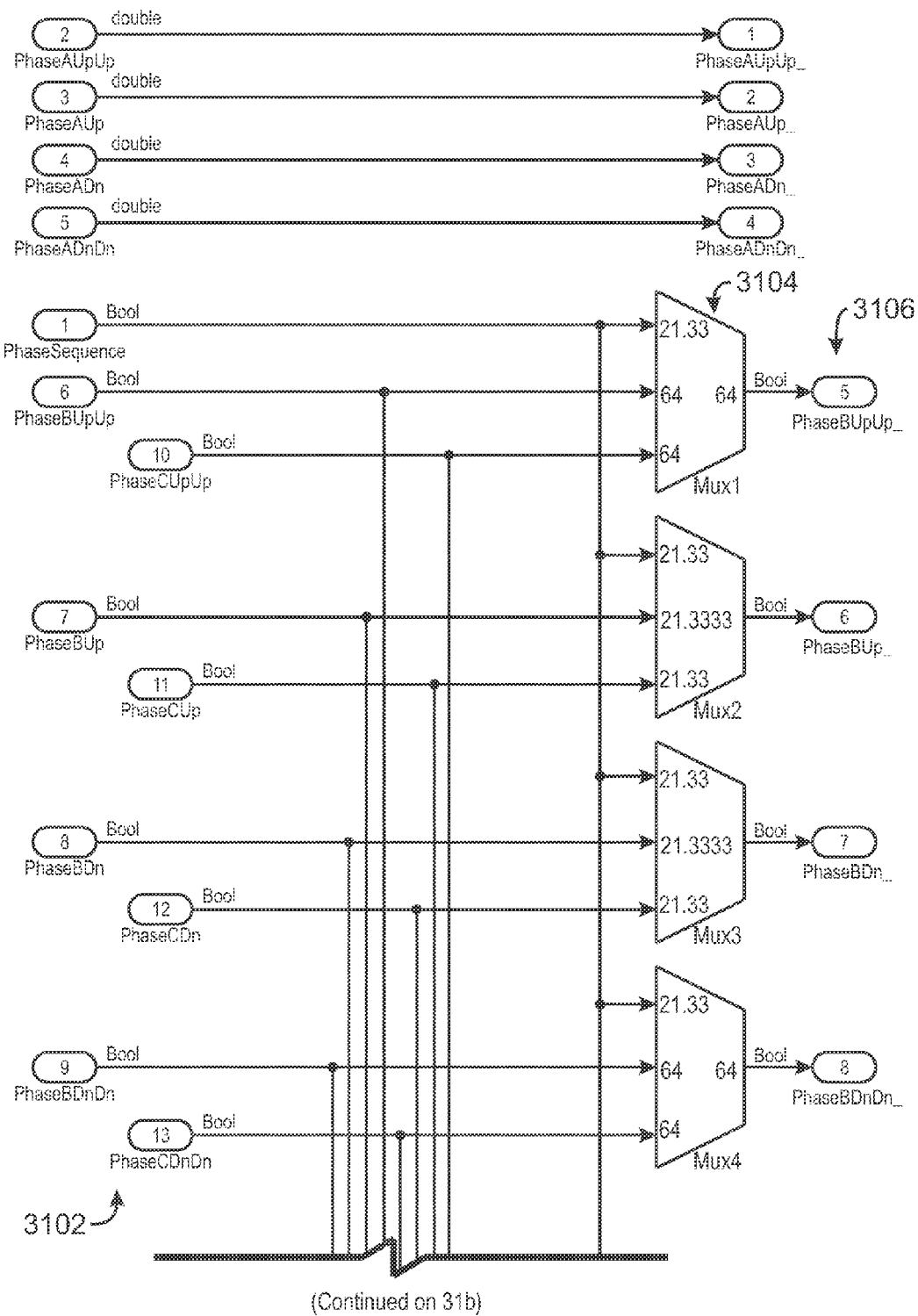
Figure 31B:
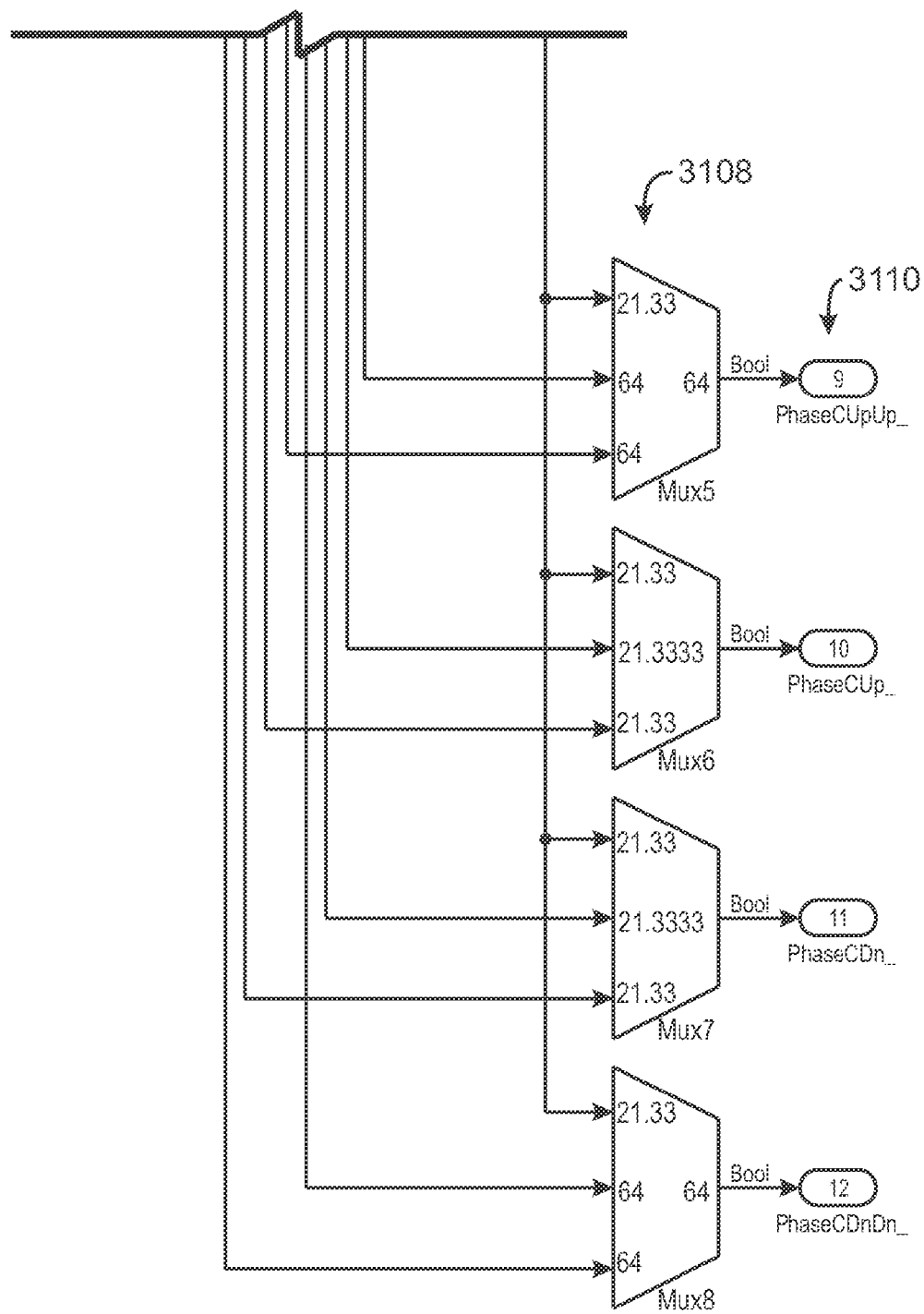
Figure 32:
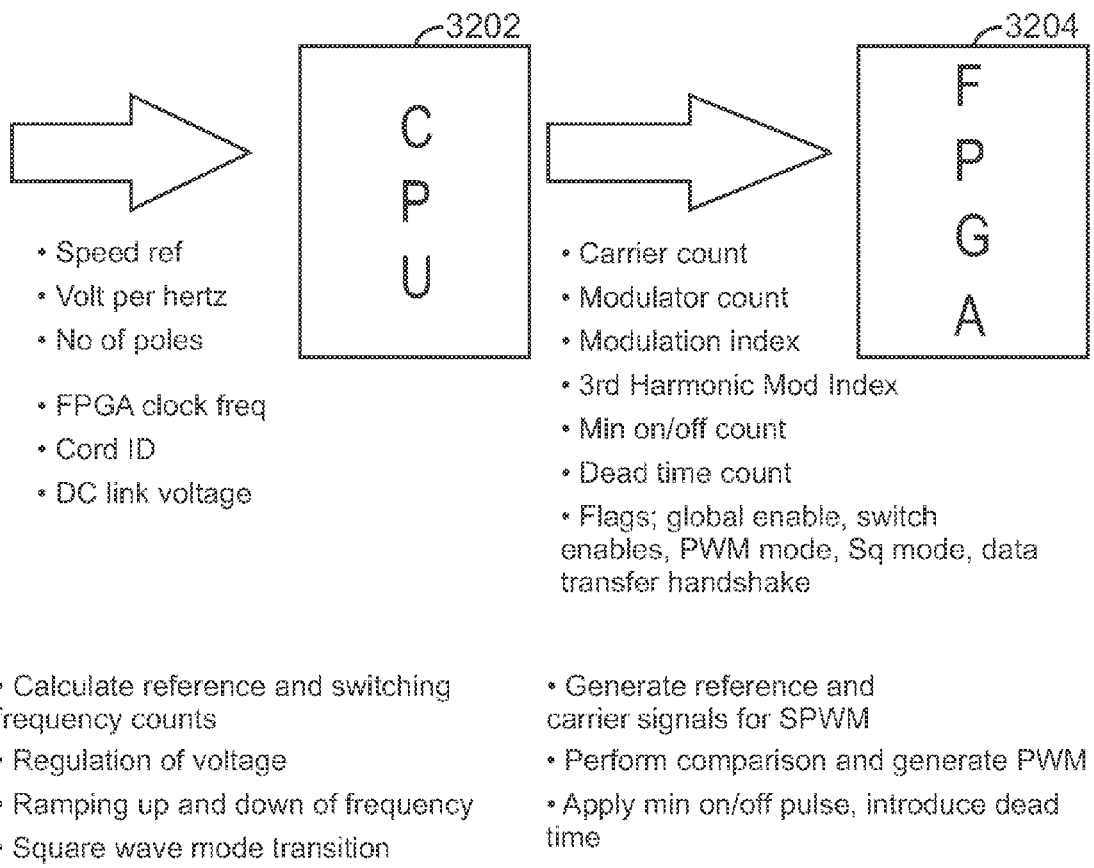
Figure 34:
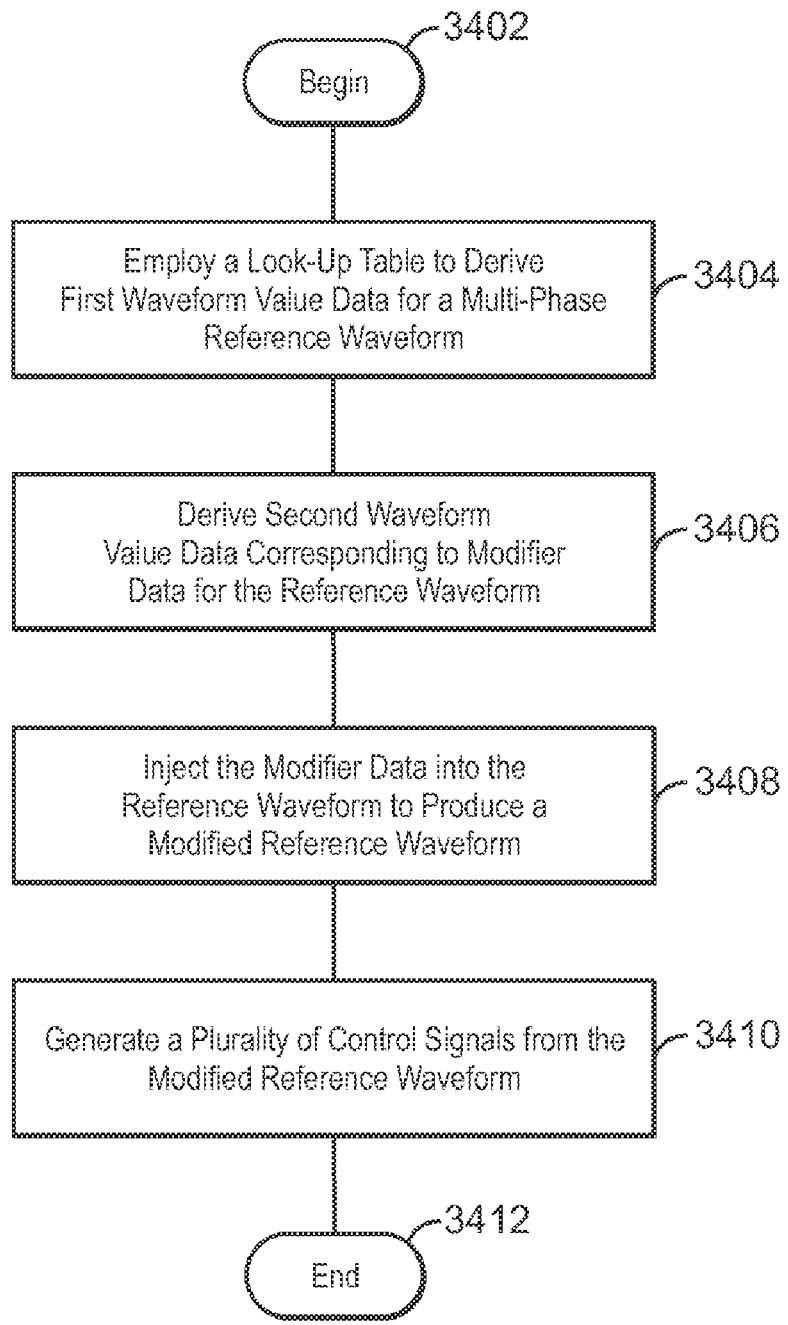
Figure 35:
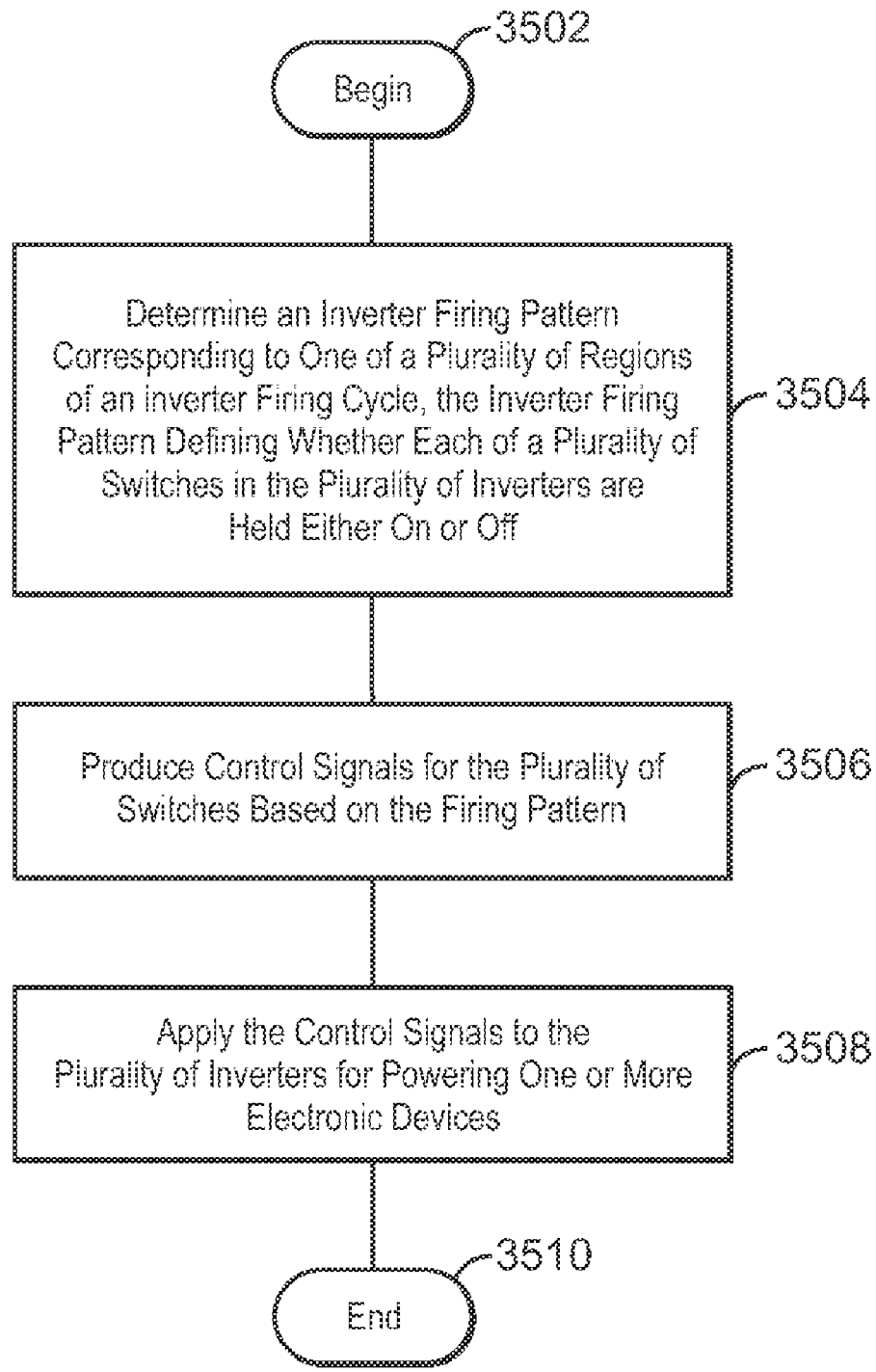
Figure 36:
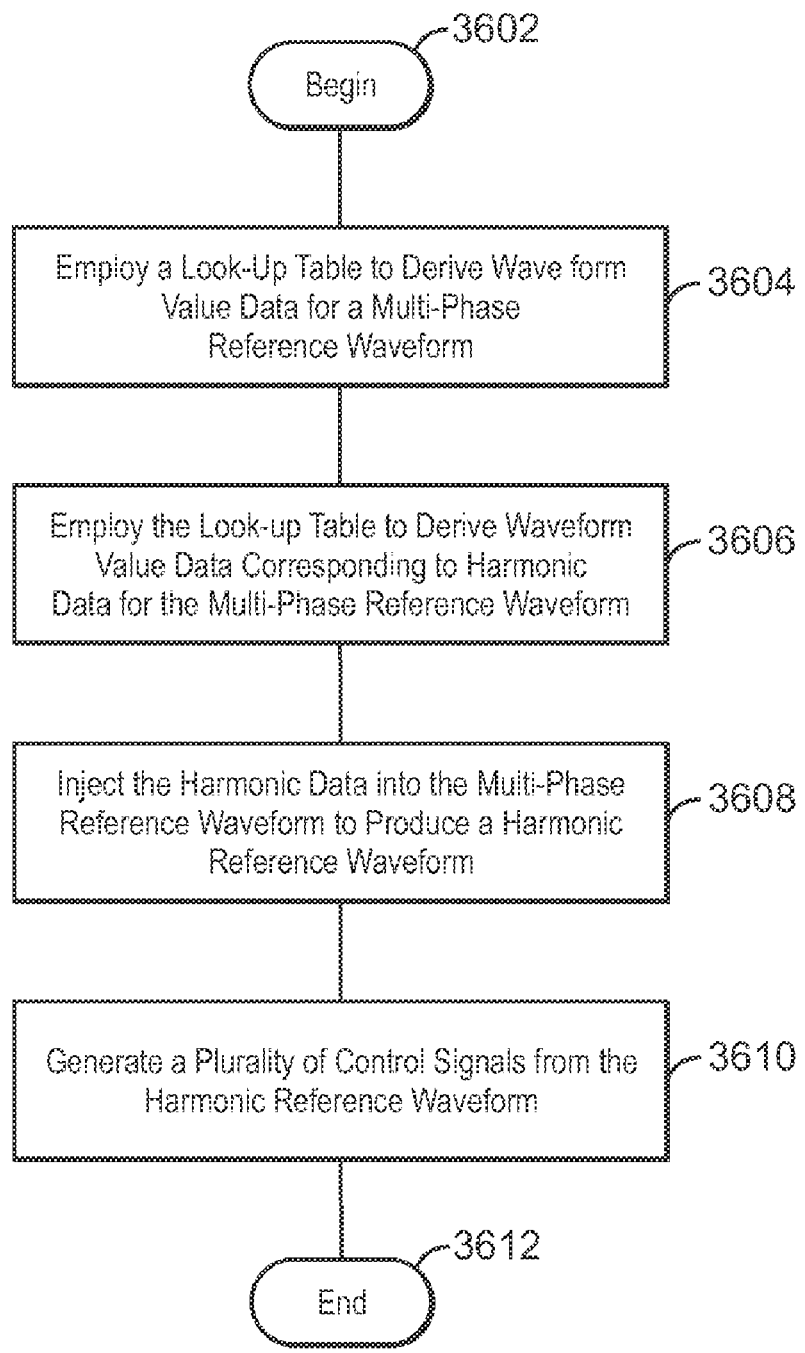

FIG. 3, which includes FIGS. 3a, 3b and 3c, is a block diagram of an inverter firing pattern waveform generator according to an exemplary embodiment of the invention;

FIG. 4, which includes FIGS. 4a, 4b and 4c, is a block diagram of an alternative inverter firing pattern waveform generator according to an exemplary embodiment of the invention;

FIG. 5 is a block diagram of a sample and hold block according to an exemplary embodiment of the invention:

FIG. 6 is a block diagram of an alternative sample and hold block according to an exemplary embodiment of the invention;

FIG. 7, which includes FIGS. 7a and 7b is a block diagram of a carrier generation block according to an exemplary embodiment of the invention;

FIG. 8, which includes FIGS. 8a and 8b, is a block diagram of an alternative carrier generation block according to an exemplary embodiment of the invention;

FIG. 9 is a diagram showing the division of a firing cycle into firing regions according to an exemplary embodiment of the invention;

FIG. 10, which includes FIGS. 10a and 10b, is a block diagram of another alternative carrier generation block according to an exemplary embodiment of the invention;

FIG. 11 is a graph showing reference points for carrier generation variation with respect to an output frequency according to an exemplary embodiment of the invention;

FIG. 12 is a block diagram of a modulator output frequency generation block according to an exemplar embodiment of the invention;

FIG. 13 is a graph showing reference points for a modulator generator variation with respect to an output frequency according to an exemplary embodiment of the invention;

FIG. 14, which includes FIGS. 14a, 14b and 14c, is a block diagram of a modulator and modifier generation block according to an exemplary embodiment of the invention;

FIG. 15, which includes FIGS. 15a, 15b and 15c, is a block diagram of a two-phase sin and cos (dq0) wave generation block according to an exemplary embodiment of the invention;

FIG. 16 is a block diagram of an exemplary zero (0) sequence modifier creating function circuit that is adapted to perform a zero (0) sequence modifier creating function according to the invention;

FIG. 17, which includes FIGS. 17a, 17b and 17c, is a block diagram of a pulse width modulation (PWM) generator block according to an exemplary embodiment of the invention;

FIG. 18, which includes FIGS. 18a, 18b and 18c, is a block diagram of another alternative pulse width modulation (PWM) generator block according to an exemplary embodiment of the invention;

FIG. 19, which includes FIGS. 19a and 19b, is a block diagram of a phase sequence block according to an exemplary embodiment of the invention;

FIG. 20, which includes FIGS. 20a, 20b and 20c, is a block diagram of still another alternative pulse width modulation (PWM) generator block according to an exemplary embodiment of the invention;

FIG. 21 is a block diagram of a matrix gain selector block according to an exemplary embodiment of the invention;

FIG. 22 is a block diagram of a modulator calculation block according to an exemplary embodiment of the invention:

FIG. 23 is a block diagram of a PWM modulation block according to an exemplary embodiment of the invention;

FIG. 24 is a block diagram of a vector selection block according to an exemplary embodiment of the invention;

FIG. 25, which includes FIGS. 25a and 25b, is a block diagram of a harmonic elimination firing block according to an exemplary embodiment of the invention;

FIG. 26 is a block diagram of a first state calculation block according to an exemplary embodiment of the invention;

FIG. 27 is a block diagram of a second state calculation block according to an exemplary embodiment of the invention;

FIG. 28 is a state diagram useful in explaining the operation of a harmonic elimination firing circuit according to an exemplary embodiment of the invention;

FIG. 29 is a block diagram of a pulse width modulation (PWM) command pulse extender block according to an exemplary embodiment of the invention;

FIG. 30 is a block diagram of a dead time extender block according to an exemplary embodiment of the invention;

FIG. 31, which includes FIGS. 31a and 31b, is a block diagram of an alternative dead time insertion block according to an exemplary embodiment of the invention;

FIG. 32 is a block diagram showing a control structure that includes an inverter control circuit according to an exemplary embodiment of the invention;

FIG. 33 is a table showing the use of inverter flags according to an exemplary embodiment of the invention;

FIG. 34 is a process flow diagram showing a method of producing signals to control an electronic device according to an exemplary embodiment of the invention;

FIG. 35 is a process flow diagram showing a method of operating an electronic device according to an exemplary embodiment of the invention; and FIG. 36 is a process flow diagram showing a method of producing signals to control an electronic device according to an exemplary embodiment of the invention.

DETAILED DESCRIPTION

Figure 1:
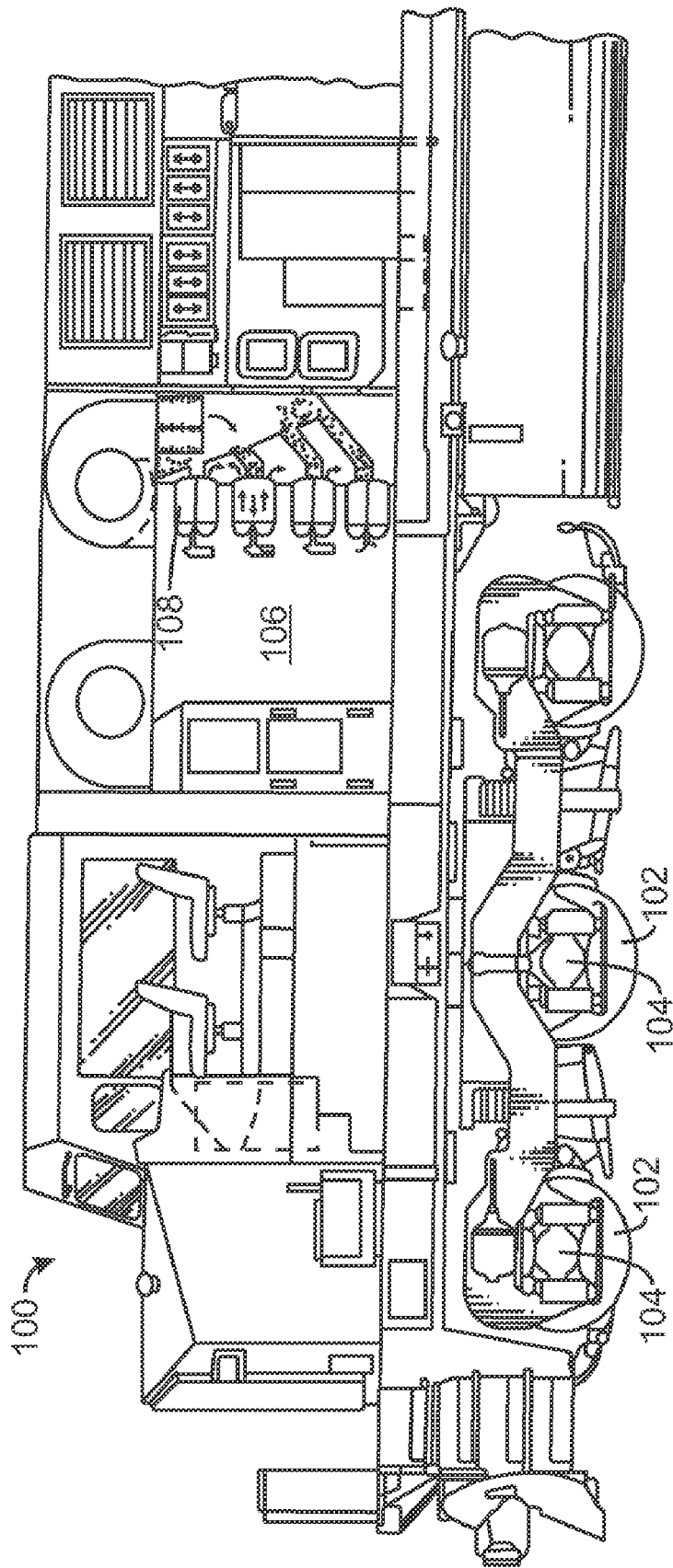
FIG. 1 is a block diagram of a diesel-electric locomotive that may employ an inverter control circuit according to an exemplary embodiment of the invention.

FIG. 1 is a block diagram of a diesel-electric locomotive that may employ an inverter control circuit according to an exemplary embodiment of the invention. The locomotive, which is shown in a simplified, partial cross-sectional view, is generally referred to by the reference number 100. A plurality of traction motors, not visible in FIG. 1, are located behind drive wheels 102 and coupled in a driving relationship to axles 104. A plurality of auxiliary motors, not visible in FIG. 1, are located in various locations on the locomotive, and coupled with various auxiliary loads like blowers or radiator fans. The motors may be alternating current (AC) electric motors. As explained in detail below, the locomotive 100 may include a plurality of electrical inverter circuits for controlling electrical power to the motors.

Figure 2:
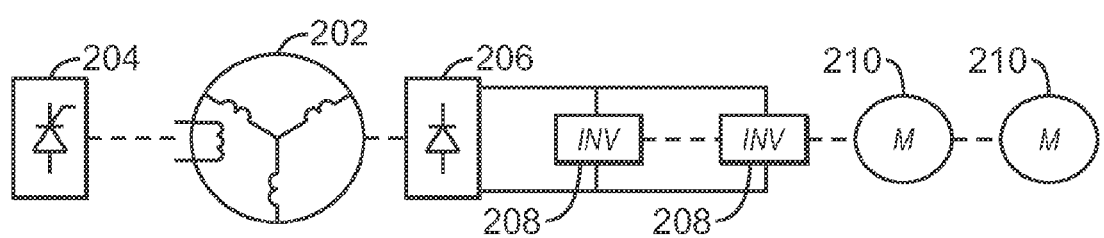
FIG. 2 is a block diagram of a power system according to an exemplary embodiment of the invention.

FIG. 2 is a block diagram of a power system according to an exemplary embodiment of the invention. The power system, which is generally referred to by the reference number 200, may be used to control AC power to the locomotive 100 shown in FIG. 1. The power system 200 includes an alternator 202 driven by an on-board internal combustion engine such as a diesel engine (not shown). The power output of the alternator 202 is regulated by field excitation control indicated by a field control 204. Electrical power from alternator 202 is rectified by a rectifier 206, and coupled to one or more inverters 208. The inverters 208 may use high power IGBTs to convert the DC power to AC power, variable frequency, or variable voltage amplitude for application to one or more AC motors 210.

Referring again to FIG. 1, electrical power circuits are at least partially located in an equipment compartment 106. The control electronics for the inverters 208 and the field control 204 as well as other electronic components may be disposed on circuit boards held in racks in the equipment compartment 106. Within the equipment compartment 106, the high power IGBT semiconductor devices used in the power conversion may be mounted to air-cooled heat sinks 108.

FIG. 3 is a block diagram of an inverter control circuit 300 according to an exemplary embodiment of the invention. As explained in detail below, the inverter control circuit 300 generates waveforms that control the firing of the inverters 208 (FIG. 2). Those of ordinary skill in the art will appreciate that the functional blocks and devices shown in FIG. 3 may comprise hardware elements including circuitry, software elements including computer code stored on a tangible, machine-readable medium, or a combination of both hardware and software elements. Additionally, the functional blocks and devices of the inverter control circuit 300 are but one example of functional blocks and devices that may be implemented in an exemplary embodiment of the invention. Those of ordinary skill in the art would readily be able to define specific functional blocks based on design considerations for a particular application.

In an exemplary embodiment of the invention, the inverter control circuit 300 operates under the control of a main central processing unit (CPU)/Supervisory control unit external to the inverter control circuit 300. The use of the inverter control circuit 300 in conjunction with a main CPU/Supervisory control unit is explained in greater detail below with reference to FIG. 32. Moreover, the inverter control circuit 300 may be implemented using a field programmable gate array (FPGA) that may be controlled by and synchronized with an external main CPU/Supervisory control unit.

The inverter control circuit 300 includes a sample and hold block 302, a carrier generation block 304, a modulator trigger generation block 306, a modulator and modifier generation block 308, a pulse Width modulation (PWM) modulator block 310, an extend pulse generation block 312, and a dead time insertion block 314. The operation of each of these functional blocks is explained in detail below.

In addition, the inverter control circuit 300 may comprise an additional subsystem that is adapted to turn an associated converter off in case of an emergency situation. Examples of emergency situations that may result in the converter being turned off include an overcurrent condition, an overvoltage condition, detection of abnormal operation or the like.

FIG. 4 is a block diagram of an alternative inverter firing pattern waveform generator according to an exemplary embodiment of the invention. As explained in detail below, the inverter control circuit 400 generates waveforms that control the firing of the inverters 208 (FIG. 2). Those of ordinary skill in the art will appreciate that the functional blocks and devices shown in FIG. 4 may comprise hardware elements including circuitry, software elements including computer code stored on a tangible, machine-readable medium or a combination of both hardware and software elements. Additionally, the functional blocks and devices of the inverter control circuit 400 are but one example of functional blocks and devices that may be implemented in an exemplary embodiment of the invention. Those of ordinary skill in the art would readily be able to define specific functional blocks based on design considerations for a particular application.

In an exemplary embodiment of the invention, the inverter control circuit 400 operates under the control of a main central processing unit (CPU)/Supervisory control unit external to the inverter control circuit 400. The use of the inverter control circuit 400 in conjunction with a main CPU/Supervisory control unit is explained in greater detail below with reference to FIG. 27. Moreover, the inverter control circuit 400 may be implemented using an FPGA that may be controlled by and synchronized with an external main CPU/Supervisory control unit.

In the exemplary embodiment shown in FIG. 4, the inverter control circuit 400 includes a sample and hold block 402, a carrier generation block 404, a modulator trigger generation block 406, a sine and cosine wave (DQ) oscillator generation block 408, a pulse width modulation (PWM) modulator block 410, and an extend pulse generation block 412. The operation of each of these functional blocks is explained in detail below. The exemplary embodiment shown in FIG. 4 employs 2× time multiplexing and provides improved control and resolution of the output frequency.

In addition, the inverter control circuit 400 may comprise an additional subsystem that is adapted to turn an associated converter off in case of an emergency situation. Examples of emergency situations that may result in the converter being turned off include an overcurrent condition, an overvoltage condition, detection of abnormal operation or the like.

In an exemplary embodiment, the sine and cosine wave (DQ) oscillator generation block 408 includes an alpha/beta (dq0) reference block. The reference block generates alpha/beta (dq0) modulation reference that is used to calculate the timing variation of the switching of the inverter for the different regions. The output frequency may be specified by a top level control. The alpha/beta (dq0) reference block 1012 is described in greater detail herein.

FIG. 5 is a block diagram of a sample and hold block 500 according to an exemplary embodiment of the invention. The sample and hold block 500 receives an input parameter latch trigger signal 502 and a latch data register flag 504. The input parameter latch trigger signal 502 and the latch data register flag 504 are used to latch the command input signals from the CPU/Supervisory control using the $3^{rd}$ harmonic modulation block 506, the fundamental modulation block 508, the $3^{rd}$ harmonic enable block 510, the first maximum count block 512, the second maximum count block 514 and the phase sequence block 516. The values are latched and synchronized to be used in the carrier generation block 304, the modulator trigger generation block 306, the modulator and modifier generation block 308, the pulse width modulation (PWM) modulator block 310, the extend pulse generation block 312 and the dead time insertion block 314.

In an exemplary embodiment of the invention, the sample and hold block 500 samples inputs from the main CPU/Supervisory control unit external to the inverter control circuit 300. The inputs sampled by the sample and hold block 500 are held up until at least one cycle out the last commanded output frequency has been completed. Moreover, an exemplary embodiment of the sample and hold block 500 may be adapted to perform the same function based on ½, ¼, or every time the CPU/Supervisory control updates the control parameters and/or cycle intervals. Such an exemplary embodiment allows the output frequency to be updated two times faster, four times faster, or as fast as the CPU/Supervisory control updates are available. This may result in non-symmetric output waveform while new values are applied before a complete cycle has finished.

FIG. 6 is a block diagram of an alternative sample and hold block 600 according to an exemplary embodiment of the invention. The sample and hold block 600 samples and holds values from the CPU/Supervisory control. Some signals are eliminated relative to the exemplary sample and hold block 500 (FIG. 5) for the proposed firing pattern, like the $3^{rd}$ harmonic modulation index, the $3^{rd}$ harmonic injection enable or SVM Enable.

The sample and hold block 600 receives an input parameter latch trigger signal 602 and a latch data register flag 604. The input parameter latch trigger signal 602 and the latch data register flag 604 are used to latch the command input signals from the CPU/Supervisory control, maximum count value for the carrier generator and maximum count value for the modulator reference generator. The rest of the inputs from the CPU/Supervisory control like, modulation index, synchronous PWM generation enable flag and phase sequence flag are latch as soon as the new values are available.

Moreover, an exemplary embodiment of the sample and hold block 600 may be adapted to perform the same function based on ½, ¼, or every time the CPU/Supervisory control updates the control parameters and/or cycle intervals. Such an exemplary embodiment allows the output frequency to be updated two times faster, four times faster, or as fast as the CPU/Supervisory control updates are available. This may result in non-symmetric waveform output while new values are applied before a complete cycle has finished.

FIG. 7 is a block diagram of an exemplary embodiment of a carrier generation block 700. The carrier generation block 700 is adapted to provide a single carrier that can be used for control of a two-level converter. The carrier generation block 700 receives an enable signal 702, a reset signal 704, a period reset signal 706, an enable synchronization signal 708, and a maximum count signal 710. A falling edge trigger block 712 generates a period complete trigger signal 714 as output. Those of ordinary skill in the art will appreciate that the same type of augmentation can be used to generate a number of carriers that can be used for control of a two-level or other multi-level converter.

The carrier generation block 700 provides a counter that may be used for inverter switching commands generation by determining the switching frequency of the two-level, three-level, or other multi-level or other converter. In particular, a counter block generates a counter output signal 718. The maximum count signal 714, which may be received from the main CPU/Supervisory control unit external to the inverter control circuit 300, allows the switching frequency to be a multiple of three of the output frequency, or any other odd or even multiple of the output frequency.

The carrier generation block 700 receives synchronization-related signals that may include reset and enable signals. Outputs of the carrier generation block include the counter outputs 716 and 718 and a period complete trigger flag 720.

FIG. 8, which includes FIGS. 8a and 8l), is a block diagram of an alternative carrier generation block 800 according to an exemplary embodiment of the invention. The carrier generation block 800 is adapted to provide two carriers that can be used for control of a three-level converter. The exemplary carrier generation block 800 creates one triangular carrier that has only positive values, and one triangular carrier that has only negative values. A saw tooth carrier may be implemented, as well. Only positive carrier values are shown in FIG. 10.

The carrier generation block 800 receives an enable input 802, a reset input 804, a period reset input 806, an enable synchronization input 808, and a maximum counts input 810. The carrier generation block 800 produces a falling edge trigger output 812, a period complete trigger output 814, a counter output 816, a PCC (Positive Carrier Counter) counter output 820, and an NCC (Negative Carrier Counter) counter output 822.

The carrier generation block 800 includes a three-level carrier block. Provision is made for two carrier signals for the positive and negative converters. A positive converter is a converter that provides positive output voltages in an inverter control system. A negative converter is a converter that provides negative output voltages in an inverter control system. The carrier generation block 800 may be used to generate different firing patterns, such as sine PWM, sine PWM with $3^{rd}$ harmonic injection, or space vector modulation (SVM). SVM is a methodology for controlling the generation of pulse width modulated (PWM) inverter firing signals. Vectors represent the different states of switches in an inverter, and can be applied via a control circuit. According to an exemplary embodiment, states corresponding to firing patterns may be implemented using a vector selector based on the region of the desired output voltage position and amplitude in time.

In an SVM methodology according to an exemplary embodiment, a modulation index may be used to control the inverter output voltage magnitude. The modulation index represents how switching timing variation in time with respect to the desired voltage output. Moreover, a modulation index represents a degree to which a modulated variable varies with respect to its un-modulated level.

The output firing pattern of an exemplary embodiment has lower switching losses relative to a conventional SVM firing scheme. This effect is achieved by limiting switching of the switches for extended periods of time during an output cycle.

FIG. 9 is a diagram showing the division of a firing cycle into firing regions according to an exemplary embodiment of the invention. The diagram is generally referred to by the reference number 900. The diagram 900 shows an inverter firing cycle of 360° broken down into six tiring regions (regions 1-6), each of which comprises 60°. Moreover, firing regions may comprise a portion of a firing cycle and may be represented by a set number of degrees of rotation (e.g., six regions of 60°, twelve regions of 30°, 24 regions of 15°, to name just a few examples). For each firing region, switches providing power to the inverters may either be designated as open or closed. The number of regions chosen for a given application may vary based on system design considerations. In an exemplary embodiment, switches are held either open or closed for the entire duration of each firing region according to the definition of the firing pattern for that region.

FIG. 10, which includes FIGS. 10a and 10b, is a block diagram of another alternative carrier generation block 1000 according to an exemplary embodiment of the invention. The exemplary embodiment shown in FIG. 10 receives an enable signal, a reset signal, a period reset signal, an enable synchronization signal, and a maximum count signal. The output is a carrier counter value that has only positive values and may have triangular or sawtooth waveshape. A falling edge trigger block generates a period complete trigger signal as an additional output.

The carrier generation block 1000 shown in FIG. 10 determines the switching frequency of the inverter and provides a counter that may be used for inverter switching commands generation. The maximum count signal, which may be received from the main CPU/Supervisory control unit external to the inverter control circuit, allows the switching frequency to be a multiple of the output frequency.

Modulation pulse widths for each region may be determined and may be separated by region dividers. A region divider is a programming limitation that prohibits the changing of switch positions except on the boundary between firing regions. By restricting the position of switches within regions in this manner (i.e., not allowing changes to switch positions except for on region dividers), switching losses may be reduced.

Firing region positions (definitions of whether inverters are open or closed in each region) may be stored in a look-up table ("LUT"). The region information may be used to control a multiplexer to form a firing signal. Switches may be held in place longer to minimize the number of switching operations, thereby to reduce or minimize switching losses.

FIG. 11 is a graph showing reference points for carrier generation according to an exemplary embodiment of the invention. The graph is generally referred to by the reference number 1100. The graph 1100 shows a trace 1102 in terms of amplitude of the carrier (y-axis) versus converter output frequency (x-axis). The trace 1102 represents an example of carrier maximum counts (as provided by the maximum count signal 512 (FIG. 5) versus output frequency. The variation of the counts can be calculated and can be modified to produce various number of pulses in a given output frequency cycle. A signal having the characteristics of the trace 1102 may be used as reference points for a carrier generation. Those of ordinary skill in the art will appreciate that a number of curves could represent variations from the trace 1102 depending on system design considerations.

FIG. 12 is a block diagram of a modulator for output frequency generation block 1200 according to an exemplary embodiment of the invention. The modulator reference generation block 1200 may be used as an integration synchronization signal to drive a pointer to access waveform value data stored in a LUT for output frequency generation. The modulator generation block 1200 receives an enable signal 1202, a reset signal 1204, and a maximum counts signal 1206. A falling edge trigger block 1208 produces a period complete trigger signal 1210 as output.

The maximum counts signal 1206, which may be received from the main CPU/Supervisory control unit external to the inverter control circuit 300 (FIG. 3), may be set based on the output frequency desired from an associated drive circuit. Examples of factors to be considered include a minimum output frequency and a maximum output frequency. The minimum output frequency may be limited by the switching frequency, the resolution desired or the like. The maximum output frequency may be limited by, for example, an FPGA clock frequency of an FPGA on which an exemplary inverter control circuit is implemented.

FIG. 13 is a graph showing the reference points for a modulator generator with $3^{rd}$ harmonic injection capabilities according to an exemplar), embodiment of the invention. The graph is generally referred to by the reference number 1300. The graph 1300 shows a trace 1302 in terms of modulator amplitude (y-axis) versus output frequency (x-axis). The trace 1302 represents an example of carrier maximum counts (as provided by the maximum count signal 1206 (FIG. 12) versus output frequency. A signal having the characteristics of the trace 1302 may be used as reference points for a modulator. The same may be used as a reference point to different LUTs containing modifier waveforms to allow capability for modulator modification and output voltage boost for a given output frequency.

FIG. 14 is a block diagram of a modulator and modifier generation block 1400 according to an exemplary embodiment of the invention. The modulator and modifier generation block 1400 receives a reset signal 1402, a modulation period complete flag 1404, and a step period signal 1406. A $3^{rd}$ harmonic injection block 1408 receives the modulation period complete flag 1404 and produces a $3^{rd}$ harmonic output signal 1410. A most significant bit (MSB) trigger block 1412 produces a sine wave MSB period reset signal 1414.

The modulator and modifier generation block 1400 also produces a fundamental output signal 1416 in the form of a three-phase sine wave and a harmonic output in the form of a single-phase sine wave with frequency of three times the fundamental. In general, the output may take the form of multi-phase reference waveforms. The fundamental output signal 1416 may be used by the PWM modulator block to generate PWM drive signals for the inverters 208 (FIG. 2). The generation of the multi-phase reference signal output may be accomplished by iterating the LUT a number of time corresponding to the number of phases desired (for example, three times for a three-phase output signal). Each cycle may be determined by a synchronization signal for each of the three phases. The use of a single LUT with different reference points allows a minimization of implementation resources. Reversal of the reference points allows for reversal of output phase sequence (i.e., ABC compared to CBA). Predetermined phase sequences may be implemented.

The modulator and modifier generation block 1400 may also produce a valid data flag 1418. The valid data flag 1418 may be used to perform signal synchronization with a delay allowing the same multipliers to be used for multiple phases.

As stated above, the modulator and modifier generation block 1400 may be adapted to have $3^{rd}$ harmonic modifier injection capabilities. A new value for the $3^{rd}$ harmonic modifier injection may be generated on each clock cycle. A control signal may enable or disable the modifier injection. When enabled, $3^{rd}$ harmonic modifier data may be injected into the fundamental output signal 1416 by adding the values. In this case, the fundamental output signal 1416 may be referred to as a modulator reference waveform. According to an exemplary embodiment of the invention, the $3^{rd}$ harmonic modifier values may be derived with the same LUT values that are also used to generate the sine wave data for the fundamental output signal 1416.

FIG. 15 is a block diagram of a two-phase sin and cos (dq0) wave generation block 1500 according to an exemplary embodiment of the invention. The two-phase sin can cos (dq0) wave generation block 1500 differs from the modulator and modifier generation block 1400 in number of inputs into the time multiplexing unit. Moreover, the modulator and modifier generation block 1400 has three inputs (0, ⅓, and −⅓), while the two-phase sin and cos (dq0) wave generation block 1500 has two inputs (¼ and 0).

The two-phase sin and cos (dq0) wave generation block 1500 provides an oscillator for the output frequency that is time multiplexed only twice (on the first FPGA main clock cycle sin reference is generated on the second FPGA main clock cycle the cos reference is generated). This is possible because only two sine waves shifted 90 degrees are used. The two-phase sin and cos (dq0) wave generation block 1500 provides also region detection capabilities based on the same LUT pointer used for the sin and cos wave generation. This may provide for output firing pattern selection as well as matrix gain selector.

The dq oscillator provided by the two-phase sin and cos (dq0) wave generation block 1500 provides 2× instead of 3× time multiplexing and creates two-phase (not three-phase output) that has sin and cos variation in time. An additional LUT may be used for the region selection based on sin/cos reference point.

The two-phase sin and cos (dq0) wave generation block 1500 also produces a fundamental output signal in the form of a two-phase sine and cos wave and a region output in the form of a staircase with the number of stairs equal to a desired number of regions within a given output frequency cycle. In general, the output may take the form of multi-phase reference waveforms. The fundamental output signal may be used by the PWM modulator block to generate PWM drive signals for the inverters 208 (FIG. 2). The generation of the multi-phase reference signal output may be accomplished by iterating the LUT a number of time corresponding to the number of phases desired (for example, two times for a two-phase output signal). Each cycle may be determined by a synchronization signal for each of the two phases. The use of a single LUT with different reference points allows a minimization of implementation resources. Reversal of the reference points allows for reversal of output phase sequence (i.e., ABC compared to CBA). Predetermined phase sequences may be implemented.

The two-phase sine wave generation block 1500 may also produce a valid data flag. The valid data flag may be used to perform signal synchronization with a delay allowing the same multipliers to be used for multiple phases.

FIG. 16 is a block diagram of an exemplary zero (0) sequence modifier creating function circuit 1600 that is adapted to perform a zero (0) sequence modifier creating function according to the invention. The zero sequence modifier creating function circuit 1600 may be employed to modify the modulator and to perform space vector modulation (SVM). The use of a zero sequence is an alternative to $3^{rd}$ harmonic injection. According to the invention, zero sequence modifier data can be derived from the three-phase sine wave or by using a look-up-table (LUT).

The zero sequence creating function may provide a beneficial inverter firing profile by adding an offset in place to increase the amplitude of a fundamental control signal. In the embodiment shown in FIG. 16, the input to the zero sequence modifier creating function circuit 1600 is a vector of a three-phase signal of a modulator and the output is a zero sequence for addition to the three-phase modulators. The zero sequence creating function circuit 1600 then creates a zero sequence function using a minimum-maximum (or min-max) method known to those of ordinary skill in the art. A single LUT may be used, similar to the 3rd harmonic injection, to create a zero sequence modifier instead of using the zero sequence modifier creating function circuit 1600.

FIG. 17 is a block diagram of a PWM modulator block 1700 according to an exemplary embodiment of the invention. The PWM modulator block 1700 receives a maximum counts signal 1702, a valid data flag 1704, a counter output signal 1706, a fundamental signal 1708, a fundamental modulation index signal 1710, a $3^{rd}$ harmonic signal 1712, a $3^{rd}$ harmonic modulation index signal 1714, a $3^{rd}$ harmonic enable signal 1716, a square wave (SQW) mode signal 1718, and a phase sequence signal 1720. In an exemplary embodiment of the invention, the fundamental signal 1708 received by the PWM modulator block 1700 may comprise a fundamental output signal from modulator and modifier generation block according to an exemplary embodiment of the invention.

The PWM modulator block 1700 produces PWM inverter drive signals that may be used to drive the inverters 208 (FIG. 2). Outputs provided by the PWM modulator block 1700 are useful for diagnostic and monitoring. Those outputs include an A pulse output 1722, a B pulse output 1724, and a C pulse output 1726. Moreover, the A pulse output 1722, the B pulse output 1724, and the C pulse output 1726 produced by the PWM modulator block may comprise three-phase PWM command signals that may be used as drive signals to drive six IGBT inverters.

FIG. 18, which includes FIGS. 18*a*, 18*b* and 18*c*, is a block diagram of another alternative pulse width modulation (PWM) generator block 1800 according to an exemplary embodiment of the invention. In particular, comparators are implemented for a three-level, three-phase, four-switches per phase firing commands. Twelve commands may be derived for purposes of driving the three-level converter. Minimum pulse extension and phase sequence blocks are included.

The PWM modulator block 1800 shown in FIG. 18 receives a maximum counts signal 1802, a fundamental input 1804, a fundamental modulation index input 1806, a phase current direction input 1808 and a dead time input 1810. Other inputs to the PWM modulator block 1800 shown in FIG. 18 include a positive-carrier counter output signal 1812, a negative-carrier counter output signal 1814, a maximum counter input 1816, a $3^{rd}$ harmonic modulation index input 1818 and a $3^{rd}$ harmonic modifier input 1820. A $3^{rd}$ harmonic injection enable input 1822, a square wave mode enable input 1824 and a space vector modulation enable input 1826 are also shown. The exemplary embodiment of the PWM modulator block 1800 shown in FIG. 18 provides a plurality of PWM outputs 1828.

FIG. 19, which includes FIGS. 19*a* and 19*b*, is a block diagram of a phase sequence block 1900 according to an exemplary embodiment of the invention. The phase sequence block 1900 receives PCC counter output inputs 1902, 1904, a modulator phase A input 1906, a modulator phase B input 1908, and a modulator phase C input 1910. Outputs from the phase sequence block 1900 include a plurality of phase up and down outputs 1912.

The phase sequence block 1900 receives a plurality of phase control firing signals and allows the swapping of two phases in order to achieve a reverse output phase sequence (i.e., ABC compared to CBA). In an exemplary embodiment, a predetermined phase sequence can be implemented allowing the elimination of this block.

FIG. 20, which includes FIGS. 20*a*, 20*b* and 20*c*, is a block diagram of still another alternative pulse width modulation (PWM) generator block 2000 according to an exemplary embodiment of the invention. The PWM generator block 2000 (representing a two-phase dq0) uses two-phases to calculate the switching times variation with matrix based gains. Two new modulators A and B are used for the pulse pattern generation. Pulse pattern generation is based on the comparison with the carrier output (modulator). Certain switches are held in on/off positions based on the region selection (vector selector).

The PWM modulator block 2000 receives a region input 2002, a fundamental modulation index input 2004, and a valid data flag input 2006. Also received are a carrier counter output input 2008 and a minimum pulse count input 2010. In an exemplary embodiment of the invention, the fundamental modulation index input 2004 received by the PWM generator block 2000 may comprise a fundamental modulation index output from a sin and cos wave two-phase generation block according to an exemplary embodiment of the invention.

The PWM modulator block 2000 produces commands that may be used to control the inverters 208 (FIG. 2). Examples of outputs produced by the PWM modulator block 2000 include an A command output 2012, a B command output 2014, and a C command output 2016.

FIG. 21 is a block diagram of a matrix gain selector block 2100 according to an exemplary embodiment of the invention. The matrix gain selector block 2100 receives a region input identifying a region of a firing cycle. Outputs of the matrix gain selector block 2100 include matrix gains used for the calculation of the modulator signals A and B. The matrix gain is used in conjunction with the region and timing waveforms A and B, to calculate the timing for the switching for the switches that are not being held in on/off position.

FIG. 22 is a block diagram of a modulator calculation block 2200 according to an exemplary embodiment of the invention. Inputs to the modulator calculation block 2200 include outputs from the matrix gain selector block 2100, the sin and cos waveform (alpha and beta), as well as the data valid flag for calculations synchronization and the maximum carrier counts for scaling. Outputs of the modulator calculation block 2200 include two modulators used for generation of the PWM pulse for the inverter switches.

FIG. 23 is a block diagram of a PWM modulation block 2300 according to an exemplary embodiment of the invention. The PWM modulation block 2300 may be used with the exemplary PWM generation block 1900 shown in FIG. 19. The PWM modulation block 2300 includes a carrier input 2302, a modulator A input 2304, and a modulator B input 2306. The PWM modulation block 2300 provides a relational 1 output 2308, an inverted relational 1 output 2310, a relational 2 output 2312, and an inverted relational 2 output 2314. The implementation of the PWM modulation block 2300 shown in FIG. 23 generates four command pulses to be used for inverter firing command generation in conjunction with a region selector in a vector selection block.

FIG. 24 is a block diagram of a vector selection block 2400 according to an exemplary embodiment of the invention. The vector selection block 2400 generates PWM command signals that may be used for inverter switching firing control. Based on the region selector block firing commands are either hold in open or close position, or modulated based on the PWM modulator inputs to achieve the desired output voltage. Implementation shows output cycle division into six different regions resulting in 60 degrees open or close periods for each of the inverter switches. Changes can be made to allow for different numbers of regions to be employed. The result is flexible control over the duration for which switches are open or closed. The desired duration may be based on desired output voltage harmonics profile, or elimination of desired harmonics from load currents or output voltage.

FIG. 25 is a block diagram of a harmonic elimination firing block according to an exemplary embodiment of the invention. The harmonic elimination firing block 2500 receives a modulation index input 2502 and generates a firing angle value output 2504.

In an exemplary embodiment, firing angles are calculated every cycle of the fundamental voltage output waveform. In addition, calculation can be independent of the fundamental cycle. Output voltage frequency may be changed after completing a full cycle of fundamental output frequency. In one exemplary embodiment, firing angles may be calculated based on a fourth order approximation function. Other orders of approximation may be used depending on the resolution needed for a particular application. Another factor that may affect the order of approximation is CPU time utilization. The fourth order approximation is based on firing angle variation with respect to the modulation index.

According to embodiments of the invention, firing angles may be symmetric with respect to the 90 degrees for quarter wave symmetry. For example, 0<fa1<fa2<fa3< ... <90 may be used in the case of voltage harmonics elimination based control. The following may be used in the case of current harmonics minimization based control: 0<fa1<fa2<fa3< ... <60. In an example in which a pulse rate provides 10-30 firing changes in a fundamental output cycle, a state machine having 30 different states may be constructed. The number of states relates to the primary switching frequency of the system. The firing pattern may be determined in advance and calculated as a series of firing events. Each firing event may be represented by a different state of the state machine.

At the entry of the state, the delta time in terms of clock cycles to the next firing state (event) may be computed. Delta time for the timer loading may be calculated as a difference between the new time and the old time. A firing timer change state number may be loaded and selected devices may be fired if no firing restriction present. Compensation for dead times may be performed, if desired.

Equation coefficients may be entered as a vector and the appropriate vector element may be selected for the appropriate order of the equation. The firing angle is selected based on the region position of the reference vector. For the case of current harmonics minimization-based control, and two firing angles, an exemplary sequence may be:
0-(0+fa1)-(0+fa2)-(60−fa1)-(60−fa1)-60-(60+fa1)-(60+fa2)-(120−fa2)-(120−fa1)-120, and so on with 360 and 0 being both end and beginning of the cycle. Similar symmetry applies to other cases and numbers of firing angles. The symmetry for the case of voltage harmonics elimination is 90, 180, 270 and 360 per phase instead of the 60 degrees referred to above. Minimization or elimination can be achieved with an abitrary hold angle selection (90°, for example can be 45°, the 60° can be 30° in alternative exemplary embodiments, etc., depending on the number of harmonic desired to be eliminated/minimized).

FIG. 26 is a block diagram of a first state firing angle calculation block according to an exemplary embodiment of the invention. The first state calculation block 2600 receives a firing angles input 2602 and produces a first firing angle output 2604.

FIG. 27 is a block diagram of a second state calculation block according to an exemplary embodiment of the invention. The second state calculation block 2700 receives a firing angles input 2702 and produces a second firing angle output 2704.

The circuits shown in FIGS. 26 and 27 may provide outputs corresponding to specific sequences to be performed for switching. One exemplary sequence comprises: 0+FA1, 0+FA2, ... 0+FAn, 60−FA1, 60−FA2, 60−FAn, 60, 60+FA1, 60+FA2, ... , 60+FAn, ... , 120−FA1, 120−FA2, ... , 120−FAn, 120, 120+FA1, with symmetry along the 0, 60, 120, 180, 240, 300, 360 (0). According to an exemplary embodiment, there are other possible symmetries based on the technique used to calculate the firing angles. Another exemplary technique is output voltage harmonics elimination, which can have symmetry along 90°, 180°, etc., but on per phase bases because different phases may be switching earlier. Limiting primary switching angles to between 0°-60° allows simplification because the output has one phase held for relatively long periods of time (at least 60°). A difference would be that calculation for the output vector pattern selection may be used instead of the look up table approach described herein, because one would need to first determine the next phase to switch based on a minimum selection from all of the phases.

FIG. 28 is a state diagram useful in explaining the operation of a harmonic elimination firing circuit according to an exemplary embodiment of the invention. The state diagram 2800 includes an initial state 2802. In the initial state 2802, a counts variable and a counter expire flag are initialized. Upon the occurrence of a count enable, a count state 2804 is entered. In the count state 2804, a counter is incremented.

If the counts variable is greater than or equal to a maximum counts variable, a hold state 2806 is entered. Upon the occurrence of a count enable in the hold state 2806, an end state 2808 is entered if the counts variable is greater than or equal to a maximum counts variable. In the end state 2808, a counter expire flag is set to a logical value of "1." From the end state 2808, a re-initialize state 2810 is entered in which the counts variable is set to a logical value of "1" and the counter expire flag is set to a logical value of "0." From the re-initialize state 2810, the count state 2804 is entered upon occurrence of a count enable. From the hold state 2806, the count state 2804 is re-entered, as shown in the state diagram 2800, if the counts are less than a maximum counts variable. In exemplary embodiments, different state machines with fixed numbers of states can be used if no variation in the number of switching angles is needed for applications with single sets of firing angles.

FIG. 29 is a block diagram of an extend pulse generation block 2900 according to an exemplary embodiment of the invention. The extend pulse generation block 2900 may receive an A pulse output, a B pulse output, or a C pulse output. Moreover, an implementation of the extend pulse generation block 2900 may be used for each of the PWM outputs of a PWM modulator block, according to an exemplary embodiment of the invention.

The extend pulse generation block 2900 receives a pulse in signal 2902 and a minimum pulse counts signal 2904. These input signals may be received, for example, from a main CPU/Supervisory control unit external to the inverter control circuit. The pulse in signal 2902 is delivered to an either edge trigger block 2906. The logic of the extend pulse generation block 2900 is used to produce a pulse extend signal. PWM commands received by the extend pulse generation block 2900 are extended to a time duration based on system design requirements.

FIG. 30 is a block diagram of a dead time extender block 3000 according to an exemplary embodiment of the invention. The dead time extender block 3000 receives a phase A command signal 3002, a dead time positive signal 3004, and a dead time negative signal 3006. These inputs may be received from a main CPU/Supervisory control unit external to an inverter control circuit according to an exemplary embodiment of the invention. The logic of the dead time extender block 3000 produces an AP command 3006 and an AN command 3008.

PWM commands received by the dead time extender block 3000 have dead time added between positive and negative commands for each phase of operation. The amount of dead time added may vary based on individual system design requirements.

FIG. 31, which includes FIGS. 31a and 31b, is a block diagram of a dead time insertion block 3100 according to an exemplary embodiment of the invention. The dead time insertion block 3100 receives a plurality of phase control firing signals, positive and negative counter outputs, and inserts dead time between the firing of the inverter switches to prevent short circuit at the inverter output. The outputs from the block are the plurality of phase control firing commands. The dead time insertion block 3100 receives a plurality of phase up and down inputs 3102. A plurality of multiplexers 3104 are employed to select a plurality of phase up and down outputs 3106. Additionally, a plurality of multiplexers 3108 are employed to select a plurality of phase up and down outputs 3110.

FIG. 32 is a block diagram showing a control structure that includes an inverter control circuit according to an exemplary embodiment of the invention. The control structure is generally referred to by the reference number 3200. The control structure 3200 includes a main CPU/Supervisory control unit 3202. The main CPU/Supervisory control unit 3202 may perform a number of control functions relative to the inverter control circuit. For example, the main CPU/Supervisory control unit 3202 may calculate reference and switching frequency counts. In addition, the main CPU/Supervisory control unit 3202 may provide voltage regulation and may ramp drive signal frequency up or down. The main CPU/Supervisory control unit 3202 may also perform square wave mode transition.

The main CPU/Supervisory control unit 3202 receives several inputs. As shown in FIG. 32, examples of input data that may be received by the main CPU/Supervisory control unit 3202 include a speed reference signal, a volt per Hertz signal, a number of poles, an FPGA clock frequency, a card identifier, and a DC link voltage.

In an embodiment, the main CPU/Supervisory control unit 3202 is adapted to provide a number of inputs to an inverter control circuit on the FPGA 3204. Examples of data that may be provided to the inverter control circuit include carrier count data, modulator count data, modulation index data, $3^{rd}$ harmonic modulation index data, minimum on/off count data, and dead time count data. In addition, the main CPU/Supervisory control unit 3202 may provide a number of indicator flags to the inverter control circuit. Examples of indicator flags that may be provided to the inverter control circuit include a global enable flag, switch enable flags, a PWM mode flag, a square wave mode flag, and a data transfer handshake flag.

In one exemplary embodiment of the invention, a carrier signal is generated using an up-down counter. The maximum value of the counter may be a function of a clock frequency of the FPGA 3204, time multiplexing, and the carrier frequency required. The modulator signal may be stored as a LUT having a fixed number of locations, such as 2,048 separate locations. The modulator signal data stored in the LUT may correspond to a sine wave of amplitude one. Moreover, the modulator signal data may be stored as 16-bit signed fixed point numbers with a scale of 4,096 (12 bits). Those of ordinary skill in the art will appreciate that increasing the number of locations in the LUT decreases the potential error of a waveform constructed from the data stored in the LUT.

The modulator count may be used to determine the amount of time after which the next number in the sine wave lookup table will be used as output. This may be done as a function of the clock frequency of the FPGA 3204, time multiplexing, the LUT length, and the frequency of the output waveform. In an exemplary embodiment of the invention, waveform value data corresponding to the $3^{rd}$ harmonic modifier data is derived from a LUT that uses the same data that is used to obtain the modulator signal data. Moreover, the $3^{rd}$ harmonic data may be determined by using a LUT index that changes three times as fast as the fundamental reference used to obtain the waveform value data for the modulator signal.

Once obtained from the LUT, the sine wave data may be multiplied by the modulation index. The computed modulator A and B may then be compared with the carrier signal to produce the PWM output. A minimum on/off pulse may be applied to make sure that any on/off pulse smaller than a particular value is converted to a pulse having a duration of the particular value. For example, if the minimum pulse duration is 34 µs, pulses shorter than 34 µs are converted to 34 µs pulses. In an exemplary embodiment of the invention, the pulses for top and bottom switches are obtained after applying a dead time equal to the particular value.

A data valid flag may be used to synchronize the operation or an inverter circuit on the FPGA 3204 with the main CPU/Supervisory control unit 3202. Every input to the inverter control circuit on the FPGA 3204 may be double buffered, with the exception of the flag, which is direct. At the end of every fundamental cycle, the FPGA 3204 reads the input buffers and sets the data valid flag to zero. The FPGA 3204 takes in the new values only if the fundamental cycle is complete and the data valid flag has been set to one again.

FIG. 33 is a table showing the use of inverter flags according to an exemplary embodiment of the invention. The table is generally referred to by the reference number 3300.

In an exemplary embodiment of the invention, a speed reference is expressed as a 16-bit unsigned integer. It may be ramped up at a configurable rate. By way of example, the speed reference may be ramped up at the rate of 10 rpm per step. The speed reference may be converted to a frequency command using the number of poles.

The voltage command may be calculated using the volts per Hertz of the motor load. The voltage command may be directly converted to a modulation index command using the DC link voltage if for example, the actual voltage feedback is not available. Moreover, a closed loop regulator may be used for the conversion when the feedback is available. A square wave mode flag may be set lithe modulation index is greater than a particular value, such as 7.5.

If the frequency is below a particular value, such as 7.6 Hz, an asynchronous PWM flag may be set and the switching frequency may be set accordingly. Otherwise, the ratio of switching frequency to fundamental frequency may be varied according to a particular pattern, such as 129, 81, 51, 33, 21 and 15. These values are selected to keep the switching frequency in a range between 1,000 Hz and 1,575 Hz with a minimum of gear switches.

A reference frequency command may be used to calculate the modulator count. A switching frequency command may be used to calculate the carrier count.

FIG. 34 is a process flow diagram showing a method of producing signals to control an electronic device according to an exemplary embodiment of the invention. At block 3402, the process begins. A LUT is employed at block 3404 to derive first waveform value data for a multi-phase reference waveform. Second waveform value data corresponding to modifier data for the multi-phase reference waveform is derived, as shown at block 3406. At block 3408, the modifier data is added into the reference waveform to produce a modified reference waveform. A plurality of control signals is generated from the modified reference waveform, as shown at block 3410. The process ends at block 3412. The control signals may be used as the basis for controlling one or more electronic devices, such as inverters that power AC motors or other motors for moving a vehicle along a route.

FIG. 35 is a process flow diagram showing a method of operating an electronic device according to an exemplary embodiment of the invention. The electronic device may comprise a plurality of inverters that provide power via a plurality of switches. At block 3502, the process begins. An inverter firing pattern corresponding to one of a plurality of firing regions of an inverter firing cycle is determined, as shown at block 3504. The inverter firing pattern defines whether each of the switches that provides power to the inverters are held either on or off for the duration of the corresponding firing region. At block 3506, control signals for the switches based on the firing pattern are produced. The control signals are applied to the inverters, as shown at block 3508. At block 3510, the process ends.

FIG. 36 is a process flow diagram showing a method of producing signals to control an electronic device according to an exemplary embodiment of the invention. At block 3602, the process begins. A LUT is employed at block 3604 to derive waveform value data for a multi-phase reference waveform. The same LUT is then employed to derive waveform value data corresponding to harmonic data for the multi-phase reference waveform, as shown at block 3606. At block 3608, the harmonic data is injected into the multi-phase reference waveform to produce a harmonic reference waveform. A plurality of control signals is generated from the harmonic reference waveform, as shown at block 3610. The process ends at block 3612.

An exemplary embodiment of the invention may provide several advantages. For example, the usage of synchronization signals and a single, common LUT for modulator generation provides efficient resource utilization for FPGA implementations of the inverter control circuit. In addition, exemplary embodiments of the invention may be implemented in a wide variety of systems having differing requirements for output and switching frequencies based on hardware limitations. The simple design provides the ability to increase drive signal voltage and allows the selective injection of $3^{rd}$ harmonic or zero sequence data using the common LUT. An exemplary embodiment of the invention also provides flexibility to employ multiple FPGA clock cycles for control waveform generation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to illustrate embodiments of the invention, they are by no means limiting and are exemplary in nature. Other embodiments may be apparent upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "$3^{rd}$," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described control system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method of operating an inverter that provides power via a plurality of switches, the method comprising:
    calculating firing angles that will reduce harmonics in an output of the inverter using an nth order approximation that relates firing angle variation to a modulation index used to control inverter output voltage magnitude;
    determining an inverter firing pattern based on the firing angles, the inverter firing pattern corresponding to one of a plurality of regions of an inverter firing cycle, the inverter firing pattern defining whether each of the plurality of switches are held either on or off;
    producing control signals for the plurality of switches based on the firing pattern; and
    applying the control signals to the plurality of inverter for powering one or more electronic devices.

2. The method recited in claim 1, wherein each of the plurality of regions of the inverter firing cycle represents a portion of the inverter firing cycle measured in degrees.

3. The method recited in claim 2, wherein each of the plurality of regions represents either 60°, 30° or 15° of the inverter firing cycle.

4. The method recited in claim 1, comprising modulating the control signals with two generator signals that are 90° apart from each other.

5. The method recited in claim 1, wherein each of the plurality of regions is separated by a region divider.

6. The method recited in claim 1, wherein the inverter firing pattern comprises a space vector modulation (SVM) firing pattern.

7. An inverter firing system for operating one or more electronic devices having an inverter that provides power via a plurality of switches, the inverter firing system comprising:
    an inverter control circuit that is configured to:
        calculate firing angles that will reduce harmonics in an output the inverter using an nth order approximation that relates firing angle variation to a modulation index used to control inverter output voltage magnitude;
        determine an inverter firing pattern based on the firing angles, the inverter firing pattern corresponding to one of a plurality of firing regions of an inverter firing cycle, the inverter firing pattern defining whether each of the plurality of switches in the plurality of inverters are held either on or off for the duration of the corresponding firing region produce control signals for the plurality of switches based on the firing pattern; and apply the control signals to the inverter for the duration of the corresponding firing region.

8. The inverter firing system recited in claim 7, wherein each of the plurality of regions of the inverter firing cycle represents a portion of the inverter firing cycle measured in degrees.

9. The inverter firing system recited in claim 8, wherein each of the plurality of regions represents either 60°, 30° or 15° of the inverter firing cycle.

10. The inverter firing system recited in claim 7, wherein the control signals are modulated with two generator signals that are 90° apart from each other.

11. The inverter firing system recited in claim 7, wherein each of the plurality of regions is separated by a region divider.

12. The inverter firing system recited in claim 7, wherein the inverter firing pattern comprises a space vector modulation (SVM) firing pattern.

* * * * *

UNITED STATES PATENT AND TRADEMARK OFFICE
CERTIFICATE OF CORRECTION

PATENT NO. : 8,400,016 B2
APPLICATION NO. : 12/896195
DATED : March 19, 2013
INVENTOR(S) : Nikolov It is certified that error appears in the above-identified patent and that said Letters Patent is hereby corrected as shown below:

In the Drawings

In Fig. 4a, Sheet 6 of 56, in Box 7, Line 1, delete "MILalchDataRegislerFlag" and insert -- MILatchDataRegisterFlag --, therefor.

In Fig. 4a, Sheet 6 of 56, in Box 8, Line 1, delete "LalchDataRegisierFlag" and insert -- LatchDataRegisterFlag --, therefor.

In Fig. 4a, Sheet 6 of 56, for Tag 402, Line 8, delete "LalchDataRegisierFlag" and insert -- LatchDataRegisterFlag --, therefor.

In the Specifications

In Column 1, Line 60, delete "tiring" and insert -- firing --, therefor.

In Column 2, Line 27, delete "invention:" and insert -- invention; --, therefor.

In Column 2, Line 36, delete "invention:" and insert -- invention; --, therefor.

In Column 2, Line 56, delete "exemplar" and insert -- exemplary --, therefor.

In Column 3, Line 22, delete "invention:" and insert -- invention; --, therefor.

In Column 4, Line 61, delete "Width" and insert -- width --, therefor.

In Column 7, Line 5, delete "81)," and insert -- 8b, --, therefor.

In Column 7, Line 54, delete "tiring" and insert -- firing --, therefor.

Signed and Sealed this
Eleventh Day of June, 2013

Teresa Stanek Rea
*Acting Director of the United States Patent and Trademark Office*

CERTIFICATE OF CORRECTION (continued)

U.S. Pat. No. 8,400,016 B2

In Column 8, Line 36, delete "(as" and insert -- as --, therefor.

In Column 9, Line 1, delete "exemplar)," and insert -- exemplary --, therefor.

In Column 13, Line 35, delete "-(60-fa1)-(60-fa1)-" and insert -- -(60-fa2)-(60-fa1)- --, therefor.

In Column 13, Line 59, delete "60-FA2, 60-FAn," and insert -- 60-FA2, ..., 60-FAn, --, therefor.

In Column 13, Line 61, delete "120+FA1, with" and insert -- 120+FA1,.... with --, therefor.

In Column 16, Line 17, delete "or an" and insert -- of an --, therefor.

In Column 16, Line 37, delete "if" and insert -- if, --, therefor.

In Column 16, Line 40, delete "lithe" and insert -- if the --, therefor.

In Column 17, Line 60, delete ""up."" and insert -- "up," --, therefor.

In the Claims

In Column 18, Line 36, in Claim 1, after "signals to the", delete "plurality of".

In Column 18, Line 57, in Claim 7, delete "output the" and insert -- output of the --, therefor.

In Column 18, Line 67, in Claim 7, delete "region" and insert -- region; --, therefor.